United States Patent
Siminoff

(10) Patent No.: US 10,769,914 B2
(45) Date of Patent: Sep. 8, 2020

(54) INFORMATIVE IMAGE DATA GENERATION USING AUDIO/VIDEO RECORDING AND COMMUNICATION DEVICES

(71) Applicant: Amazon Technologies, Inc., Seattle, CA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 16/003,035

(22) Filed: Jun. 7, 2018

(65) Prior Publication Data

US 2018/0357871 A1     Dec. 13, 2018

Related U.S. Application Data

(60) Provisional application No. 62/516,270, filed on Jun. 7, 2017.

(51) Int. Cl.
*G08B 13/16*     (2006.01)
*G08B 13/196*     (2006.01)
(Continued)

(52) U.S. Cl.
CPC ......... *G08B 13/19673* (2013.01); *G08B 3/10* (2013.01); *G08B 13/189* (2013.01);
(Continued)

(58) Field of Classification Search
CPC ............ G08B 13/189; G08B 13/19613; G08B 13/19619; G08B 13/19669;
(Continued)

(56) References Cited

U.S. PATENT DOCUMENTS 4,764,953 A     8/1988    Chern et al.
5,428,388 A     6/1995    von Bauer et al.
(Continued)

FOREIGN PATENT DOCUMENTS

CN     2585521 Y     11/2003
CN     2792061 Y     6/2006
(Continued)

*Primary Examiner* — Thai Q Tran
*Assistant Examiner* — Stephen R Smith
(74) *Attorney, Agent, or Firm* — Greenberg Traurig, LLP

(57) ABSTRACT

Some embodiments provide for receiving image data representative of a field of view of a camera of an audio/video (A/V) recording and communication device during a period time and sensor data generated by a sensor or a hub device at a time. A time-based association between the A/V recording and communication device and the sensor may be determined. Based at least in part on the time and the period of time, it may be determined that the time is within the period of time and that the time being within the period of time satisfies the time-based association. The image data and the sensor data may be correlated to create updated data, and the updated data may be included within a generated message. The message may then be transmitted to a client device associated with the A/V recording and communication device.

20 Claims, 38 Drawing Sheets

(51) Int. Cl.
*H04N 7/18* (2006.01)
*G08B 25/08* (2006.01)
*G08B 13/189* (2006.01)
*G08B 3/10* (2006.01)

(52) U.S. Cl.
CPC . *G08B 13/19613* (2013.01); *G08B 13/19619* (2013.01); *G08B 13/19669* (2013.01); *G08B 13/19671* (2013.01); *G08B 13/19682* (2013.01); *G08B 13/19684* (2013.01); *G08B 13/19691* (2013.01); *G08B 13/19695* (2013.01); *G08B 25/08* (2013.01); *H04N 7/186* (2013.01); *H04N 7/188* (2013.01)

(58) Field of Classification Search
CPC ........ G08B 13/19671; G08B 13/19673; G08B 13/19682; G08B 13/19684; G08B 13/19691; G08B 13/19695; G08B 25/08; G08B 3/10; H04N 7/186; H04N 7/188
USPC ................ 386/201, 278, 291; 348/135, 143; 340/5.2, 506; 382/103, 107
See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,948,902 B1* | 4/2018 | Trundle ................ H04N 7/183 |
| 10,289,917 B1* | 5/2019 | Fu .................. G08B 13/19606 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2008/0130949 A1* | 6/2008 | Ivanov ................ H04N 7/181 |
| | | 382/103 |
| 2010/0225455 A1 | 9/2010 | Claiborne et al. |
| 2013/0057695 A1 | 3/2013 | Huisking |
| 2013/0127591 A1* | 5/2013 | Shay ................ G07C 9/00087 |
| | | 340/5.52 |
| 2013/0166252 A1* | 6/2013 | Stephanson .............. H04Q 9/00 |
| | | 702/190 |
| 2013/0215266 A1* | 8/2013 | Trundle ............ G08B 13/19602 |
| | | 348/143 |
| 2014/0005809 A1* | 1/2014 | Frei ........................ H04L 51/38 |
| | | 700/90 |
| 2014/0176708 A1* | 6/2014 | Ramakrishnan ... G06K 9/00771 |
| | | 348/143 |
| 2014/0212002 A1* | 7/2014 | Curcio ................ G06K 9/00744 |
| | | 382/107 |
| 2014/0267716 A1 | 9/2014 | Child et al. |
| 2015/0163463 A1 | 6/2015 | Hwang et al. |
| 2015/0163535 A1* | 6/2015 | McCarthy, III ..... H04L 12/2825 |
| | | 725/49 |
| 2015/0296187 A1* | 10/2015 | Baldwin ......... G08B 13/19682 |
| | | 348/143 |
| 2016/0182249 A1* | 6/2016 | Lea .................. H04N 21/43615 |
| | | 725/80 |
| 2016/0314663 A1* | 10/2016 | Glencross ............... G03B 29/00 |
| 2017/0070775 A1* | 3/2017 | Taxier ................ H04L 12/2825 |
| 2017/0185277 A1* | 6/2017 | Sundermeyer ...... G06F 3/04817 |
| 2017/0228603 A1* | 8/2017 | Johnson ........... G08B 13/19628 |
| 2017/0272706 A1* | 9/2017 | Jeong ........................ G01J 5/04 |
| 2018/0012462 A1* | 1/2018 | Heitz, III ......... G08B 13/19606 |
| 2018/0113577 A1* | 4/2018 | Burns ............... H04N 21/47217 |
| 2018/0211693 A1* | 7/2018 | Iwanami ............... G11B 27/102 |
| 2018/0301016 A1* | 10/2018 | Usie .................... G08B 25/001 |
| 2018/0330169 A1* | 11/2018 | van Hoof ......... G08B 13/19613 |
| 2018/0342329 A1* | 11/2018 | Rufo ..................... G16H 40/67 |

FOREIGN PATENT DOCUMENTS

| | | |
|---|---|---|
| EP | D944883 A1 | 6/1998 |
| EP | 1480462 A1 | 11/2004 |
| GB | 2286283 A | 8/1995 |
| GB | 2354394 A | 3/2001 |

(56) References Cited

FOREIGN PATENT DOCUMENTS

| | | |
|---|---:|---:|
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

INFORMATIVE IMAGE DATA GENERATION USING AUDIO/VIDEO RECORDING AND COMMUNICATION DEVICES

CROSS-REFERENCE TO RELATED APPLICATION

This application claims priority to provisional application Ser. No. 62/516,270, filed on Jun. 7, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of one or more an A/V recording and communication devices on the exterior of a home, such as a doorbell unit at the entrance of a home, acts as a powerful deterrent against would-be burglars.

SUMMARY

The various embodiments of the present informative image data generation using audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that more and more homes include networks of smart devices. However, accessing information generated by each of the smart devices is sometimes not as efficient as desired. For example, accessing information from different smart devices sometimes requires opening multiple applications or multiple tabs within a single application. In such an example, such as in a scenario where information from multiple smart devices may be helpful if viewed in concert (e.g., during a home burglary attempt), video from a surveillance camera may need to be accessed in one location while door lock/unlock status information may need to be accessed in a second location. The present embodiments solve this problem by leveraging the functionality of A/V recording and communication devices, such as A/V recording and communication doorbells, and other networked devices, such as door and window sensors, to provide information in a more easily digestible form. By providing the information in a more digestible form, homeowners may be able to make more informed and efficient decisions based on the information, such as to alert law enforcement, sound an alarm, and/or notify neighbors, for example. Ultimately, because homeowners may be able to make more informed and efficient decisions, the safety and security of the homeowner, other residents of the home, property within the home, and the neighborhood, are all increased, thereby enhancing public safety by providing safer and more secure homes and neighborhoods.

In a first aspect, an audio/video (A/V) recording and communication device including a processor, a communication module, and a camera detects, by the A/V recording and communication device, a motion event in a field of view of the A/V recording and communication device; activates, by the processor in response to detecting the motion event in the field of view of the A/V recording and communication device, the camera to record image data of the motion event within a field of view of the camera; receives, by the processor from at least one sensor, sensor data; correlates, by the processor, the sensor data with the image data to create updated image data; and generates and transmits, by the processor using the communication module, a user alert including the updated image data to a client device associated with the A/V recording a communication device.

In an embodiment of the first aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the first aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the first aspect, the motion event is detected by at least one of the camera or a motion sensor of the A/V recording and communication device.

In another embodiment of the first aspect, correlating the sensor data with the image data to create updated image data comprises: determining, by the processor, first clock data from the image data and second clock data from the sensor data; associating, by the processor in response to the determining, the first clock data with the second clock data; and generating, by the processor based on the associating, the updated image data including the image data and the sensor data.

In another embodiment of the first aspect, the generating the updated image data includes overlaying the sensor data onto the image data.

In another embodiment of the first aspect, the sensor data overlaid onto the image data is selected based on the relevance of the sensor data to the motion event.

In another embodiment of the first aspect, the user alert is programmed to display as a push-notification on the display of the client device.

In another embodiment of the first aspect, the push-notification includes the sensor data and at least one frame from the updated image data.

In another embodiment of the first aspect, the sensor data included in the push-notification includes the sensor data most relevant to the motion event.

In a second aspect, an audio/video (A/V) recording and communication device comprises: a communication module; a camera; one or more processors; and a non-transitory machine readable memory storing a program executable by at least one of the processors, the program comprising sets of instructions for: detecting, by the A/V recording and communication device, a motion event in a field of view of the A/V recording and communication device; activating, by the processor in response to detecting the motion event in the field of view of the A/V recording and communication device, the camera to record image data of the motion event within a field of view of the camera; receiving, by the processor from at least one sensor, sensor data; correlating, by the processor, the sensor data with the image data to create updated image data; and generating and transmitting, by the processor using the communication module, a user alert including the updated image data to a client device associated with the A/V recording a communication device.

In an embodiment of the second aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the second aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the second aspect, wherein the motion event is detected by at least one of the camera or a motion sensor of the A/V recording and communication device.

In another embodiment of the second aspect, correlating the sensor data with the image data to create updated image data comprises: determining, by the processor, first clock data from the image data and second clock data from the sensor data; associating, by the processor in response to the determining, the first clock data with the second clock data; and generating, by the processor based on the associating, the updated image data including the image data and the sensor data.

In another embodiment of the second aspect, the generating the updated image data includes overlaying the sensor data onto the image data.

In another embodiment of the second aspect, the sensor data overlaid onto the image data is selected based on the relevance of the sensor data to the motion event.

In another embodiment of the second aspect, the user alert is programmed to display as a push-notification on the display of the client device.

In another embodiment of the second aspect, the push-notification includes the sensor data and at least one frame from the updated image data.

In another embodiment of the second aspect, the sensor data included in the push-notification includes the sensor data most relevant to the motion event.

In a third aspect, an audio/video (A/V) recording and communication device comprising a processor, a communication module, and a camera, detects, by a motion sensor or the camera, a motion event in a field of view of the motion sensor or a field of view of the camera, and generating, by the motion sensor or the camera, motion data representative of the motion event; analyzes, by the processor, the motion data; determines, by the processor based on the analyzing of the motion data, whether the motion event was caused by movement of a person in the field of view of the motion sensor or the field of view of the camera; activates, by the processor based on the determination whether the motion event was caused by the movement of a person in the field of view of the motion sensor or the field of view of the camera, the camera to record image data of the motion event in the field of view of the camera; analyzes, by the processor, the image data; queries, by the processor based on the analyzing of the image data, at least one sensor for sensor data; receives, by the processor from the at least one sensor in response to the querying, the sensor data; correlates, by the processor, the sensor data with the image data; overlays, by the processor based on the correlating, the sensor data onto the image data to create updated image data; and generates and transmits, by the processor using the communication module, a user alert including the updated image data to a client device associated with the A/V recording a communication device.

In an embodiment of the third aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the third aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the third aspect, the sensor data overlaid onto the image data is selected based on the relevance of the sensor data to the motion event.

In another embodiment of the third aspect, the user alert is programmed to display as a push-notification on the display of the client device.

In another embodiment of the third aspect, the push-notification includes the sensor data and at least one frame from the updated image data.

In another embodiment of the third aspect, the sensor data included in the push-notification includes the sensor data most relevant to the motion event.

In another embodiment of the third aspect, the analyzing the motion data includes using facial recognition software to determine if a person is present in the motion data.

In another embodiment of the third aspect, the analyzing the motion data includes comparing the motion data to motion sensor settings of the motion sensor to determine if a person is present in the motion data.

In another embodiment of the third aspect, correlating the sensor data with the image data comprises: determining, by the processor, first clock data from the image data and second clock data from the sensor data; and associating, by the processor in response to the determining, the first clock data with the second clock data.

In a fourth aspect, an audio/video (A/V) recording and communication device having a camera receives, from the camera in response to a motion event, image data recorded of the motion event in a field of view of the camera; receives, from at least one sensor, sensor data; correlates the sensor data with the image data to create updated image data; and generates and transmits a user alert including the updated image data to a client device associated with the A/V recording a communication device.

In an embodiment of the fourth aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the fourth aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the fourth aspect, the image data is received in response to the motion event being detected by at least one of the camera or a motion sensor of the A/V recording and communication device.

In another embodiment of the fourth aspect, correlating the sensor data with the image data to create updated image data comprises: determining first clock data from the image data and second clock data from the sensor data; associating, in response to the determining, the first clock data with the second clock data; and generating, based on the associating, the updated image data including the image data and the sensor data.

In another embodiment of the fourth aspect, the generating the updated image data includes overlaying the sensor data onto the image data.

In another embodiment of the fourth aspect, the sensor data overlaid onto the image data is selected based on the relevance of the sensor data to the motion event.

In another embodiment of the fourth aspect, the user alert is programmed to display as a push-notification on the display of the client device.

In another embodiment of the fourth aspect, the push-notification includes the sensor data and at least one frame from the updated image data.

In another embodiment of the fourth aspect, the sensor data included in the push-notification includes the sensor data most relevant to the motion event.

In another embodiment of the fourth aspect, the method is executed by a hub device in network communication with the A/V recording and communication device and the at least one sensor.

In another embodiment of the fourth aspect, the method is executed by a backend device.

In another embodiment of the fourth aspect, the backend device is a server.

In a fifth aspect, an audio/video (A/V) recording and communication device having a camera and a motion sensor receives, from the camera in response to the camera or the motion sensor detecting a motion event in a field of view of the camera or a field of view of the motion sensor, image data recorded of the motion event in the field of view of the camera; analyzes the image data; queries, based on the analyzing of the image data, at least one sensor for sensor data; receives, from the at least one sensor in response to the querying, the sensor data; analyzes the sensor data; correlates, based on the analyzing of the sensor data, the sensor data with the image data; overlays, based on the correlating, the sensor data onto the image data to create updated image data; and generates and transmits a user alert including the updated image data to a client device associated with the A/V recording a communication device.

In an embodiment of the fifth aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the fifth aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the fifth aspect, the analyzing the image data includes determining whether a person is present in the image data.

In another embodiment of the fifth aspect, the analyzing the image data further includes, in response to determining whether a person is present in the image data, determining a location of the person in the field of view of the camera.

In another embodiment of the fifth aspect, correlating the sensor data with the image data comprises: determining first clock data from the image data and second clock data from the sensor data; and associating, in response to the determining, the first clock data with the second clock data.

In another embodiment of the fifth aspect, the sensor data overlaid onto the image data is selected based on the relevance of the sensor data to the motion event.

In another embodiment of the fifth aspect, the user alert is programmed to display as a push-notification on the display of the client device.

In another embodiment of the fifth aspect, the push-notification includes the sensor data and at least one frame from the updated image data.

In another embodiment of the fifth aspect, the sensor data included in the push-notification includes the sensor data most relevant to the motion event.

In another embodiment of the fifth aspect, the method is executed by a hub device in network communication with the A/V recording and communication device and the at least one sensor.

In another embodiment of the fifth aspect, the method is executed by a backend device.

In another embodiment of the fifth aspect, the backend device is a server.

In a sixth embodiment, an audio/video (A/V) recording and communication device, including a processor, a communication module, and a camera receives, by the processor from the at least one sensor in response to a sensor trigger, sensor data representative of the sensor trigger; analyzes, by the processor, the sensor data;

activates, by the processor based on the analyzing the sensor data, the camera to record image data within a field of view of the camera;

correlates, by the processor, the sensor data with the image data to create updated image data; and generates and transmits, by the processor using the communication module, a user alert including the updated image data to a client device associated with the A/V recording a communication device.

In an embodiment of the sixth aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the sixth aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the sixth aspect, the sensor trigger includes at least one of a door opening or closing, a window opening or closing, a temperature exceeding a threshold temperature, carbon monoxide levels exceeding a carbon monoxide threshold level, presence of smoke, a light being turned on or off, detection of motion, and a change in temperature settings at the thermostat.

In a seventh aspect, a method is provided for use with a first audio/video (A/V) recording and communication device having a first camera and a second A/V recording and communication device having a second camera, the method comprising: receiving, from at least one sensor external to the first and second A/V recording and communication devices in response to a sensor trigger, sensor data representative of the sensor trigger; analyzing the sensor data; determining, based on analyzing the sensor data, whether to activate the first camera or the second camera; activating, based on the determination, the first camera to record image data within a field of view of the first camera or the second camera to record image data within a field of view of the second camera; correlating the sensor data with the image data to create updated image data; and generating and transmitting a user alert including the updated image data to a client device associated with the first and second A/V recording a communication devices.

In an embodiment of the seventh aspect, the method is executed by the first A/V recording and communication device.

In another embodiment of the seventh aspect, the method is executed by a hub device in network communication with the first and second A/V recording and communication devices and the at least one sensor.

In another embodiment of the seventh aspect, the method is executed by a backend device.

In another embodiment of the seventh aspect, the backend device is a server.

In another embodiment of the seventh aspect, the at least one sensor includes at least one of a door sensor, a window sensor, a temperature sensor, a carbon monoxide sensor, a smoke alarm, a light sensor, a motion sensor external to the A/V recording and communication device, and a thermostat.

In another embodiment of the seventh aspect, the sensor data includes at least one of a door open/close status, a window open/close status, an indoor/outdoor temperature, a carbon monoxide level, a light on/off status, a fire alarm status, motion data, and a thermostat temperature setting.

In another embodiment of the seventh aspect, the sensor trigger includes at least one of a door opening or closing, a window opening or closing, a temperature exceeding a threshold temperature, carbon monoxide levels exceeding a carbon monoxide threshold level, presence of smoke, a light being turned on or off, detection of motion, and a change in temperature settings at the thermostat.

In another embodiment of the seventh aspect, the determination whether to activate the first or the second camera includes determining which of the first camera or the second camera is in closer proximity to the at least one sensor.

In another embodiment of the seventh aspect, the determination whether to activate the first or the second camera includes determining which of the field of view of the first camera or the field of view of the second camera is more relevant to the sensor trigger.

BRIEF DESCRIPTION OF THE DRAWINGS

The various embodiments of the present informative image data generation using audio/video recording and communication devices now will be discussed in detail with an emphasis on highlighting the advantageous features. These embodiments depict the novel and non-obvious informative image data generation using audio/video recording and communication devices shown in the accompanying drawings, which are for illustrative purposes only. These drawings include the following figures, in which like numerals indicate like parts.

DETAILED DESCRIPTION

Figure 1:
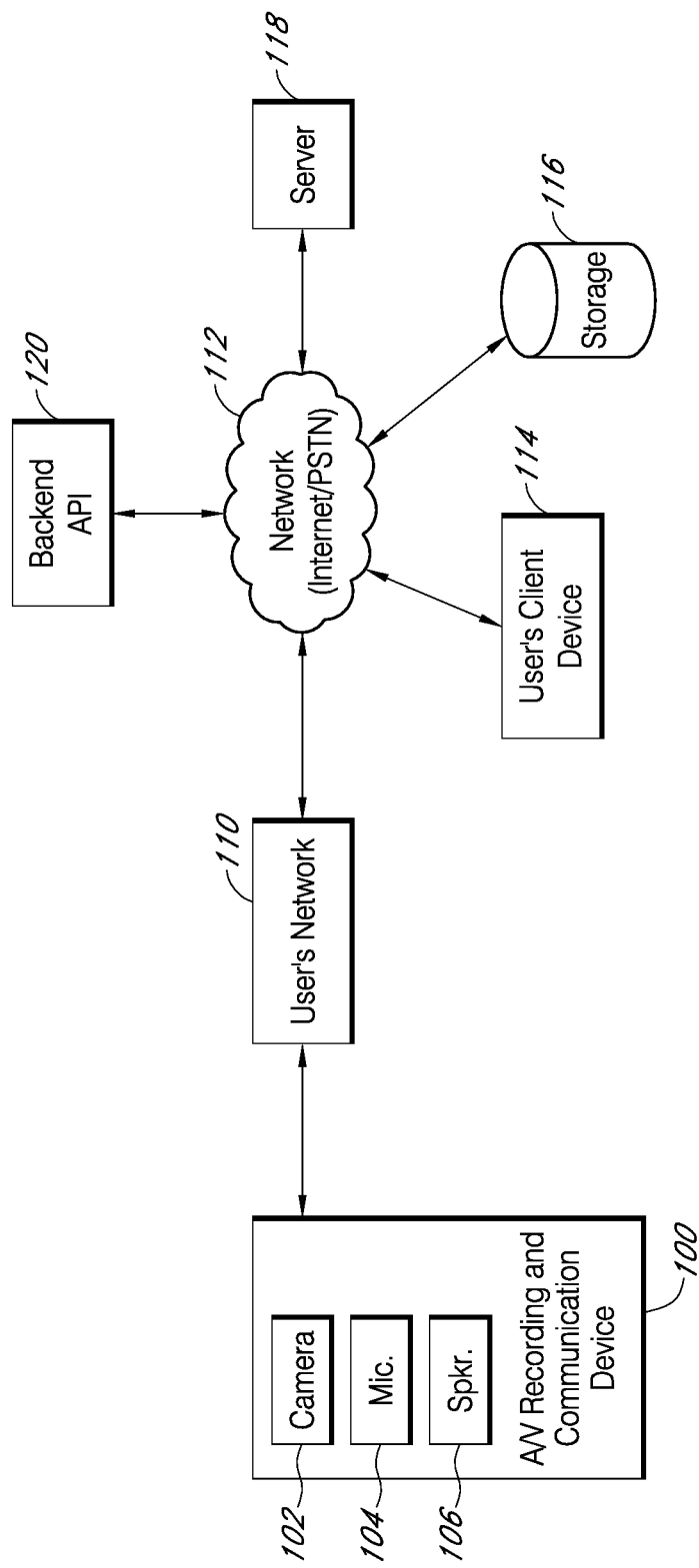
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present streaming and storing video for audio/video recording and communication devices are described below with reference to the figures. These figures, and their written descriptions, indicate that certain components of the apparatus are formed integrally (e.g., a single unitary piece), and certain other components are formed as separate pieces. Components shown and described herein as being formed integrally may in alternative embodiments be formed as separate pieces. Further, components shown and described herein as being formed as separate pieces may in alternative embodiments be formed integrally.

With reference to FIG. 1, the present embodiments include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an. Advanced Intelligent Network (AIN) connection, a synchronous optical network (SONET) connection, a digital T1, T3, E1 or E3 line, a Digital Data Service (DDS) connection, a DSL (Digital Subscriber Line) connection, an. Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite systems (GNSS) (e.g. global positioning system (GPS)), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
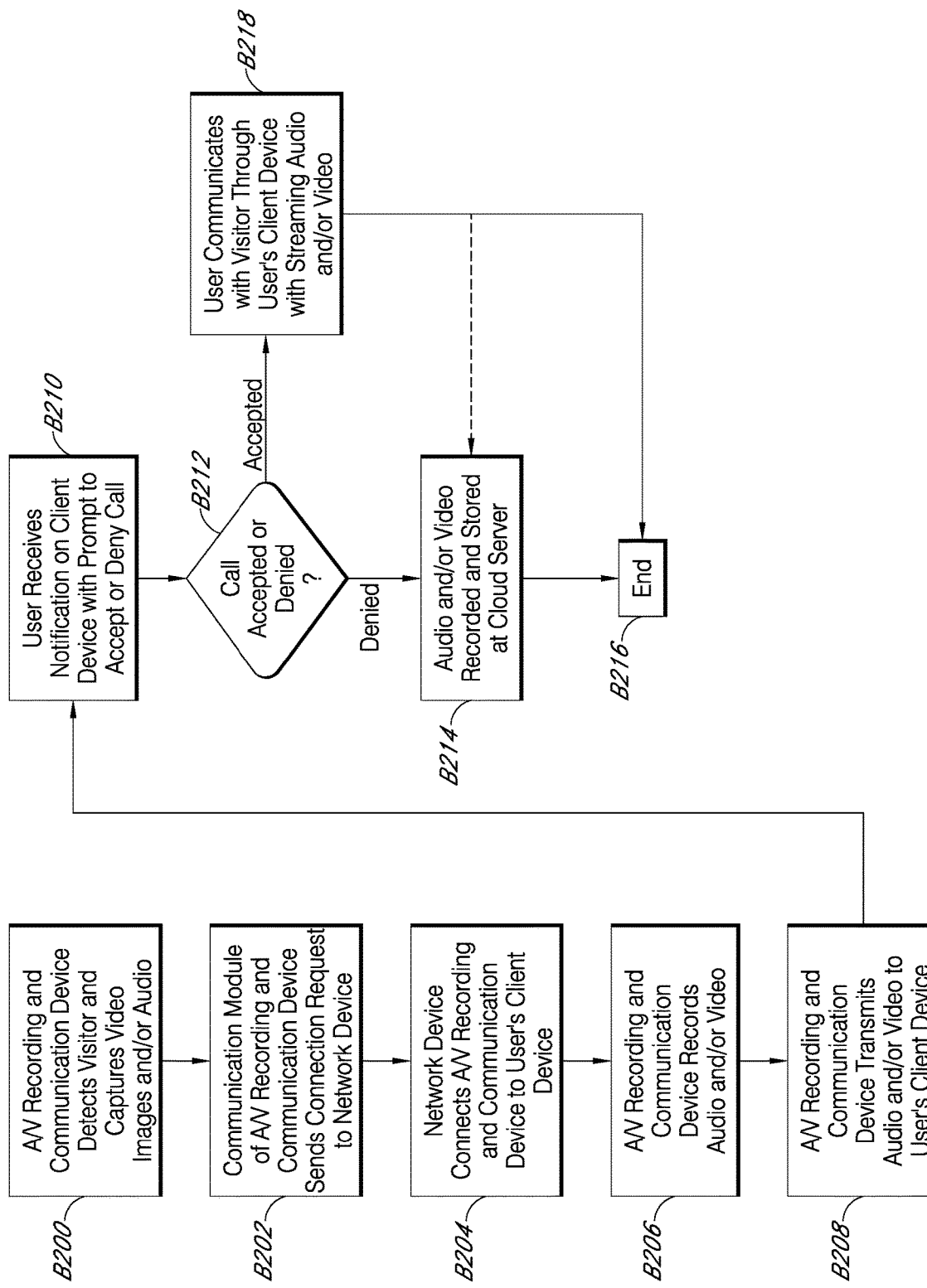
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
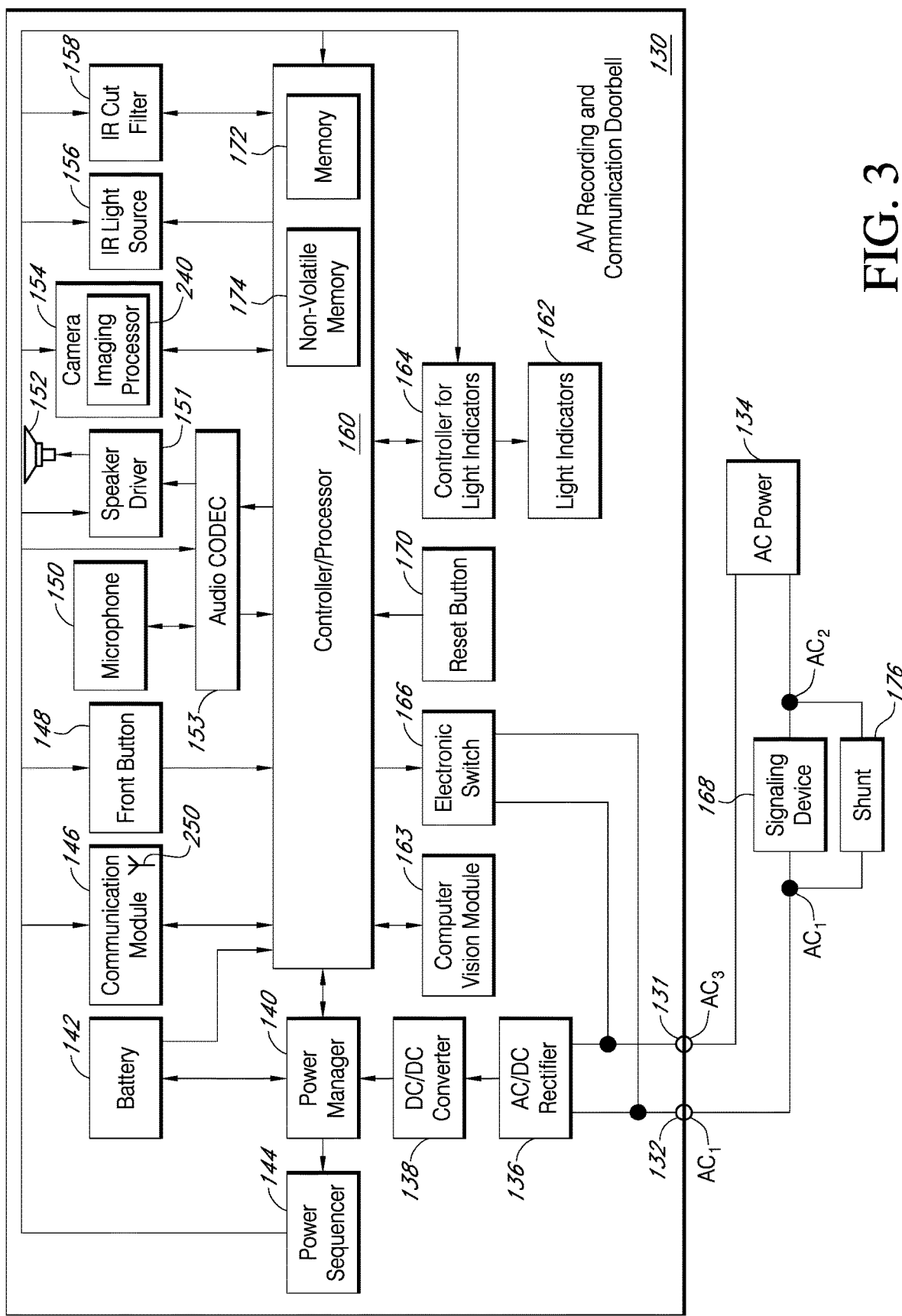
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
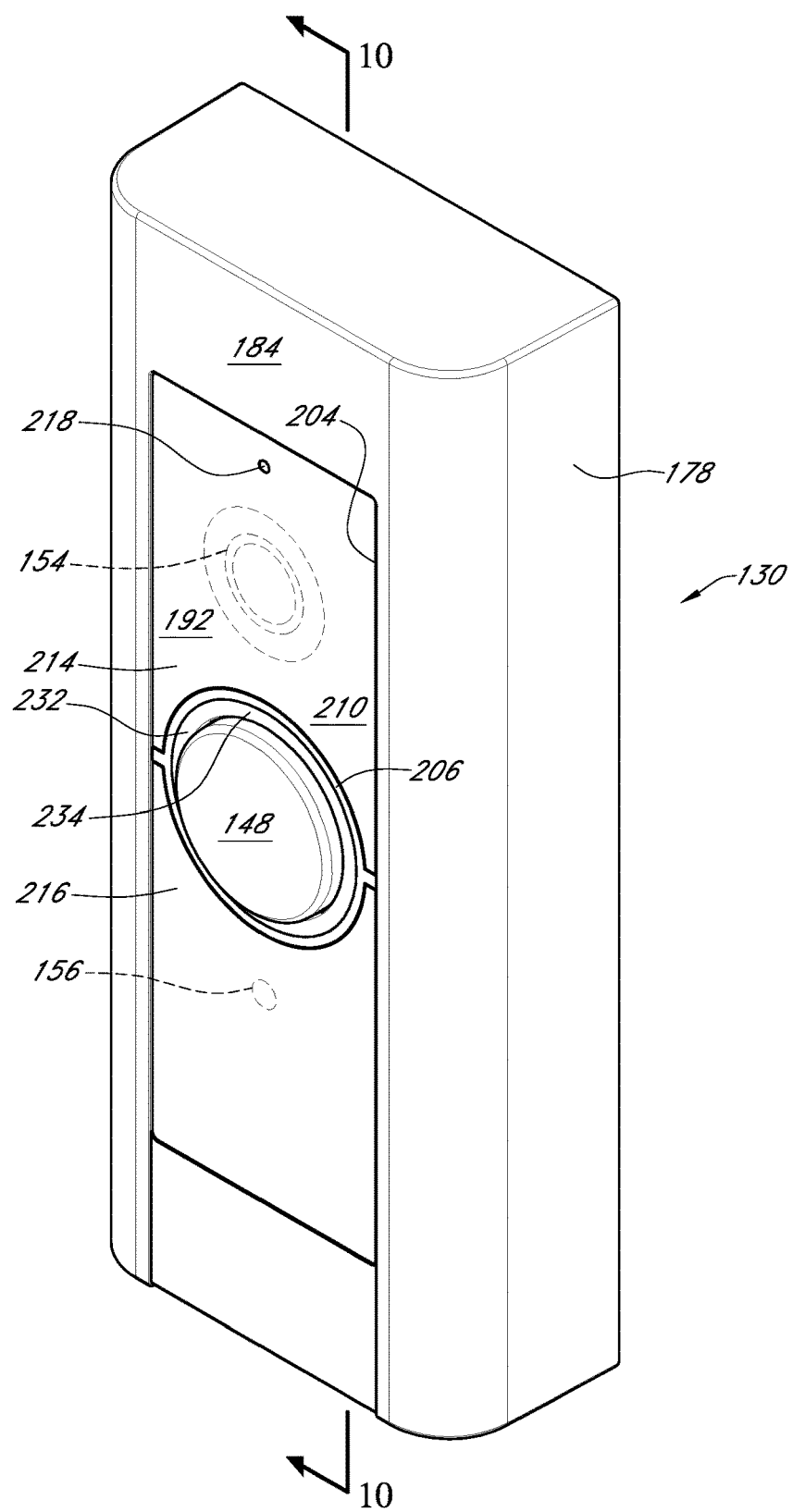
FIG. 4 is a front perspective view of an embodiment of an A/V recording and communication doorbell according to the present disclosure.
Figure 5:
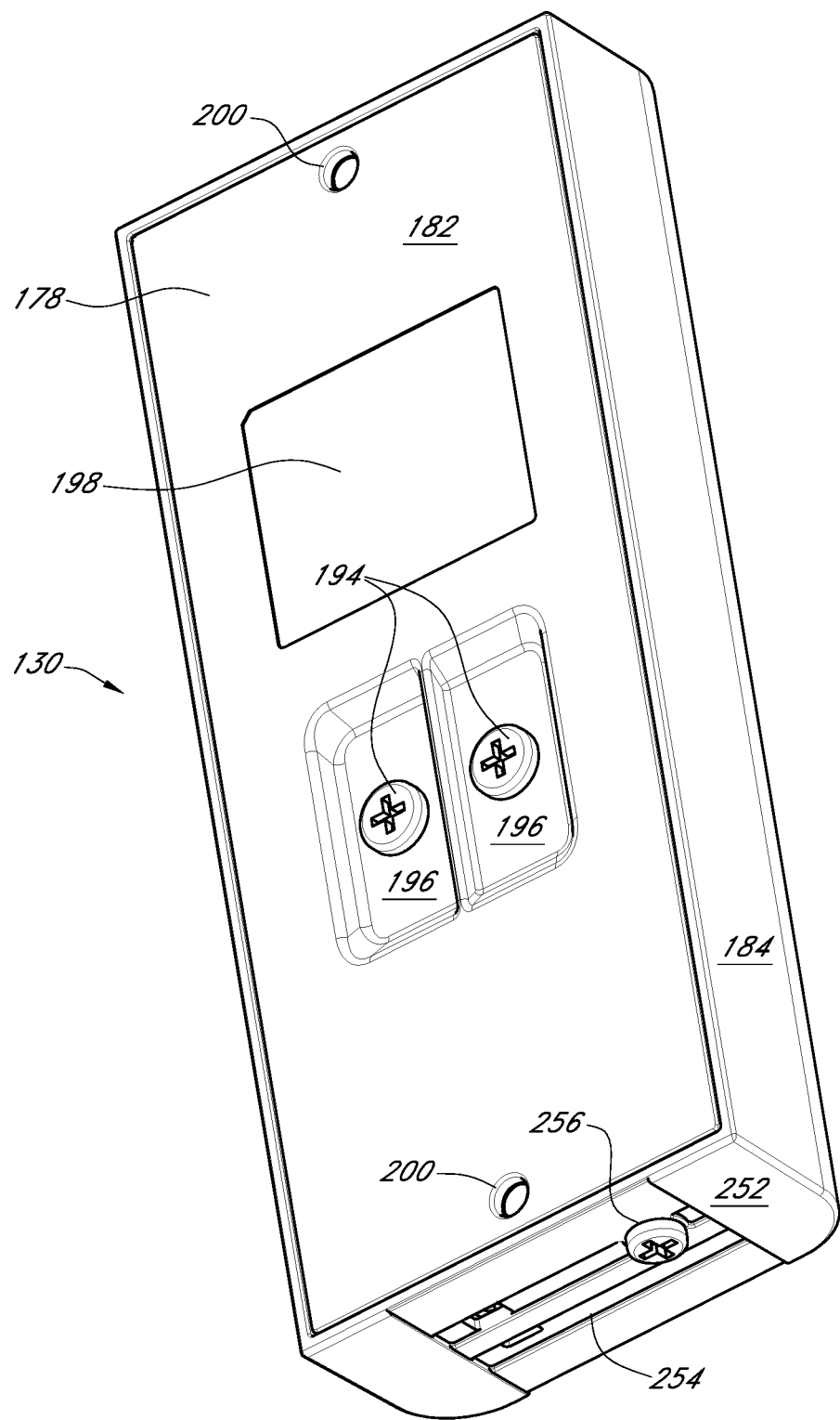
FIG. 5 is a rear perspective view of the A/V recording and communication doorbell of FIG. 4.
Figure 6:
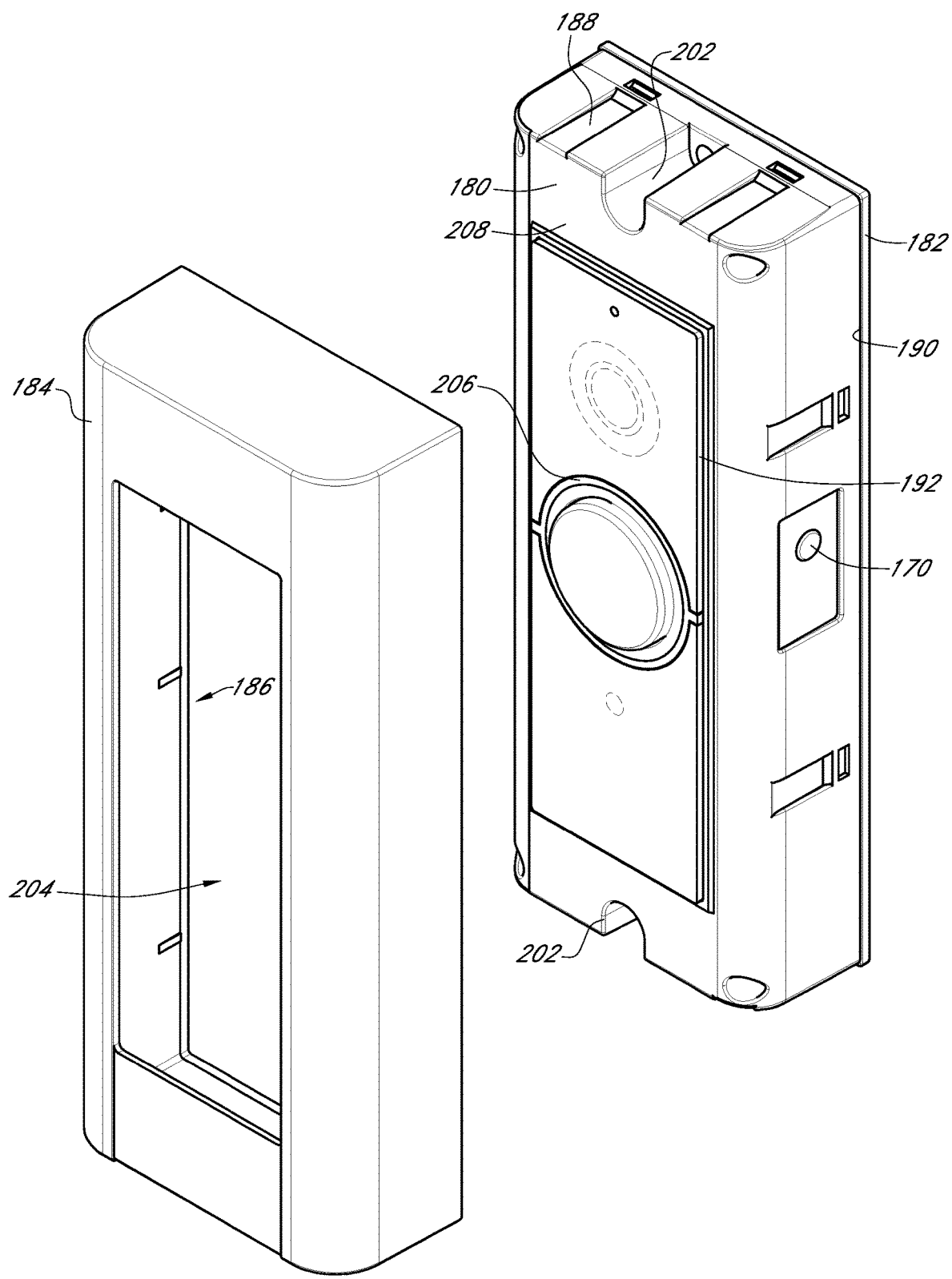
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close-fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
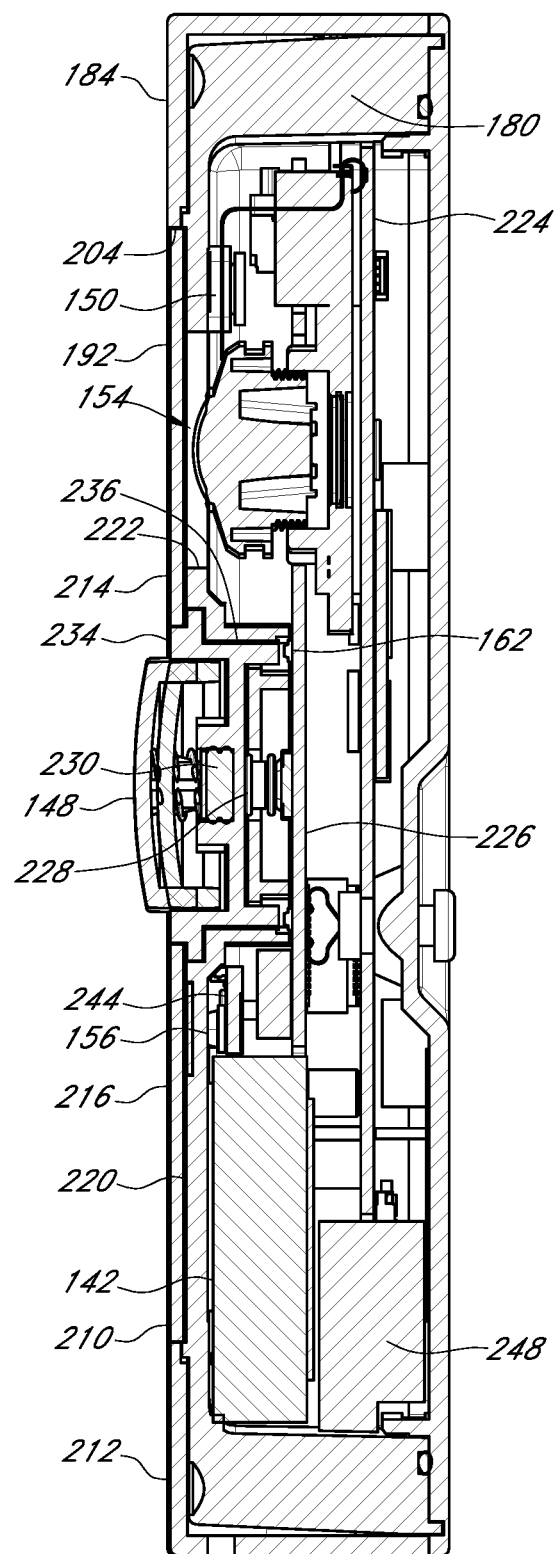
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
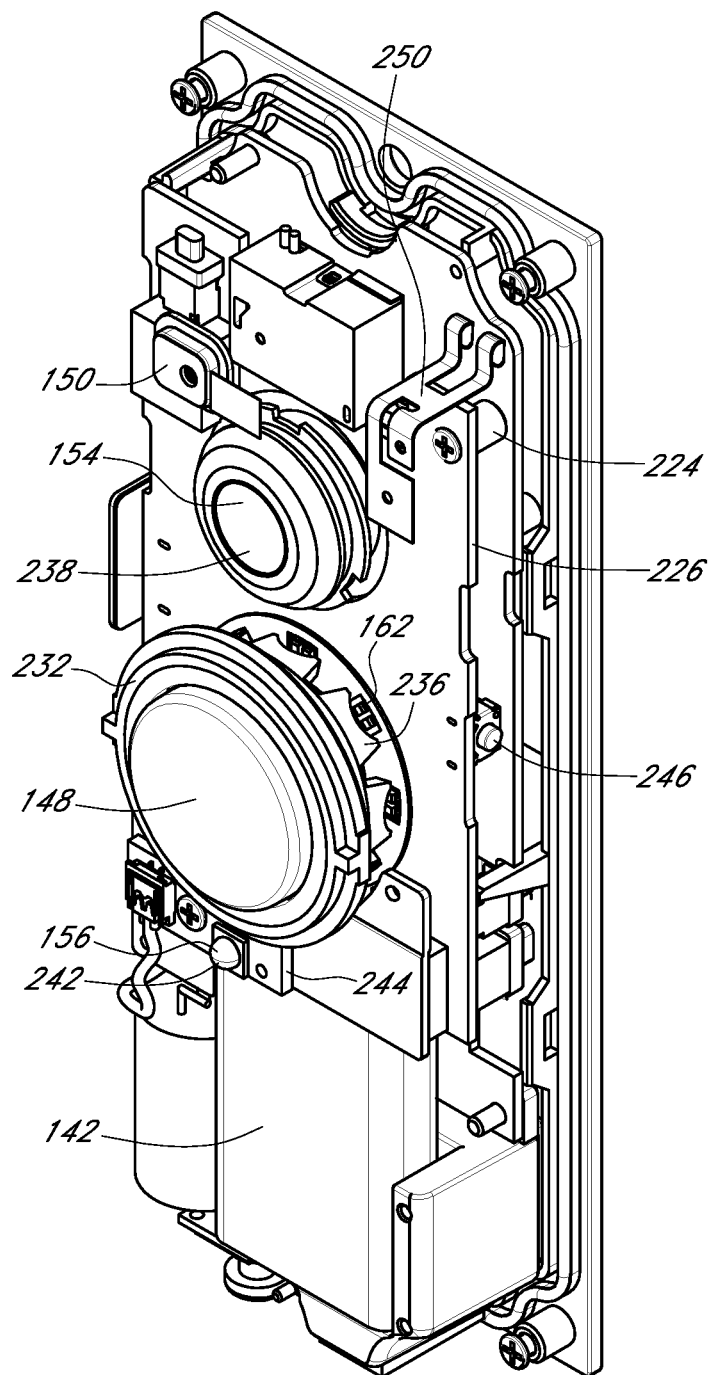
FIGS. 7, 8, and 9 are front perspective views of various internal components of the A/V recording and communication doorbell of FIG. 4.
Figure 8:
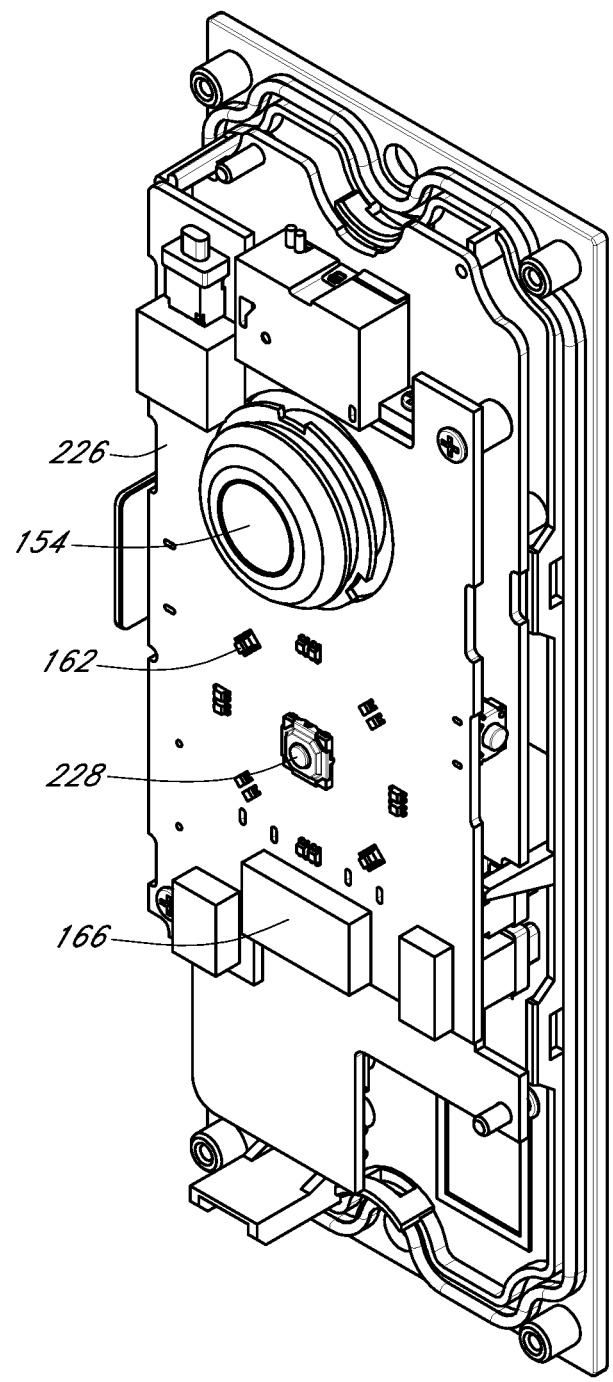
Figure 9:
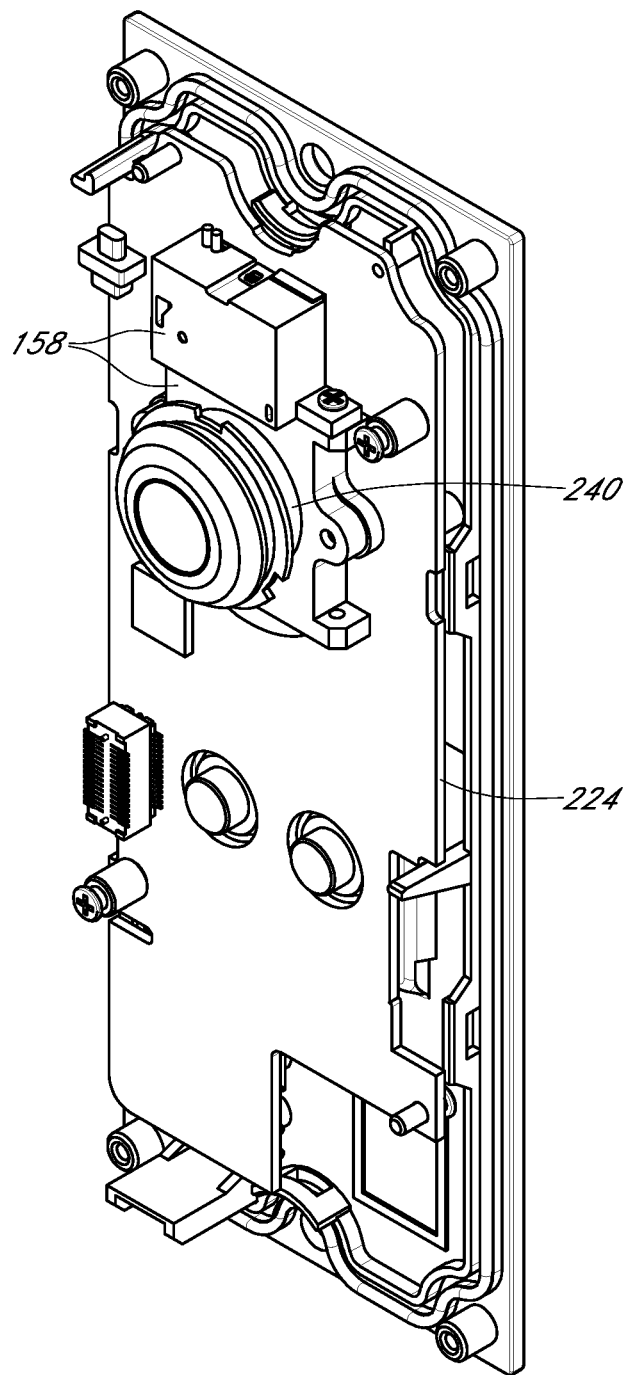

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
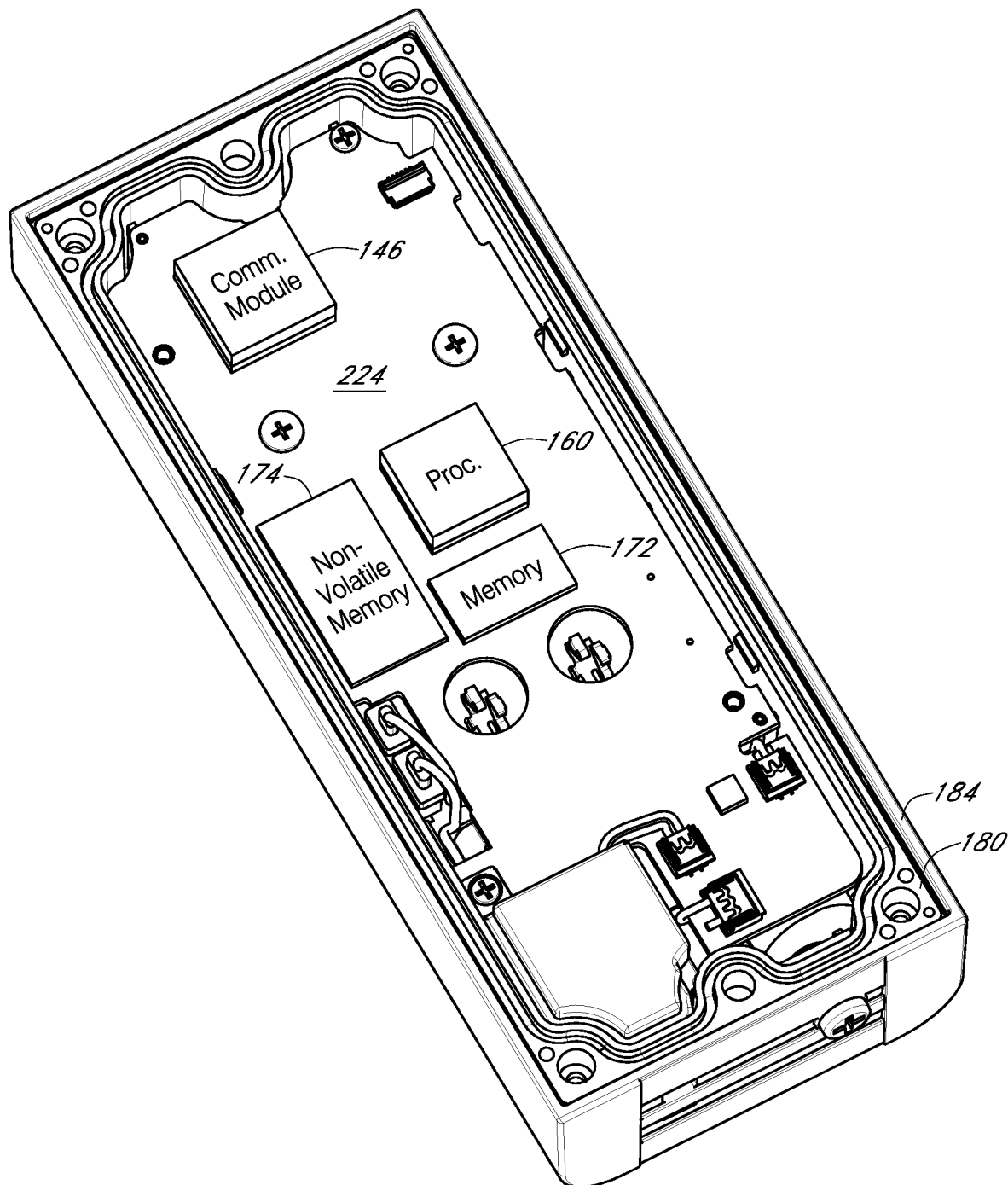
FIGS. 11-13 are rear perspective views of various internal components of the A/V recording and communication doorbell of FIG. 4.
Figure 12:
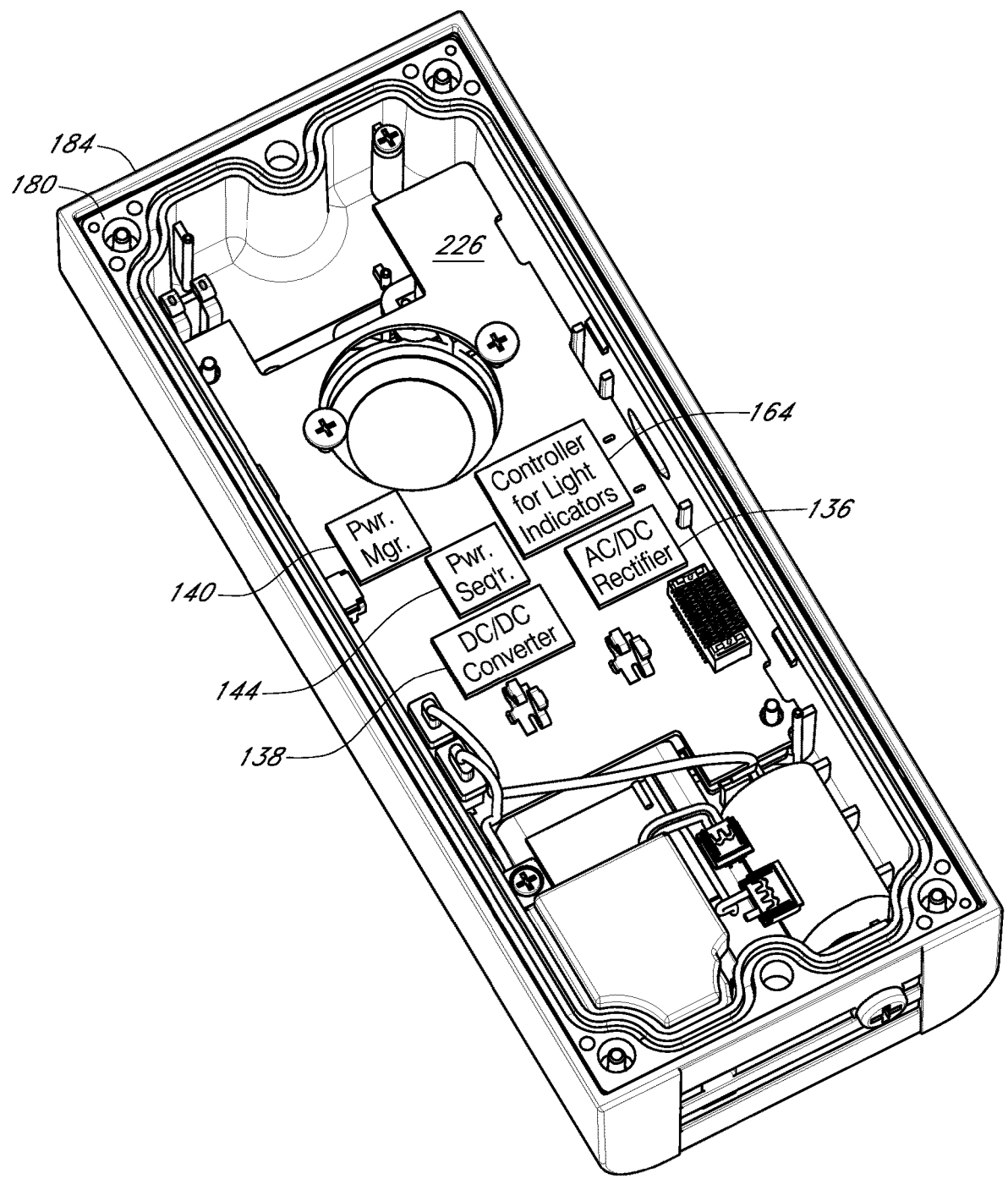
Figure 13:
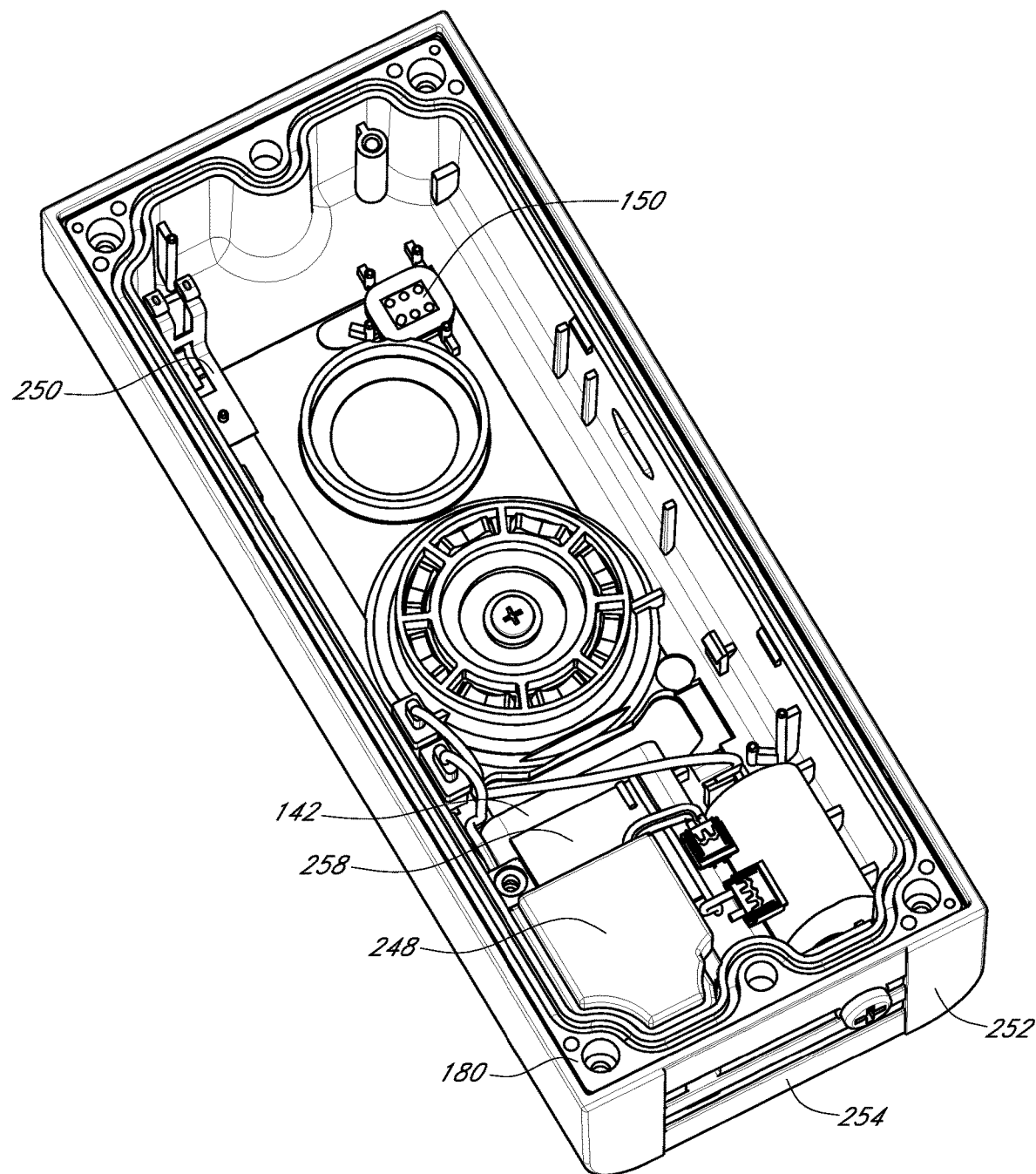

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored, and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 14:
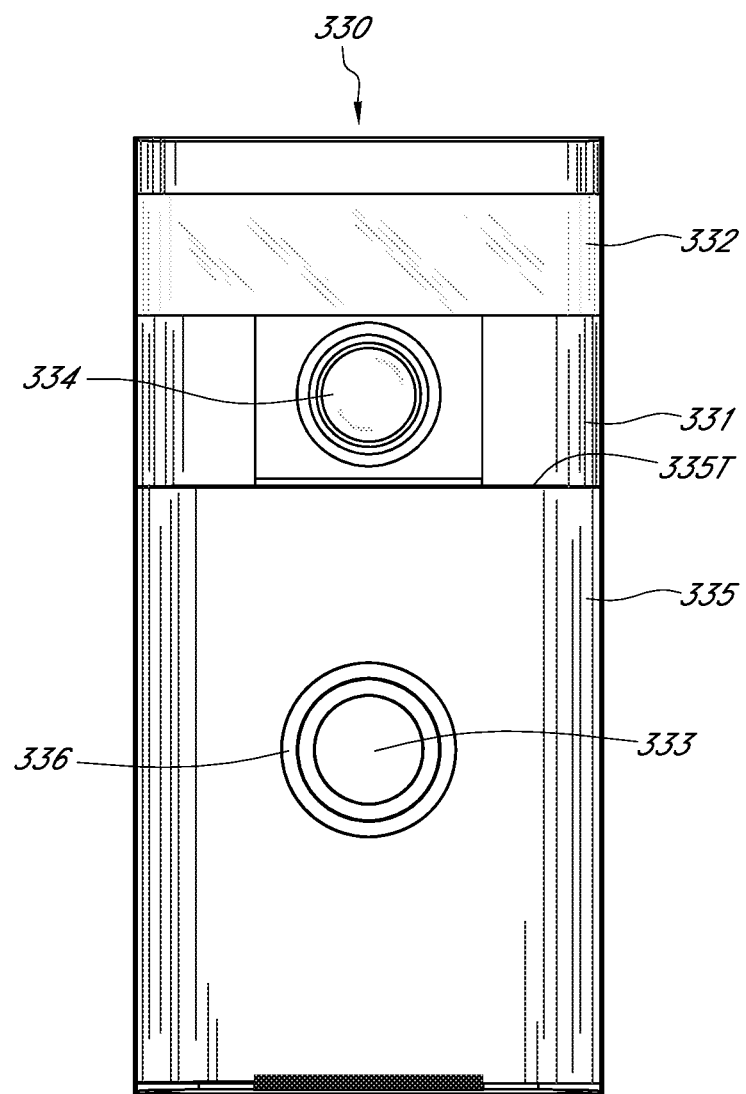
FIG. 14 is a front view of an A/V recording and communication device according to various aspects of the present disclosure.
Figure 15:
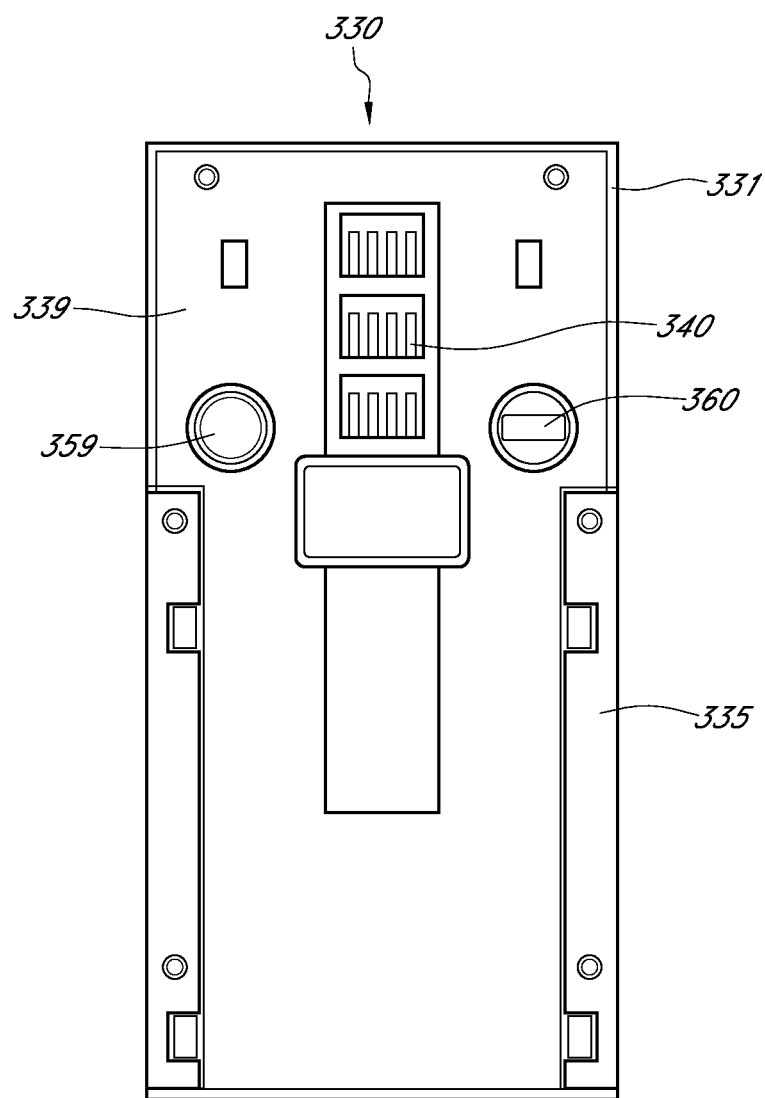
FIG. 15 is a rear view of the A/V recording and communication device of FIG. 14.
Figure 16:
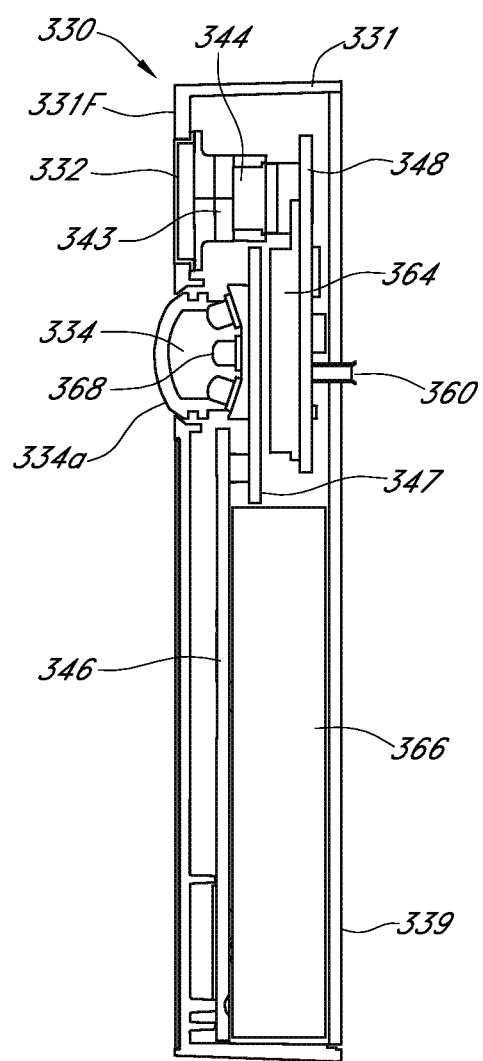
FIG. 16 is cross-sectional right-side view of the A/V recording and communication device of FIG. 14.
Figure 17:
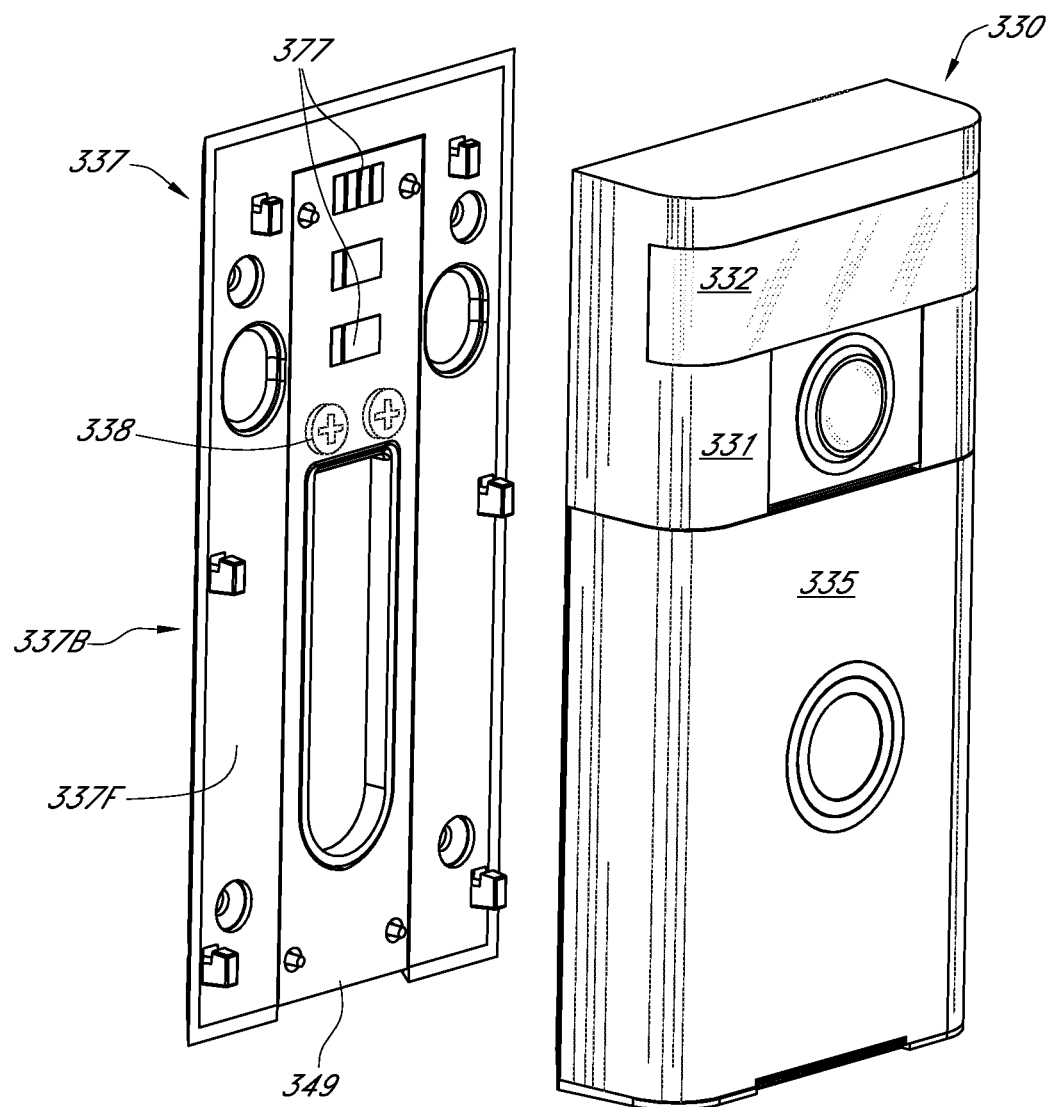
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some embodiments, the doorbell 330 may comprise three PIR sensors 344, as further described below, but in other embodiments any number of PIR sensors 344 may be provided. In some embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
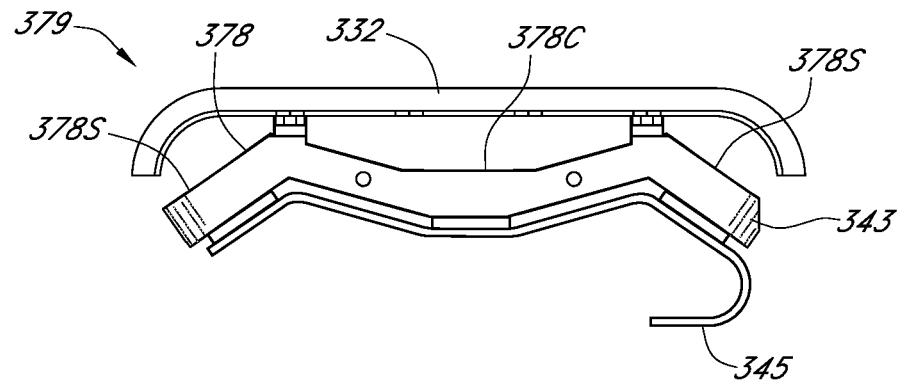
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
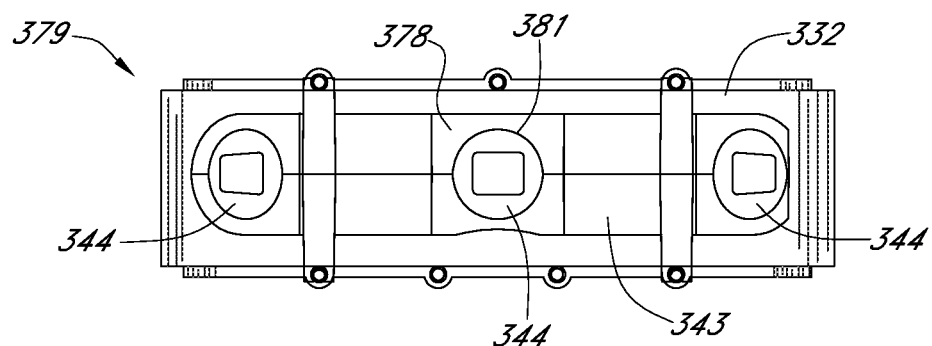
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
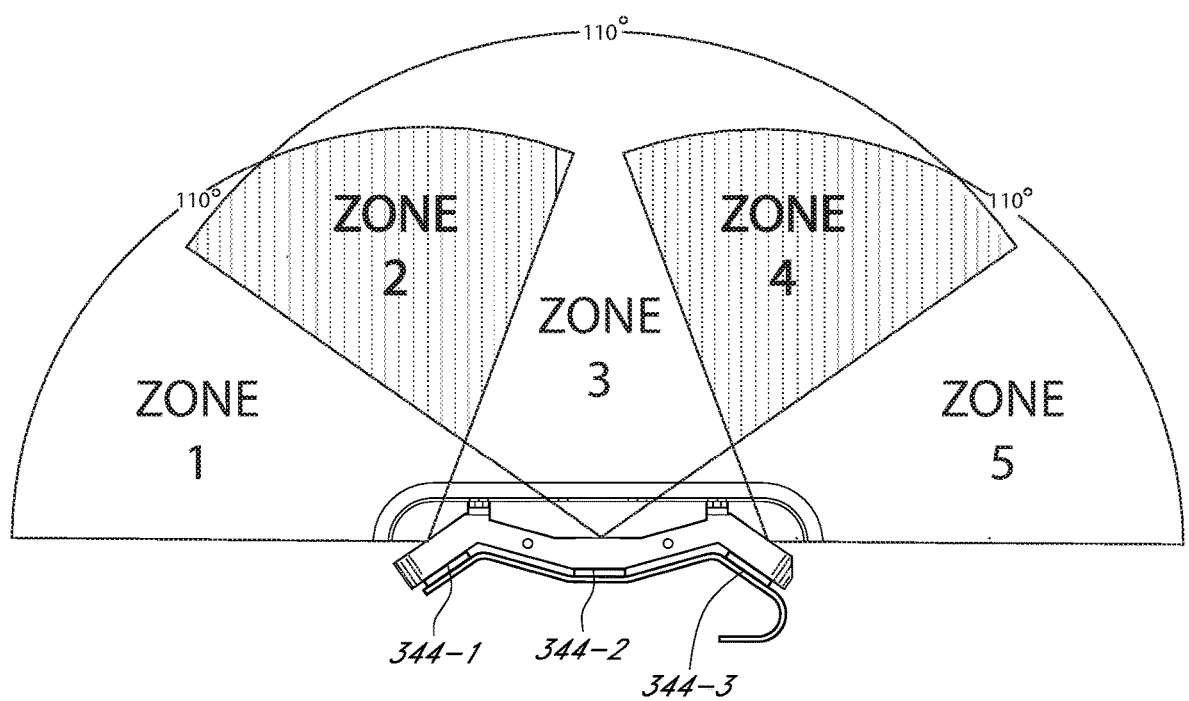
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 21:
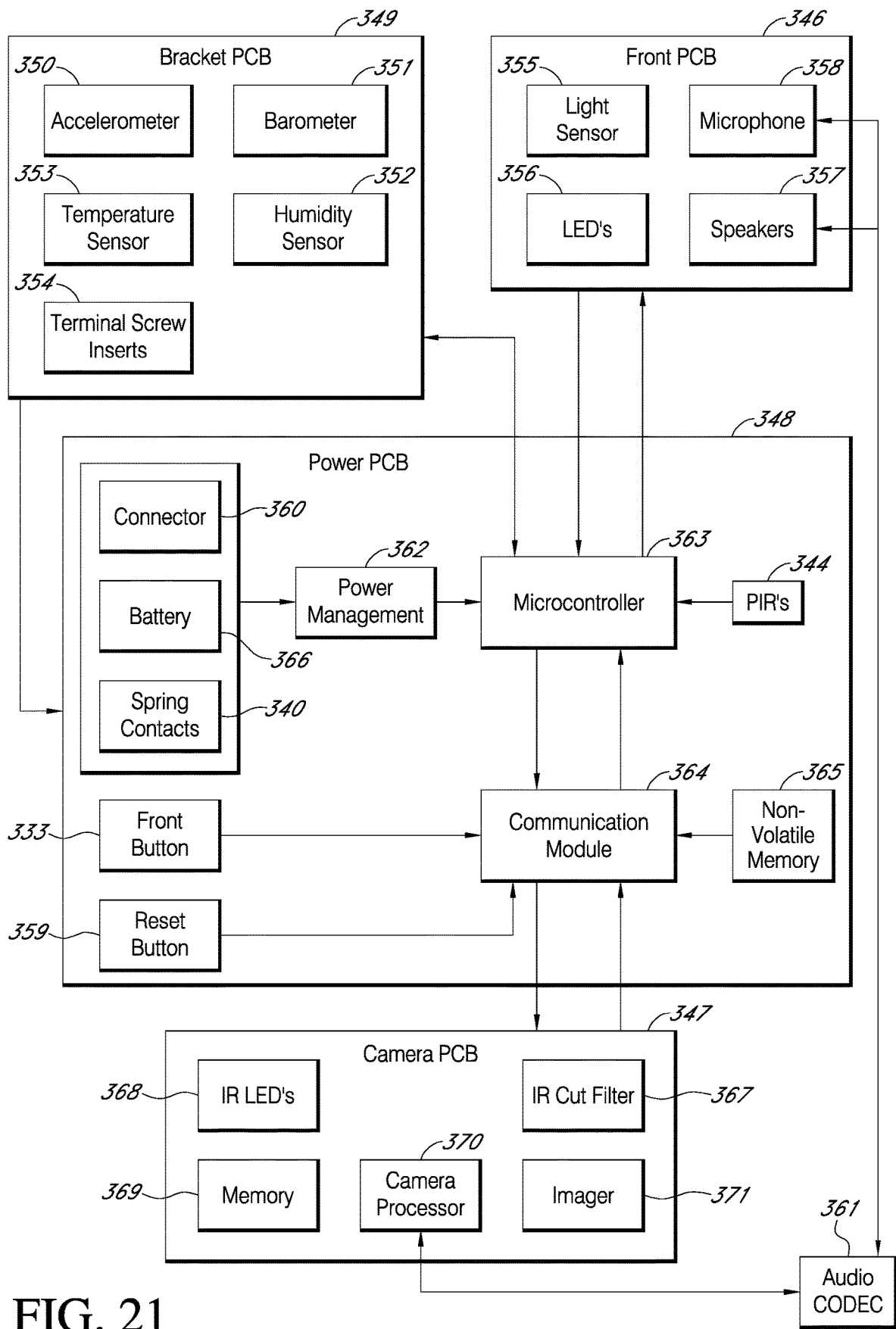
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication doorbell 130 may include a computer vision module 163. The computer vision module 163 may include any of the components (e.g. hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

One aspect of the present embodiments includes the realization that more and more homes include networks of smart devices. However, accessing information generated by each of the smart devices is sometimes not as efficient as desired. For example, accessing information from different smart devices sometimes requires opening multiple applications or multiple tabs within a single application. In such an example, such as in a scenario where information from multiple smart devices may be helpful if viewed in concert (e.g., during a home burglary attempt), video from a surveillance camera may need to be accessed in one location while door lock/unlock status information may need to be accessed in a second location. The present embodiments solve this problem by leveraging the functionality of A/V recording and communication devices, such as A/V recording and communication doorbells, and other networked devices, such as door and window sensors, to provide information in a more easily digestible form. By providing the information in a more digestible form, homeowners may be able to make more informed and efficient decisions based on the information, such as to alert law enforcement, sound an alarm, and/or notify neighbors, for example. Ultimately, because homeowners may be able to make more informed and efficient decisions, the safety and security of the homeowner, other residents of the home, property within the home, and the neighborhood, may all be increased, thereby enhancing public safety by providing safer and more secure homes and neighborhoods.

For example, some of the present embodiments detect, by an A/V recording and communication device, a motion event in the field of view of the A/V recording and communication device. In response to detecting the motion event in the field of view of the A/V recording and communication device, the processor may activate a camera to record image data of the motion event within a field of view of the camera. The processor may then receive, from at least one sensor, sensor data and correlate the sensor data with the image data to create updated image data. A user alert including the updated image data may then be generated and transmitted, by the processor using a communication module, to a client device associated with the A/V recording a communication device.

Figure 22:
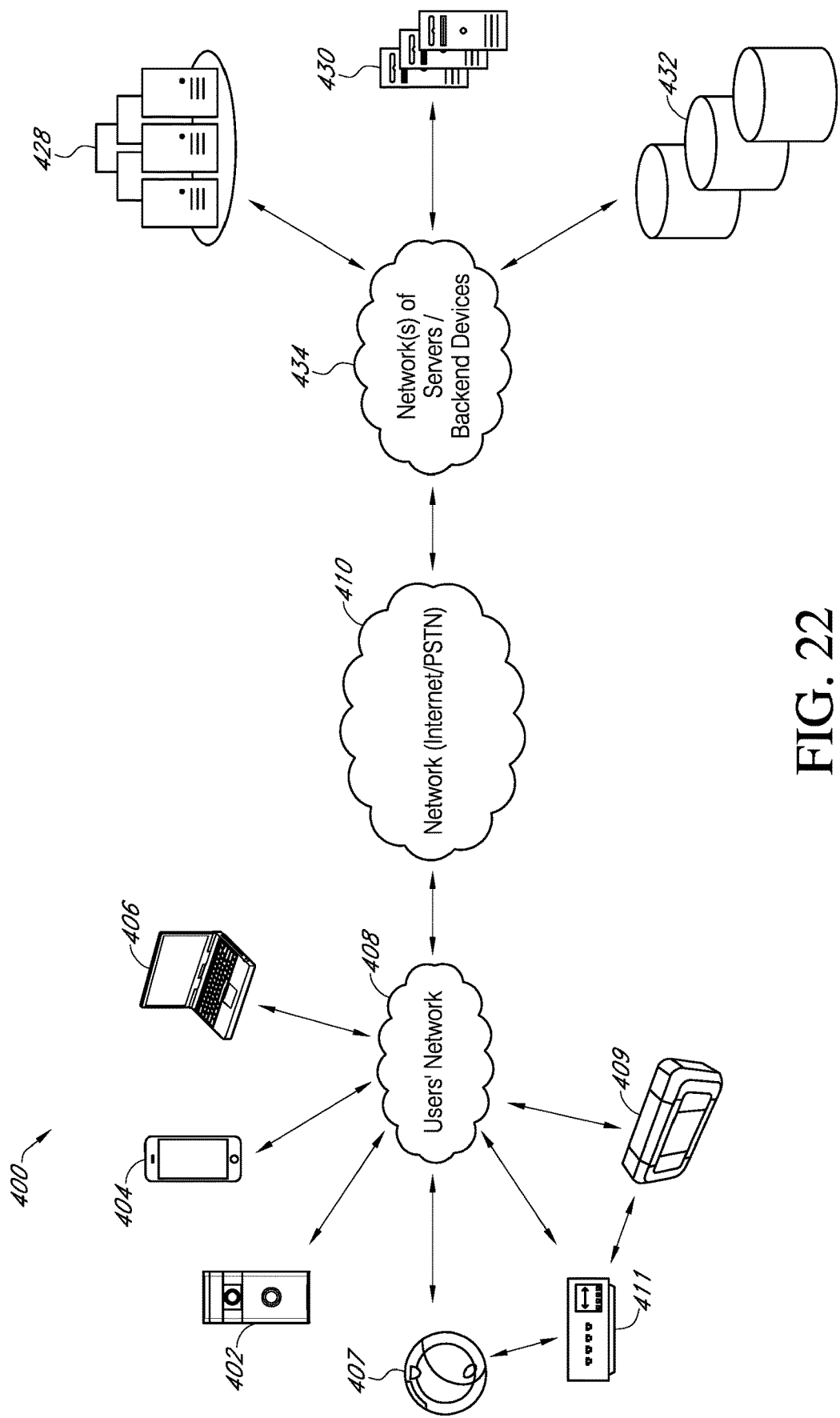
FIG. 22 is a is a functional block diagram illustrating a system for communicating in a network according to various aspects of the present disclosure.

FIG. 22 is a functional block diagram illustrating a system 400 for communicating in a network according to various aspects of the present disclosure. The system 400 may include one or more audio/video (A/V) recording and communication devices 402 configured to access a user's network 408 to connect to a network (Internet/PSTN) 410. The one or more A/V recording and communication devices 402 may include any or all of the components and/or functionality of the A/V recording and communication device 100 (FIGS. 1-2), the A/V recording and communication doorbell 130 (FIGS. 3-13), and/or the A/V recording and communication doorbell 330 (FIGS. 14-21). As discussed herein, the present disclosure provides numerous examples of methods and systems including A/V recording and communication devices 402, such as A/V recording and communication doorbells, but the present embodiments are equally applicable for A/V recording and communication devices 402 other than doorbells. For example, the present embodiments may include one or more A/V recording and communication security cameras and/or A/V recording and communication security floodlights instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

The user's network 408 may include any or all of the components and/or functionality of the user's network 110 described herein. The system 400 may also include one or more client devices 404, 406, which in various embodiments may be configured to be in network communication and/or associated with the A/V recording and communication device 402. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 and/or the client device 800 described herein. In some embodiments, the client devices 404, 406 may not be associated with the A/V recording and communication device 402. In other words, the user/owner of the client device(s) 404, 406 may not also use/own a A/V recording and communication device 402.

The system 400 may also include one or more sensors 407, 409, which in various embodiments may be configured to be in network communication with the A/V recording and communication device 402. The sensors 407, 409 may comprise, for example, at least one of a door sensor, a window sensor, a tilt sensor, a temperature sensor, a carbon monoxide sensor, a smoke detector, a light sensor, a motion sensor, and a thermostat. The system 400 may further include a smart-home hub device 411 connected to the user's network 408. The smart-home hub device 411 (also known as a home automation hub), may comprise any device that facilitates communication with and control of the sensors 407, 409 and/or the A/V recording and communication device 402. For example, the smart-home hub device 411 may be a component of a home automation system. Home automation, or smart home, is building automation for the home. It involves the control and automation of various devices and/or systems, such as lighting, heating (such as smart thermostats), ventilation, air conditioning (HVAC), and security, as well as home appliances, such as washers/dryers, ovens, or refrigerators/freezers. Wi-Fi is often used for remote monitoring and control. Smart home devices, when remotely monitored and controlled via the Internet, may be considered to be components of the Internet of Things. Smart home systems may include switches and/or sensors connected to a central hub such as the smart-home hub device 411, sometimes called a gateway, from which the system may be controlled with a user interface. The user interface may include any or all of a wall-mounted terminal, mobile phone (e.g., smartphone) software, a tablet computer or a web interface, often but not always via Internet cloud services. The home automation system may use one or more communication protocols, including either or both of wired and wireless protocols, including but not limited to X10, Ethernet, RS-485, 6LoWPAN, Bluetooth LE (BLE), ZigBee, and Z-Wave. As shown in FIG. 22, the sensors 407, 409 may communicate with the smart-home hub device 411 directly and/or indirectly via the user's network 408. Though not shown in FIG. 22, the A/V recording and communication device 402 may similarly communicate with the smart-home hub device 411 directly and/or indirectly via the user's network 408.

With further reference to FIG. 22, the system 400 may also include various backend devices such as (but not limited to) storage devices 432, backend servers 430, and backend APIs 428 that may be in network communication with the A/V recording and communication device 402, the client devices 404, 406, and/or the sensors 407, 409. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

Figure 23:
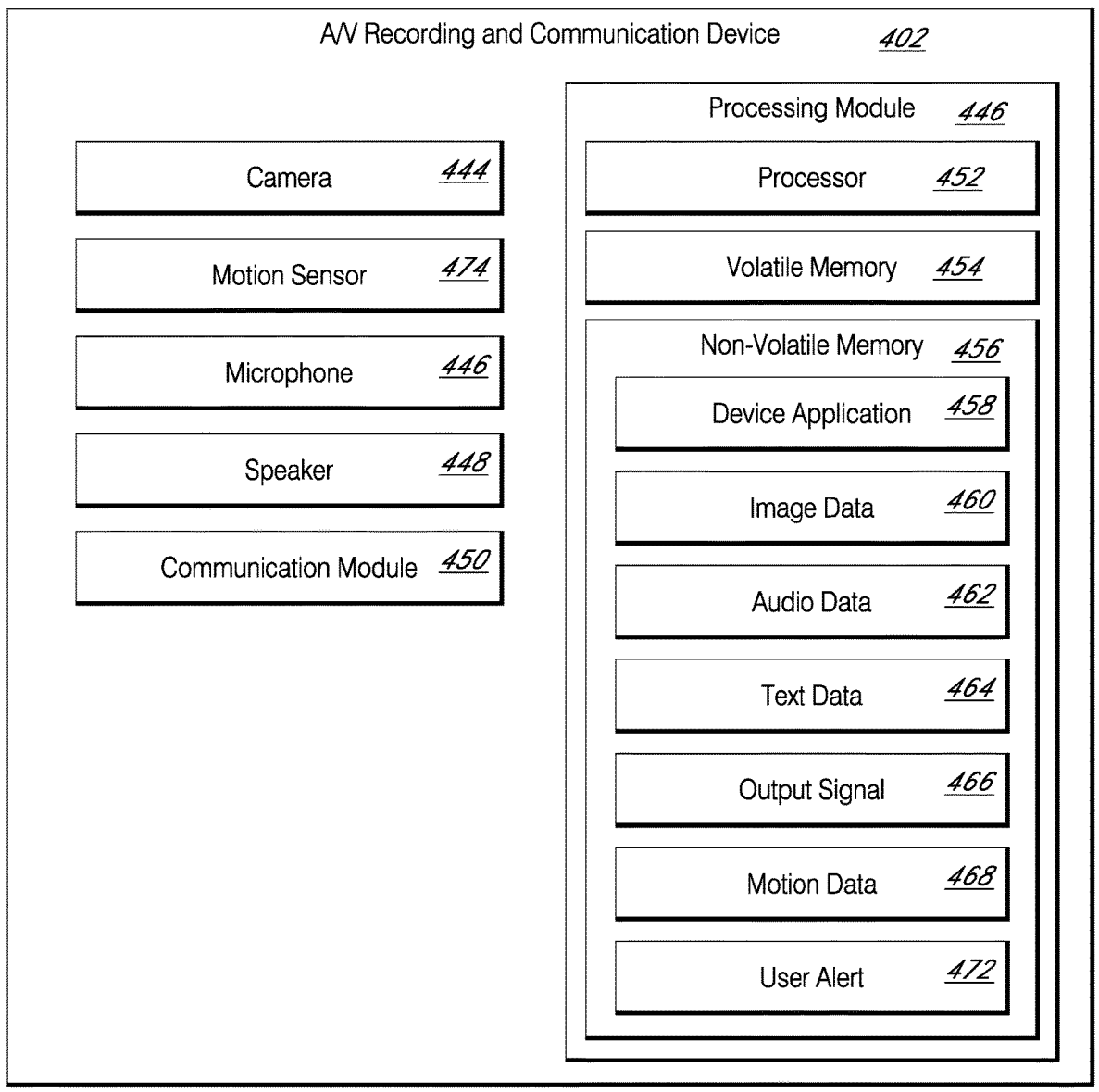
FIG. 23 is a functional block diagram illustrating one embodiment of an A/V recording and communication device according to various aspects of the present disclosure.

FIG. 23 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, and/or motion data 468 using at least one of the camera 444 or the motion sensor 474. In some embodiments, the device application 458 may also configure the processor 452 to generate text data 464 describing the image data 460, such as in the form of metadata, for example. In other embodiments, the text data 464 describing the image data 460 may be generated by a user using the client device 404, 406 associated with the A/V recording and communication device 402. In addition, the device application 458 may configure the processor 452 to transmit the image data 460, the audio data 462, the motion data 468 and/or the text data 464 to the client device 404, 406 using the communication module 450. In various embodiments, the device application 458 may also configure the processor 452 to generate and transmit an output signal 466 that may include the image data 460, the audio data 462, the text data 464, and/or the motion data 468. In some of the present embodiments, the output signal 466 may be transmitted to the backend server(s) 430 using the communication module 450, and the backend server 430 may transmit the output signal 466 to the client device 404, 406. In other embodiments, the output signal 466 may be transmitted directly to the client device 404, 406. In still further embodiments, the output signal 466 may be transmitted to the smart-home hub device 411, which may forward the information in the output signal 466 to the client device 404, 406 and/or to the backend server 430, which may further transmit the information in the output signal 466 to the client device 404, 406.

In further reference to FIG. 23, the image data 460 may comprise image sensor data such as (but not limited to) exposure values and data regarding pixel values for a particular sized grid. Further, the image data 460 may comprise converted image sensor data for standard image file formats such as (but not limited to) JPEG, JPEG 2000, TIFF, BMP, or PNG. In addition, the image data 460 may also comprise data related to video, where such data may include (but is not limited to) image sequences, frame rates, and the like. Moreover, the image data 460 may include data that is analog, digital, compressed, uncompressed, and/or in vector formats.

In some of the present embodiments, the image data 460 may also include facial recognition, facial detection, biometric, and/or other information about the persons and/or objects in the image data 460. The facial recognition, facial detection, biometric, and/or other information may be generated in response to using facial recognition software, facial detection software, and/or biometric analysis software, for example, as described above. The facial recognition, facial detection, biometric, and/or other information may be included in the image data 460 for analysis in some of the present embodiments.

The image data 460 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 23, the motion data 468 may comprise motion sensor data generated in response to motion events. For example, in embodiments using a motion sensor 474, the motion data 468 may include an amount or level of a data type generated by the motion sensor 474. For example, in embodiments that use PIRs, the motion data 468 may include voltage data generated by the motion sensor 474 in response to the presence of infrared radiation. In some of the present embodiments, the motion data 468 may also comprise time-based and/or location-based information such as the amount of time a motion event is detected and/or the location of the motion event in the field of view of the motion sensor 474 (e.g., Zones 1-5 (FIG. 20), the location within one of the Zones 1-5, and/or the proximity to the motion sensor 474). For example, in embodiments that use PIRs, the motion data 468 may include the amount of time an increase in voltage is detected based on the presence of infrared radiation indicative of a motion event. In other embodiments, dependent on the type of motion sensor 474 implemented in a given embodiment, the motion data 468 may include the data type (e.g., voltage) generated specific to the type of motion sensor 474 (e.g., PIR, microwave, acoustic, etc.).

The motion data 468 may further include an estimated speed and/or direction data of the person and/or object that caused the motion event. For example, the motion data 468 may include an estimated speed of a person and/or object passing in a field of view of the motion sensor 474. For another example, the motion data 468 may include a direction that a person and/or object in front of the motion sensor 474 is traveling, such as toward or away from the A/V recording and communication device 402.

In some of the present embodiments, such as those where the A/V recording and communication device is similar to that of the A/V recording and communication doorbell 130 of FIGS. 3-13, the motion data 468 may be generated by the camera 444. In such embodiments, the A/V recording and communication device 402 may not have a motion sensor 474. As such, the detection of a motion event, the determination of whether a motion event is caused by the movement of a person in a field of view of the A/V recording and communication device 402, and/or the speed and/or location of a person and/or object in the field of view of the A/V recording and communication device 402 may be determined using the motion data 468 generated by the camera 444. In such embodiments, the motion data 468 may include differences between successive frames of the image data 460, where the differences may be the result of motion in the field of view of the camera 444.

Figure 24:
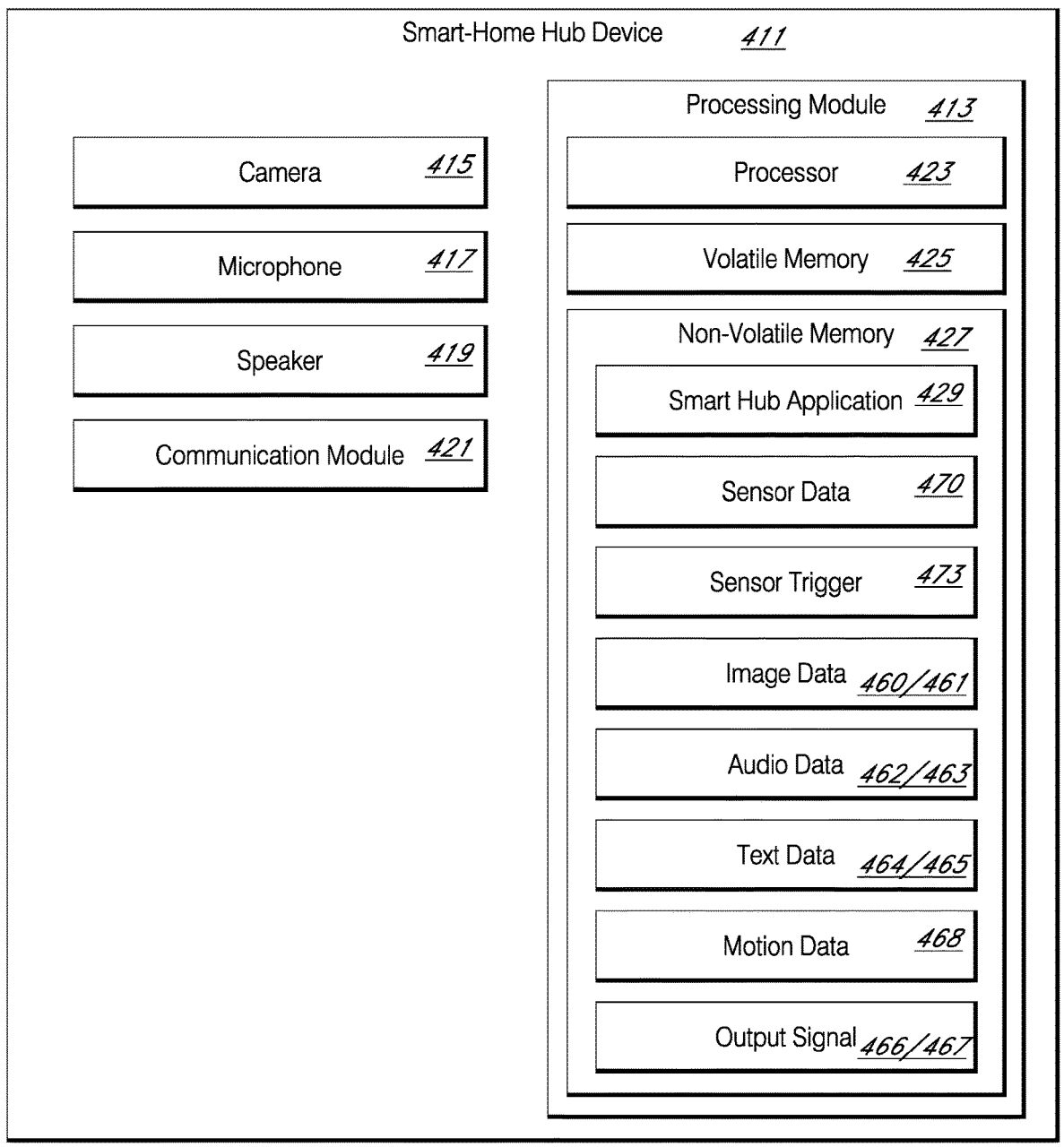
FIG. 24 is a functional block diagram illustrating one embodiment of a smart-home hub device according to various aspects of the present disclosure.

FIG. 24 is a functional block diagram illustrating an embodiment of the smart-home hub device 411 according to various aspects of the present disclosure. The smart-home hub device 411 may be, for example, one or more of a Wi-Fi hub, a smart-home hub, a hub of a home security/alarm system, and so on. The smart-home hub device 411 may comprise a processing module 413 that is operatively connected to a camera 415, a microphone 417, a speaker 419, and a communication module 421. In some embodiments, either or both of the camera 415 and the microphone 417 may be omitted from the smart-home hub device 411. The processing module 413 may comprise a processor 423, volatile memory 425, and non-volatile memory 427 that includes a smart-home hub application 429. In various embodiments, the smart-home hub application 429 may configure the processor 423 to receive sensor data 470 from the sensors 407, 409. For example, the sensor data 470 may include a current state of each of the sensors 407, 409. In various embodiments, the smart-home hub application 429 may further configure the processor 423 to capture image data 461 using the camera 415 and/or audio data 463 using the microphone 446. In some embodiments, the smart-home hub application 429 may also configure the processor 423 to generate text data 465 describing the image data 461, such as in the form of metadata, for example. In other embodiments, the text data 465 describing the image data 461 may be generated by a user using the client device 404, 406 associated with the smart-home hub device 411. In addition, the smart-home hub application 429 may configure the processor 423 to receive the image data 460, the audio data 462, the text data 464, the motion data 468, and/or the user alert 472 from the A/V recording and communication device 402 using the communication module 421. In various embodiments, the smart-home hub application 429 may also configure the processor 423 to generate and transmit an output signal 467 that may include the image data 460/461, the audio data 462/463, the text data 464/465, the motion data 468, the sensor data 470, the user alert 472, and/or the sensor trigger 473 data. In some of the present embodiments, the output signal 467 may be transmitted to the backend server(s) 430 using the communication module 421, and the backend server 430 may transmit the output signal 467 to the client device 404, 406. In other embodiments, the output signal 467 may be transmitted directly to the client device 404, 406.

In further reference to FIG. 24, the sensor data 470 from the sensors 407, 409 may include a door open/close status from a door sensor (e.g., located at a front door, a side door, a back door, a door inside the home, etc.), a window open/close status from a window sensor, a garage door open/close status from a tilt sensor, an indoor/outdoor temperature from a thermometer or other temperature sensing device, a carbon monoxide level from a carbon monoxide sensor, a light on/off status from a light sensor, a fire alarm status from a fire alarm, motion data from a motion sensor, a humidity level from a humidity sensor, weather information from a home weather station, and a thermostat temperature setting from a thermostat. The sensor data 470 may be generated in response to a sensor trigger (e.g., a door opening, a window shutting, etc.), or may be consistently and/or periodically generated to determine a status of the sensor 407, 409 and whether or not the status is indicative of a sensor trigger 473 (e.g., a temperature above/below a threshold temperature).

With further reference to FIG. 24, the sensor trigger 473 may be an event and/or action that takes place that causes the sensor 407, 409 to generate sensor data 470. In response to sensor triggers 473, sensor data 470 may be generated by the sensor 407, 409 representative of the sensor trigger 473. The sensor data 470 generated in response to a sensor trigger 473 may be analyzed by the smart-home hub device 411 to determine if the camera 415 (or the camera(s) of any other connected devices, such as the camera 444 of the A/V recording and communication device 402) should be activated, for example. Sensor data 470 generated in response to sensor triggers 473 may also be included in the updated image data 460/461, as described in more detail below.

Some non-limiting examples of sensor triggers 473 include, for example, if the sensor 407, 409 is a door or window sensor, the door or window opening or closing. When the door or window is closed, and then is opened, this may be a sensor trigger 473 that results in the door or window sensor generating sensor data 470 representative of the sensor trigger 473, for example. If the sensor 407, 409 is a smoke detector or other sensor type that activates based on threshold amounts, for example, the sensor trigger 473 may be the threshold amount being reached. For example, the smoke detector may only activate when the smoke levels reach a certain threshold, and when this threshold is reached, the sensor trigger 473 may be said to have occurred, and sensor data 470 may be generated in response. If the sensor 407, 409 is a thermometer, for example, a threshold temperature being reached may be the sensor trigger 473. In another example, if the sensor 407, 409 is a motion sensor, the sensor trigger 473 may be a threshold amount of motion that must be detected.

In alternative embodiments, the sensor data 470 and/or the sensor trigger 473 data may be received by the A/V recording and communication device 402 rather than, or in addition to, the smart-home hub device 411. For example, some environments (e.g., homes) may not have a smart-home hub device. In these environments, the A/V recording and communication device 402 may perform at least some of the functions of the smart-home hub device 411 described herein, including receiving, processing, and/or transmitting the sensor data 470 and/or the sensor trigger 473 data. For example, the sensors 407, 409 may be in communication with the A/V recording and communication device 402, rather than, or in addition to, the smart-home hub device 411.

Figure 25:
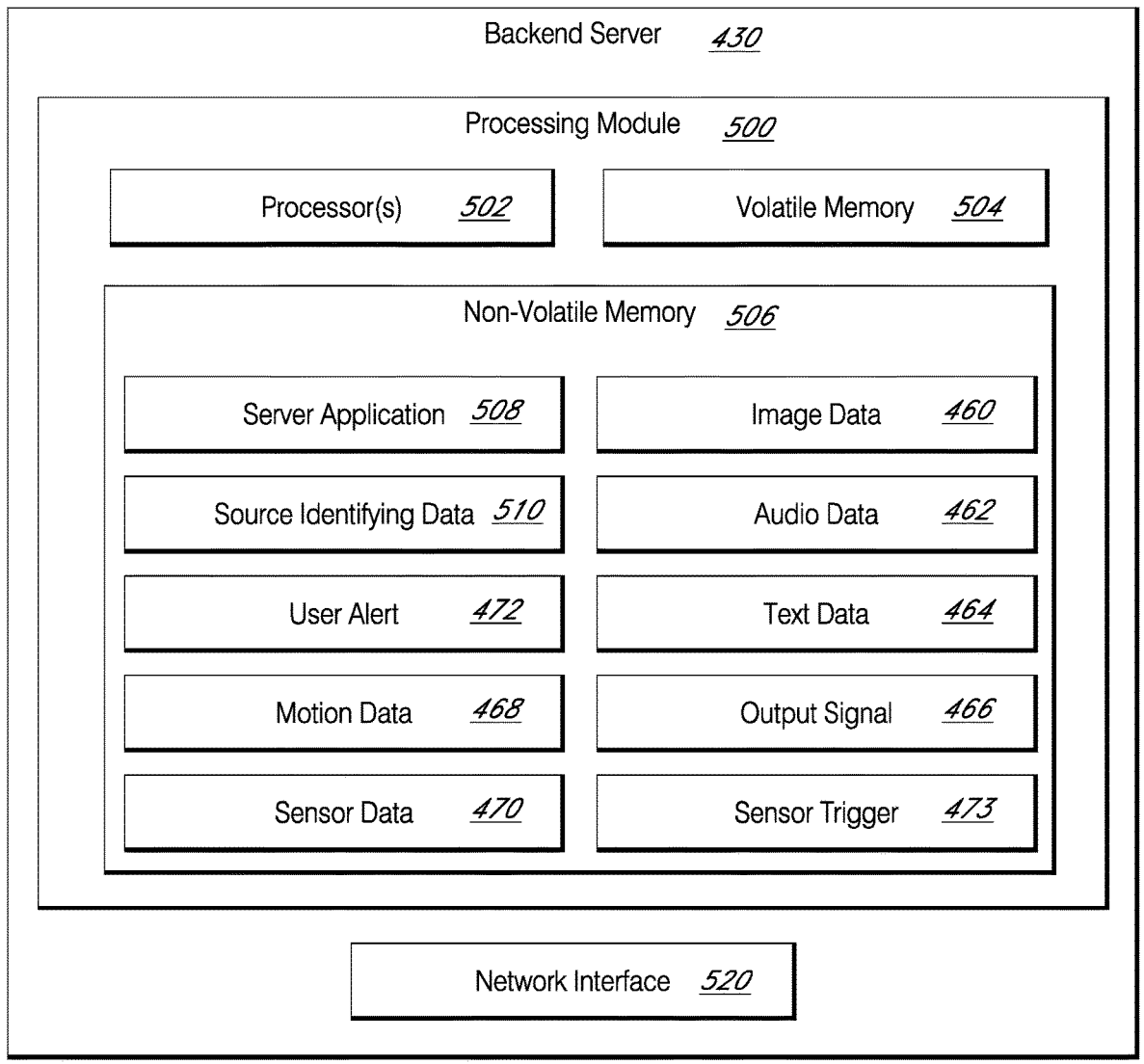
FIG. 25 is a functional block diagram illustrating one embodiment of a backend device according to various aspects of the present disclosure.

FIG. 25 is a functional block diagram illustrating one embodiment of the backend server(s) 430 according to various aspects of the present disclosure. The backend server(s) 430 may comprise a processing module 500 including a processor 502, volatile memory 504, a network interface 520, and non-volatile memory 506. The network interface 520 may allow the backend server(s) 430 to access and communicate with devices connected to the network (Internet/PSTN) 410. The non-volatile memory 506 may include a server application 508 that configures the processor 502 to receive the image data 460, the audio data 462, the text data 464, the sensor data 470, and/or the motion data 468 from the sensors 407, 409, the A/V recording and communication device 402, and/or the smart-home hub device 411 in the output signal 466, 467. In various embodiments, and as described below, the backend server(s) 430 may be configured to receive, from the camera 444 (and/or the camera 415) in response to a motion event, the image data 460 (and/or the image data 461) recorded of the motion event in a field of view of the camera 444 (and/or the camera 415) and receive from the at least one sensor 407, 409, the sensor data 470. The backend server(s) 430 may then be configured to correlate the sensor data 470 with the image data 460 to create updated image data 460/461. The backend server(s) may then generate and transmit a user alert 472 including the updated image data 460/461 to the client device 404, 406 associated with the A/V recording a communication device 402 using the network interface 520, for example.

In further reference to FIG. 25, the non-volatile memory 506 may also include source identifying data 510 that may be used to identify the A/V recording and communication device 402 and/or the smart-home hub device 411. In some embodiments, identifying the A/V recording and communication device 402 and/or the smart-home hub device 411 may include determining the location of the device 402 and/or the smart-home hub device 411, which locations may be used to determine which client devices 404, 406 will receive the user alert 472 with the updated image data 460/461. In addition, the source identifying data 510 may be used to determine locations of the client devices 404, 406. In some embodiments, the server application 508 may further configure the processor 502 to generate and transmit a report signal (not shown) to a third-party client device (not shown), which may be associated with a law enforcement agency, for example. The report signal sent to the law enforcement agency may include information indicating an approximate location of where the image data 460 was captured, which may assist the law enforcement agency with apprehending the criminal perpetrator shown in the image data 460.

In the illustrated embodiment of FIGS. 23-25, the various components including (but not limited to) the processing modules 446, 413, 500, the communication modules 450, 421, and the network interface 520 are represented by separate boxes. The graphical representations depicted in each of FIGS. 23-25 are, however, merely examples, and are not intended to indicate that any of the various components of the A/V recording and communication device 402, the smart-home hub device 411, or the backend server(s) 430 are necessarily physically separate from one another, although in some embodiments they might be. In other embodiments, however, the structure and/or functionality of any or all of the components of the A/V recording and communication device 402 may be combined. In addition, in some embodiments the communication module 450 may include its own processor, volatile memory, and/or non-volatile memory. Further, the structure and/or functionality of any or all of the components of the smart-home hub device 411 may be combined. In addition, in some embodiments the communication module 421 may include its own processor, volatile memory, and/or non-volatile memory. Further, the structure and/or functionality of any or all of the components of the backend server(s) 430 may be combined. In addition, in some embodiments the network interface 520 may include its own processor, volatile memory, and/or non-volatile memory.

Figure 27:
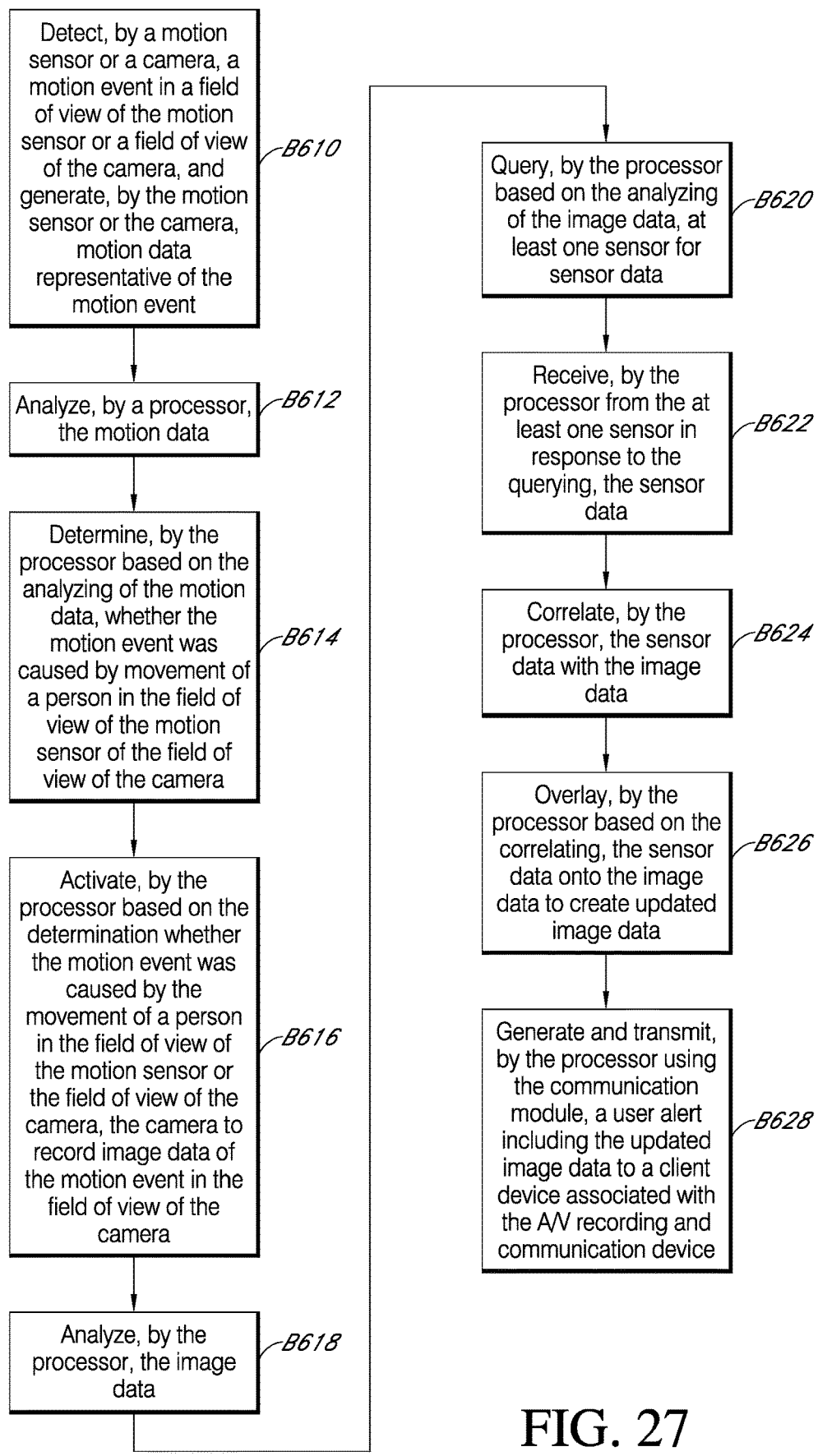

Now referring to FIG. 27, FIG. 27 is a flowchart illustrating a process for informative image data generation using A/V recording and communication devices according to various aspects of the present disclosure. While the description of FIG. 27 below makes reference to the A/V recording and communication device 402, it is to be understood that the smart-home hub device 411 may be used in place of, or in addition to, the A/V recording and communication device 402 in the process of FIG. 27, as well as in any of the processes of FIGS. 27-37.

At block B600, the process detects, by an A/V recording and communication device, a motion event in a field of view of the A/V recording and communication device. For example, the motion sensor 474 and/or the camera 444 may detect a motion event in a field of view of the motion sensor 474 and/or a field of view of the camera 444, respectively. In some of the present embodiments, a motion event may comprise any detected motion, while in other embodiments a motion event may include the presence of a person and/or object of interest. For example, the motion sensor 474 and/or the camera 444 may detect a variety of motion that may not be indicative of a motion event, such as an animal passing by the field of view of the A/V recording and communication device 402 or a car passing by on the street in a field of view of the A/V recording and communication device 402. However, when the camera 444 and/or the motion sensor 474 detects motion indicative of a person and/or object of interest in the field of view of the A/V recording and communication device 402, a motion event may be detected. The determination of whether or not motion qualifies as a motion event that triggers activation of the camera 444 to record the image data 460 may be made by the processor 452 by analyzing the motion data 468 generated by the camera 444 and/or the motion sensor 474 in response to the presence of motion in the field of view of the A/V recording and communication device 402.

At block B602, the process activates, by a processor in response to detecting the motion event in the field of view of the A/V recording and communication device, a camera to record image data of the motion event within the field of view of the camera. For example, the processor 452, in response to detecting the motion event in the field of view of the A/V recording and communication device 402 at block B600, may activate the camera to record the image data 460 in the field of view of the camera 444. In some of the present embodiments, the camera 444 may record during the entire time the motion event is detected, while in other embodiments the camera 444 may record before, during, and/or after the motion event is detected. For example, the camera 444 may record for 10 seconds, 20 seconds, 40 seconds, or one minute before and/or after the motion event is detected and/or stops being detected by the motion sensor 474 and/or the camera 444.

At block B604, the process receives, by the processor from at least one sensor, sensor data. For example, the processor 452 may receive from at least one sensor 407, 409, the sensor data 470. In some of the present embodiments, the processor 452 may query the sensors 407, 409 for the sensor data 470 in response to detecting the motion event. In response to the querying, the processor 452 may receive the sensor data 470 from the sensors 407, 409. In other embodiments, the sensors 407, 409 may transmit sensor data 470 to the A/V recording and communication device 402 continuously or periodically at a predetermined interval in response to a query from the A/V recording and communication device 402 or absent a query. In some embodiments, the sensor 407, 409 may transmit the sensor data 470 in response to sensor triggers 473 (e.g., a door opening, a window closing, temperature rising above a threshold temperature, etc.).

In some of the present embodiments, the A/V recording and communication device 402 may receive the sensor data 470 from each of the sensors 407, 409 in response to detecting the motion events. In such embodiments, the processor 452 may receive status information for each of the window sensors, door sensors, smoke detectors, carbon monoxide sensors, temperature sensors, etc. in network communication (e.g., connected over the user's network 408) with the A/V recording and communication device 402. In other embodiments, the A/V recording and communication device 402 may query, and receive in response, the sensor data 470 from the sensors 407, 409 most relevant to the motion event detected. For example, if the motion event is detected in the front of a house where the A/V recording and communication device 402 is located, the processor 452 may query door and window sensors at the front of the house, such as the front door, to determine if the doors and windows are open, closed, locked, and/or unlocked. In such embodiments, the processor 452 may be able to include the most relevant sensor data 470 to the motion event in the updated image data 460/461, such as described below with respect to block B606.

At block B606, the process correlates, by the processor, the sensor data with the image data to create updated image data. For example, the processor 452 correlates the sensor data 470 with the image data 460 to create updated image data 460/461. In some of the present embodiments, the sensor data 470 and the image data 460 may include clock data, such as a time stamp. In such embodiments, the processor 452 may correlate the clock data of the sensor data 470 with that of the image data 460 to match up the sensor data 470 with the image data 460. For example, if a person is attempting to break into the house where the A/V recording and communication device 402 is located, the image data 460 may be correlated with the sensor data 470 from the front door. In such an example, at least partially based on the clock data, the updated image data 460/461 may include an indication that the front door is closed initially and then opened at some point during the motion event. This indication may provide the user of the client device 404, 406 viewing the motion event on a display of their client device 404, 406 the necessary information to determine that the person opened the door, and if the person is a suspicious person (e.g., someone who should not be in the home), the user may then alert the police, sound an alarm, etc.

The correlation of the sensor data 470 with the image data 460 may further include determining, based on the motion data 468 and/or the image data 460, which of the sensors 407, 409 are most relevant to the motion event, similar to that described above with respect to block B604. For example, the user of the client device 404, 406 may not desire to have sensor data 470 from each of the sensors 407, 409, but rather only the sensors 407, 409 most relevant to the motion event. In such an example, the processor 452 may analyze the motion data 468 and/or the image data 460 to determine that the motion event was caused by the presence of a person in the proximity of the front door, and thus may only include the sensor data 470 from the front door sensors and front window sensors in the updated image data 460/461. By receiving the updated image data 460/461 including the most relevant sensor data 470, the user may be able to more quickly assess the situation to make a determination of an appropriate action, such as alerting law enforcement, sounding an alarm, communicating with the intruder through the speaker 448, etc.

Correlating the sensor data 470 with the image data 460 may include displaying the sensor data 470 within and/or adjacent to the image data 460. For example, the sensor data 470 may be overlaid onto the image data 460 to create the updated image data 460/461. The sensor data 470 may be overlaid at the bottom, top, left, or right side of the image data 460, for example. In some of the present embodiments, the image data 460 may include the sensor 407, 409 that generated the sensor data 470. In such embodiments, the sensor data 470 may be displayed in proximity to the sensor 407, 409 in the image data 460. For example, if the image data 460 includes a door that has a door sensor, door open/close information may be displayed on or adjacent to the door in the updated image data 460/461. In another example, if the image data 460 includes a thermostat, the temperature may be displayed in proximity to the thermostat in the updated image data 460/461.

The process, at block B608, generates and transmits, by the processor using a communication module, a user alert including the updated image data to a client device associated with the A/V recording and communication device. For example, the processor 452 generates and transmits, using the communication module 450, a user alert 472 including the updated image data 460/461 to the client device 404, 406. The updated image data 460/461 may be displayed on the display of the client device 404, 406 for viewing by the user. By including the sensor data 470 in the updated image data 460/461 the user is given a more detailed and informed understanding of the motion event in a more digestible format.

In some of the present embodiments, the user alert 472 may be programmed to be displayed as a push-notification. In such embodiments, the push-notification may include the sensor data 470 from the updated image data 460/461 and at least one frame from the updated image data 460/461. The at least one frame may include an image of a person and/or object of interest from the motion event (e.g., the person and/or object of interest that caused the motion event).

Now referring to FIG. 27, FIG. 27 is another flowchart illustrating a process for informative image data generation using A/V recording and communication devices according to various aspects of the present disclosure. At block B610, the process detects, by a motion sensor or a camera, a motion event in a field of view of the motion sensor or a field of view of the camera, and generates, by the motion sensor or the camera, motion data representative of the motion event. For example, the motion sensor 474 and/or the camera 444 may detect a motion event in the field of view of the motion sensor 474 or the field of view of the camera 444. In response to the detection of the motion event, the motion sensor 474 and/or the camera 444 may generate the motion data 468 representative of the motion event.

At block B612, the process analyzes, by the processor, the motion data. For example, the processor 452 may analyze the motion data 468. The motion data 468 may include information that is indicative of the presence of a person and/or object of interest in the field of view of the camera 444 and/or the field of view of the motion sensor 474. As such, the processor 452 may analyze the motion data 468 to determine the presence of a person and/or object of interest.

At block B614, the process determines, by the processor based on the analyzing of the motion data, whether the motion event was caused by the movement of a person in the field of view of the motion sensor or the field of view of the camera. For example, it may be determined from the motion data 468 whether or not the motion event was caused by the movement of a person in the field of view of the camera 444 and/or the motion sensor 474. In some of the present embodiments, the motion data 468 may be analyzed to determine the presence of an object of interest, such as a car pulling into a driveway or the like.

Figure 26:
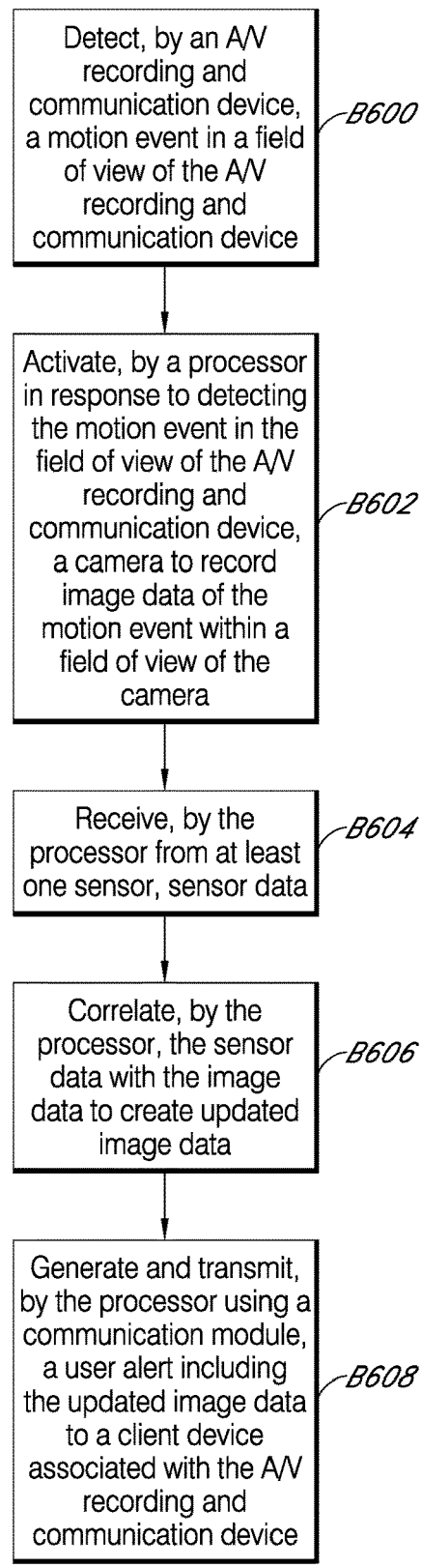
FIGS. 26-31 are flowcharts illustrating processes for informative image data generation using A/V recording and communication devices according to various aspects of the present disclosure.

At block B616, the process activates, by the processor based on the determination whether the motion event was caused by movement of a person in the field of view of the camera or the field of view of the motion sensor, the camera to record image data of the motion event in the field of view of the camera. For example, the processor 452, based on the determination that the motion event was caused by the movement of a person, may activate the camera 444 to record image data 460 of the field of view of the camera 444. This process may be similar to that of block B602 of FIG. 26, described above.

The process continues at block B618 with analyzing, by the processor, the image data. For example, the processor 452 may analyze the image data 460. In some of the present embodiments, the analysis of the image data 460 may be to confirm the presence of a person in the field of view of the camera 444 and/or the motion sensor 474. In some embodiments, the analysis of the image data 460 may be to determine the location, movement direction, and/or movement speed of the person (or object of interest) in the field of view of the camera 444. For example, the image data 460 may be analyzed to determine whether the person is in front of the house, on the side of the house, or behind the house. In addition, it may be determined if the person is running, walking, crawling, etc., and in what direction they are doing so. For example, from the image data 460, it may be determined that the person is running from the front of the house toward the side of the house, which may be indicative of suspicious activity. This analysis of the image data 460 may also be used to determine the sensors 407, 409 that are relevant to the motion event. In the preceding example of the person running from the front of the house to the side of the house, this information generated from the analysis of the image data 460 may help in determining that the open/unopen and/or locked/unlocked status of the window sensors located on the side of the house are relevant to the motion event. As a result, the motion data 470 from the window sensors may be included in the updated image data, for example.

In some of the present embodiments, the image data 460 may be analyzed using facial recognition, facial detection, biometric, and/or other software, such as those described above, to determine the identity of the person in the image data 460. The identity of the person may be used to help aid the user of the client device 404, 406 associated with the A/V recording and communication device 402 determine if the person is a suspicious person or not.

In some of the present embodiments, the image data 460 may be analyzed to determine the location of any sensors 407, 409 in the field of view of the camera 444. For example, if the A/V recording and communication device 402 is on the garage, it may be facing a side door that has a sensor 407, 409, such as a door sensor that senses whether the door is open or closed. As such, the processor 452, when analyzing the image data 460, may make the determination that the door sensor on the side door is present in the image data 460. This information can then be used by the processor 452 to determine which sensors 407, 409 are relevant to the motion event, which may include the door sensor in the image data 460, for example. In addition, this information may be used when correlating the image data 460 with the sensor data 470 (at block B624) as the sensor data 470 from the door sensor may be overlaid in proximity to the side door in the updated image data 460/461. For example, the updated image data 460/461 may include a notification, such as "Door Locked," in proximity to the side door (e.g., adjacent to, above, and/or over the side door) such that the user can more clearly see, in a digestible form, the open/closed status of the side door.

At block B620, the process queries, by the processor based on the analyzing of the image data, at least one sensor for sensor data. For example, the processor 452, based on the analyzing of the image data 460, queries at least one sensor 407, 409 for the sensor data 470. For example, the processor 452 may query all of the sensors 407, 409 in network communication with the A/V recording and communication device 402. In another example, the processor 452 may only query the sensors 407, 409 that are relevant to the motion event based on the analysis at block B618, based on the proximity of the sensor 407, 409 to the A/V recording and communication device 402, and/or based on other program rules. The other program rules may be, for example, a preset list of sensors 407, 409 that are to be queried in response to each motion event and/or each type of motion event.

At block B622, the process receives, by the processor from the at least one sensor in response to the querying, the sensor data. For example, the processor 452 receives the sensor data 470 from the sensor(s) 407, 409 in response to querying the sensor(s) 407, 409.

At block B624, the process correlates, by the processor, the sensor data with the image data. For example, the processor 452 may correlate the sensor data 470 with the image data 460. This process may be similar to that of block B606 of FIG. 26, described above.

At block B626, the process overlays, by the processor based on the correlating, the sensor data onto the image data to create updated image data. For example, the processor 452 may overlay the sensor data 470 onto the image data 460 based on the correlating at block B624. This process may also be similar to that of block B606 of FIG. 26, described above.

The process, at block B628, generates and transmits, by the processor using a communication module, a user alert including the updated image data to a client device associated with the A/V recording and communication device. For example, the processor 452 generates and transmits, using the communication module 450, a user alert 472 including the updated image data 460/461 to the client device 404, 406. This process may be similar to that of block B606 of FIG. 26, described above.

The process of FIG. 27 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure. Although the below-detailed embodiments are discussed with reference to FIG. 27, this association is not intended to be limiting. As such, the below-detailed embodiments may also similarly be associated with other processes described herein, such as the processes of FIGS. 26, 28, and 29, for example.

Figure 32:
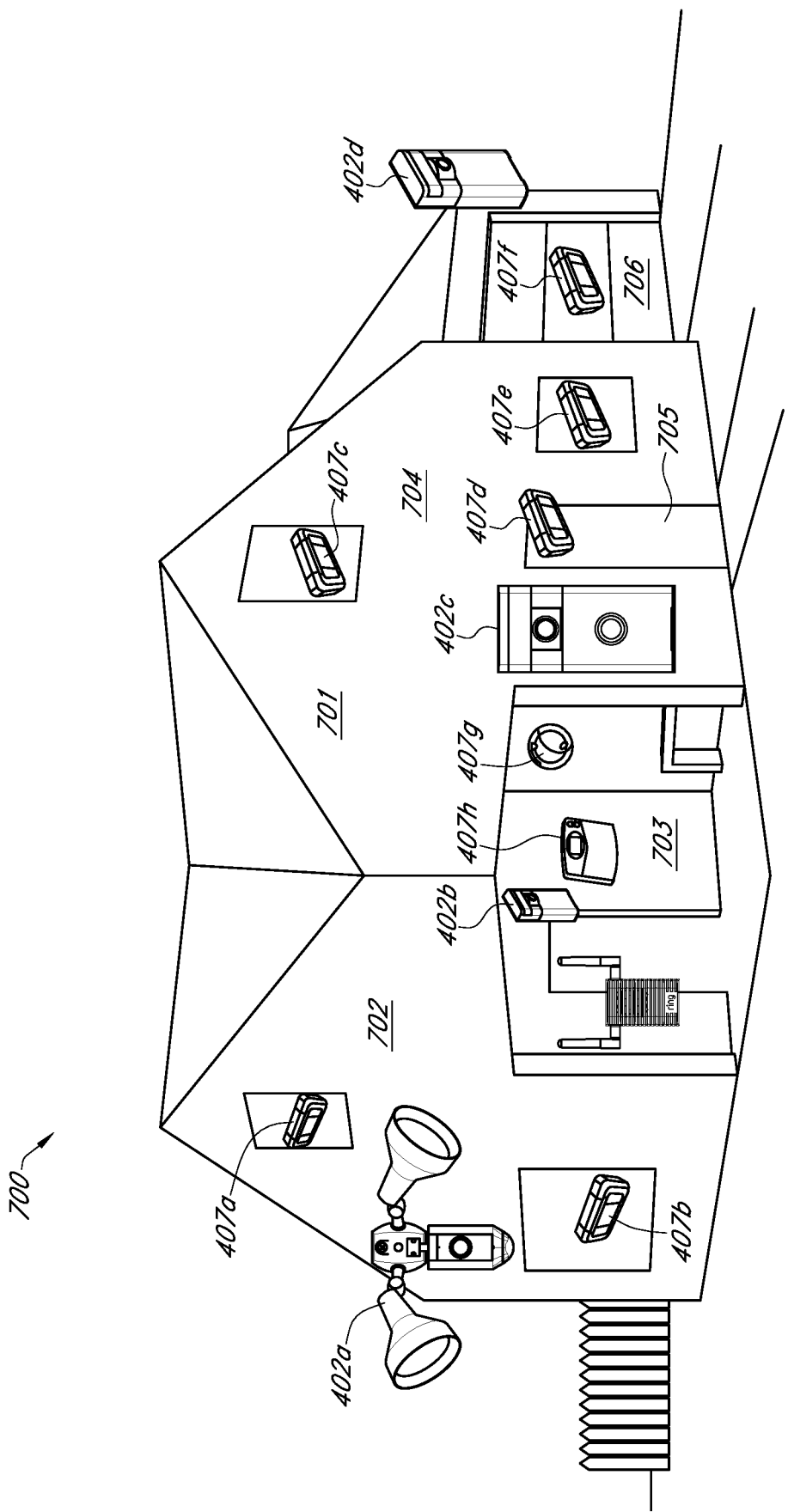
FIG. 32 is an example environment for A/V recording and communication devices according to one embodiment of the present disclosure.

FIG. 32 is an example environment 700 for A/V recording and communication devices 402 according to one embodiment of the present disclosure. The environment 700 includes a house 701 and a plurality of A/V recording and communication devices 402*a*, 402*b*, 402*c*, and 402*d* (hereinafter collectively referred to as A/V recording and communication devices 402). As an example, the A/V recording and communication device 402*a* may be a floodlight camera on the side 702 of the house 701, the A/V recording and communication device 402*b* may be an interior surveillance camera in the foyer 703 of the house 701, the A/V recording and communication device 402*c* may be a doorbell on the front 704 of the house 701 proximate the front door 705, and the A/V recording and communication device 402*d* may be an exterior surveillance camera located above a garage door 706. The environment 700 further includes a plurality of sensors 407*a*, 407*b*, 407*c*, 407*d*, 407*e*, 407*f*, 407*g*, and 407*h* (hereinafter collectively referred to as sensors 407). As an example, the sensors 407*a*, 407*b*, 407*c*, 407*e* may be window sensors and the sensors 407*d* and 407*f* may be door sensors (e.g., garage and front door). As another example, the sensor 407*g* may be a smoke detector and/or carbon monoxide sensor and the sensor 407*h* may be a thermostat or temperature sensor. The environment 700 is an example embodiment and thus there may additional and/or different A/V recording and communication devices 402 and/or sensors 407, 409 in the environment 700.

In some of the present embodiments, the sensors 407 may be in network communication with at least one of the A/V recording and communication devices 402, and the A/V recording and communication devices 402 may be in communication with at least one other A/V recording and communication device 402. In some embodiments, the A/V recording and communication devices 402 and the sensors 407 may be in network communication with a hub device 411 in the environment 700, such as within the house, and the hub device 411 may be in network communication (e.g., over the network (Internet/PTSN) 410) with a backend device, such as the server 430. In other embodiments, the A/V recording and communication devices 402 and the sensors 407 may be in direct network communication with a backend device, such as the server 430, over the network (Internet/PSTN) 410. In yet another embodiment, the sensors 407, 409 may be in network connection/communication with one or more of the A/V recording and communicating devices 402 (e.g., over the user's network 408) and the A/V recording and communication device(s) 402 may be in network connection/communication with a backend device, such as server 430 (e.g., over the network (Internet/PTSN) 410).

Figure 33:
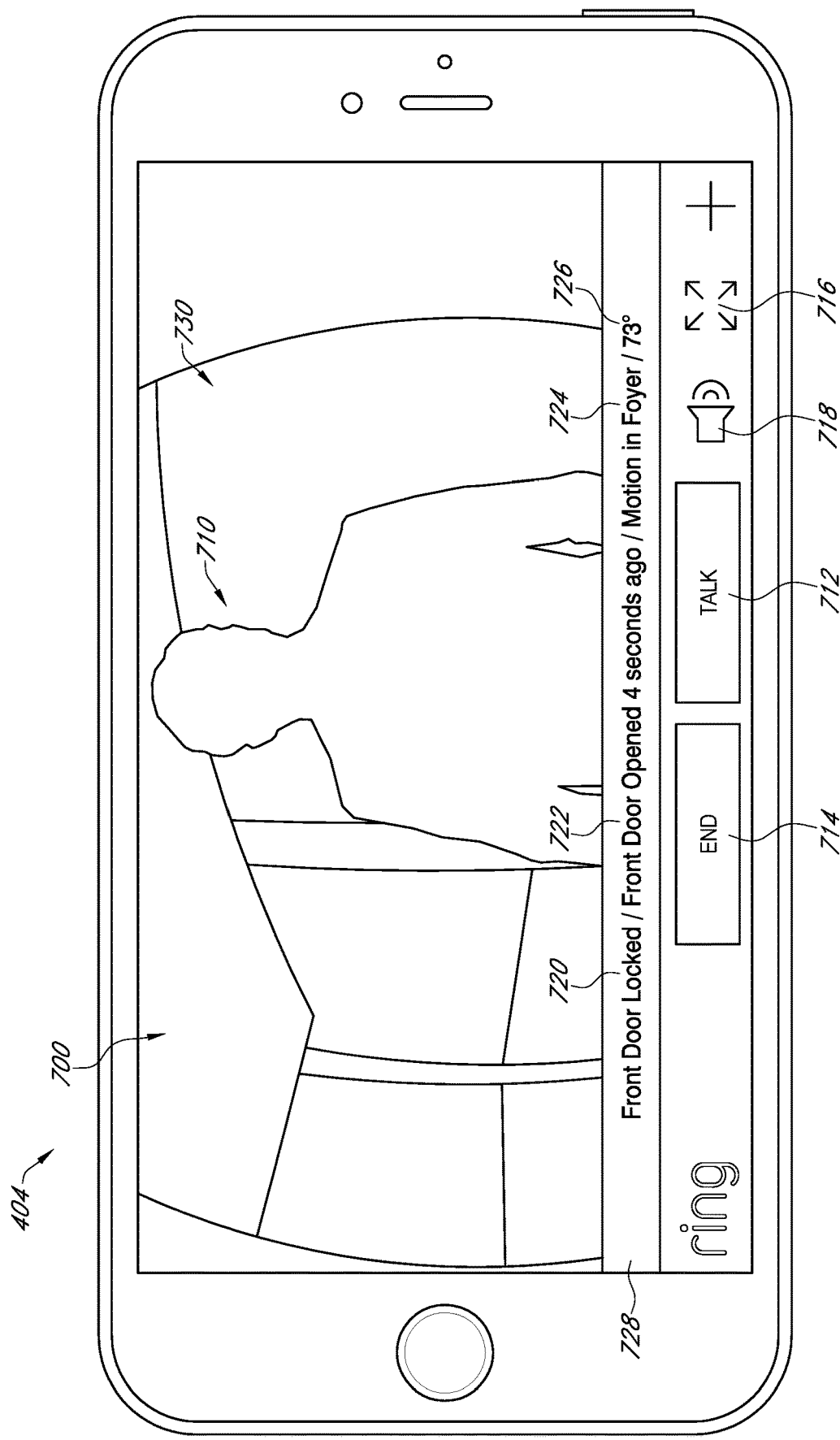
FIGS. 33-37 are screenshots of a graphical user interface (GUI) illustrating aspects of a process for informative image data generation using A/V recording and communication devices according to various aspects of the present disclosure.

In one example scenario, illustrated with reference to FIG. 33, a burglar 710 may be attempting to break into the house 701 in the environment 700 (FIG. 32) through the front door 705. FIG. 33 is a screenshot of a GUI illustrating an example of a frame from the updated image data 460/461 being displayed on the client device 404 through a computer program application (CPA). In the frame of the updated image data 460/461, the display 730 of the client device 404 may include a visual representation of a portion of the environment 700 captured by the A/V recording and communication doorbell 402*c*, where the portion of the environment at the time of the image data 460 capture includes the burglar 710. The updated image data 460/461 may further include a sensor data display panel 728 that may include sensor data information 720, 722, 724, and 726. Although sensor data information 720, 722, 724, and 726 are shown in FIG. 33, this example is not intended to be limiting, and the sensor data display panel 728 may display any number of sensor data information dependent on the specific embodiment. For example, referring to FIG. 34, the updated image data 460/461 may include icons as representations of the sensor data 470. For example, the lock/unlock icon 734 may indicate whether the front door is locked or unlocked, the door open/closed icon 736 may indicate whether the door is physically open or closed, the suspicion icon 732 may indicate that the burglar 710 is a suspicious person (e.g., an unrecognized person or a known dangerous person), and the name 738 may provide a name of the burglar 710. The determination that the burglar 710 is suspicious and the determination of the name 738 of the burglar may be done using facial recognition software (or similar software, as described above), and comparing the facial recognition information from the burglar 710 to a database of suspicious persons, such as a police database or the like.

The GUI may also have a talk feature 712 (FIG. 33), to enable the user to communicate through the speaker 448 of the A/V recording and communication doorbell 402*c*. The GUI further may include an end call feature 714 for allowing the user to end the recording and communication through the A/V recording and communication doorbell 402*c*, and/or or to end the display of the updated image data 460/461 on the client device 404, 406. The GUI may also include a volume adjustment 718 and an expand/collapse view feature 716.

Referring to the process of FIG. 27, the motion sensor 474 and/or the camera 444 may detect the motion of the burglar 710 in the field of view of the motion sensor 474 and/or the field of view of the camera 444. In response, the motion sensor 474 and/or the camera 444 may generate motion data 468 representative of the motion event (at block B610). For example, the motion data 468 may include data indicative of the presence of a person (e.g., the burglar 710).

The processor 452 may then analyze the motion data 468 to determine if the motion data 468 is indicative of the presence of a person (e.g., the burglar 710) (at block B612). Based on the analysis of the motion data 468, the processor 452 may determine that the motion event was caused by the movement of a person in the field of view of the motion sensor 474 and/or the camera 444 (at block B614) and activate the camera 444 to record image data 460 of the environment 700 in front of the A/V recording and communication doorbell 402*c* (at block B616). The image data 460 may include a video of the field of view of the camera 444 (e.g., the environment 700) during the motion event. The video may include the burglar 710 approaching the front door where the A/V recording and communication doorbell 402*c* is located, and the video may further include the burglar 710 forcing the front door 705 open even though the front door 705 may be locked.

Figure 34:
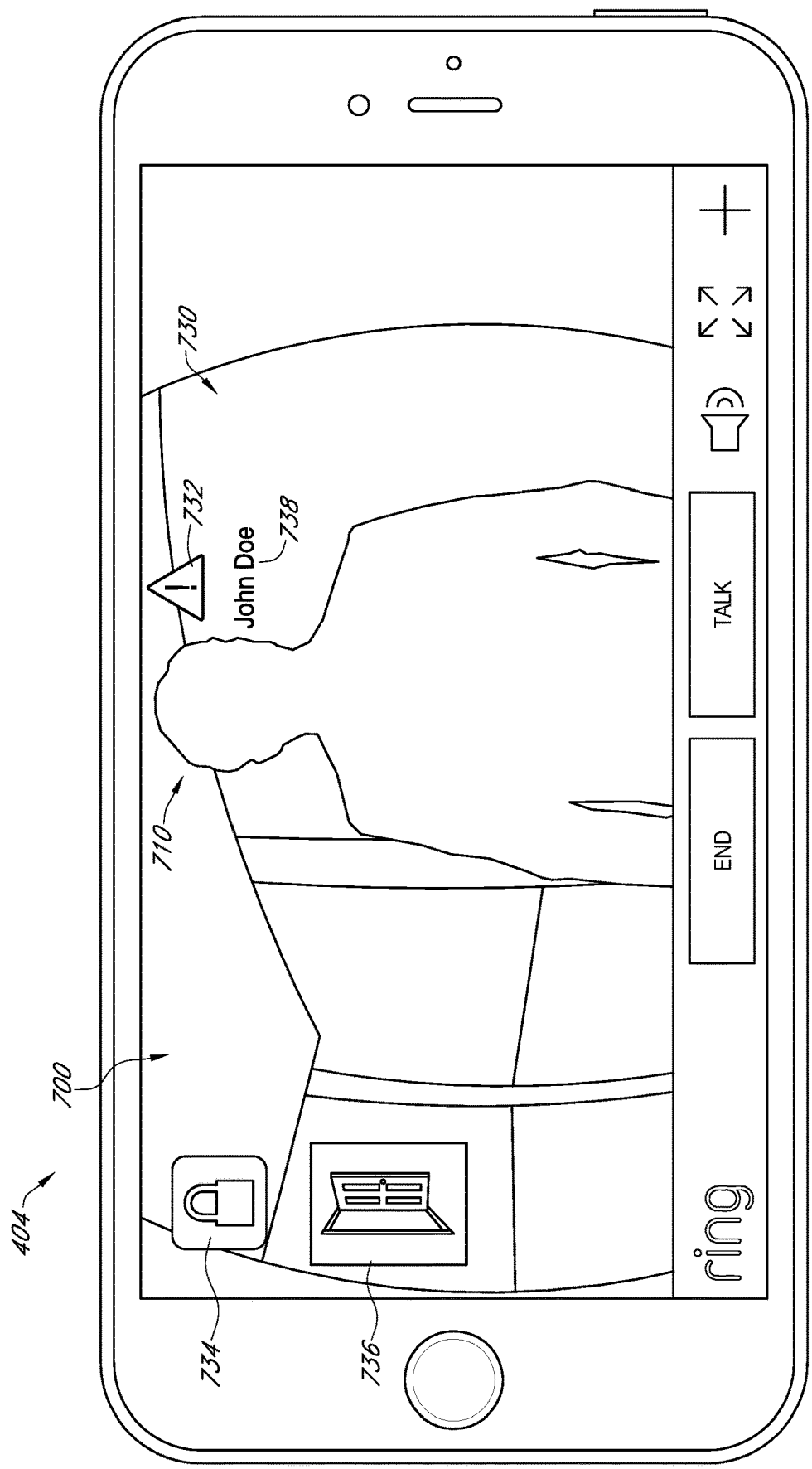
Figure 35:
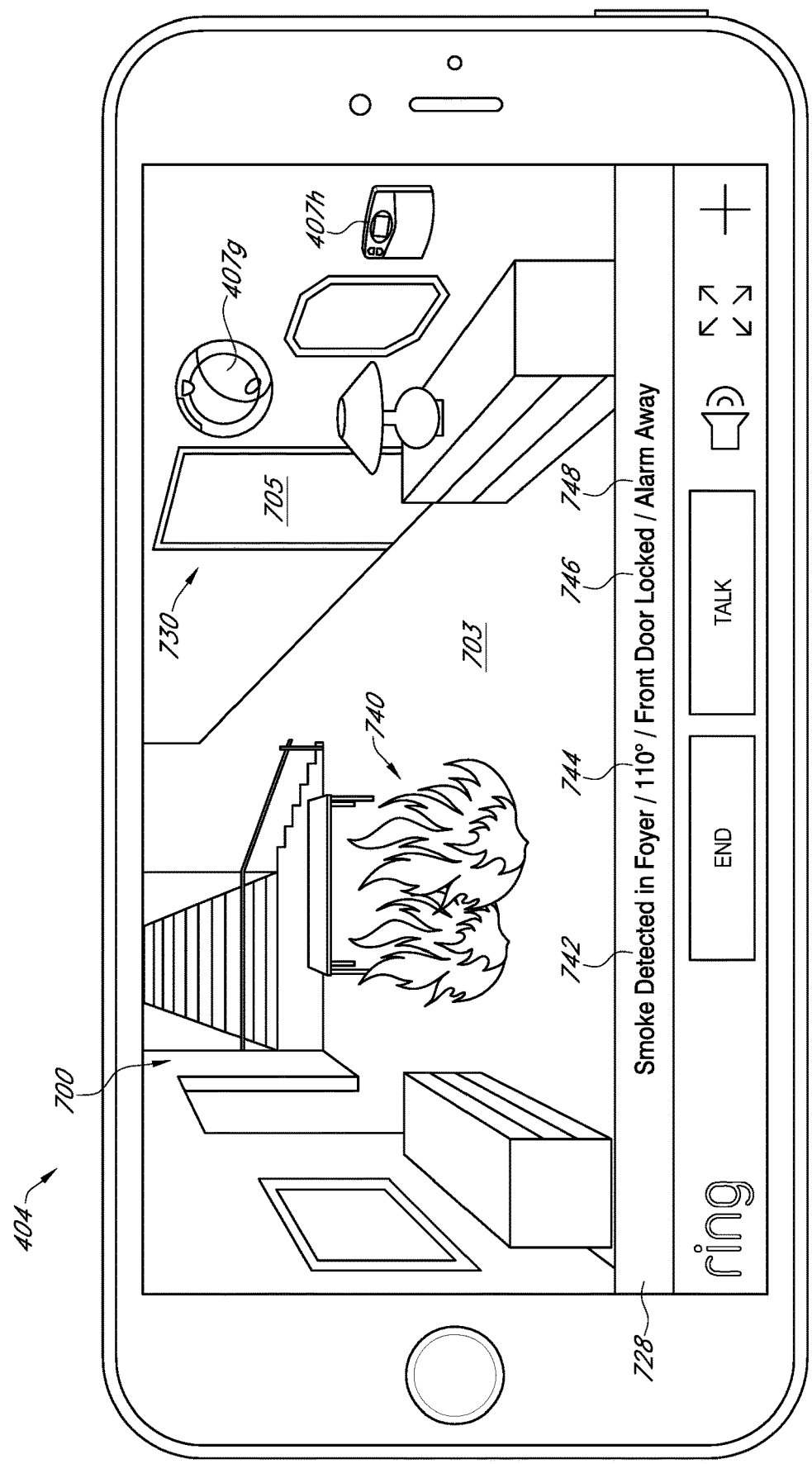
Figure 36:
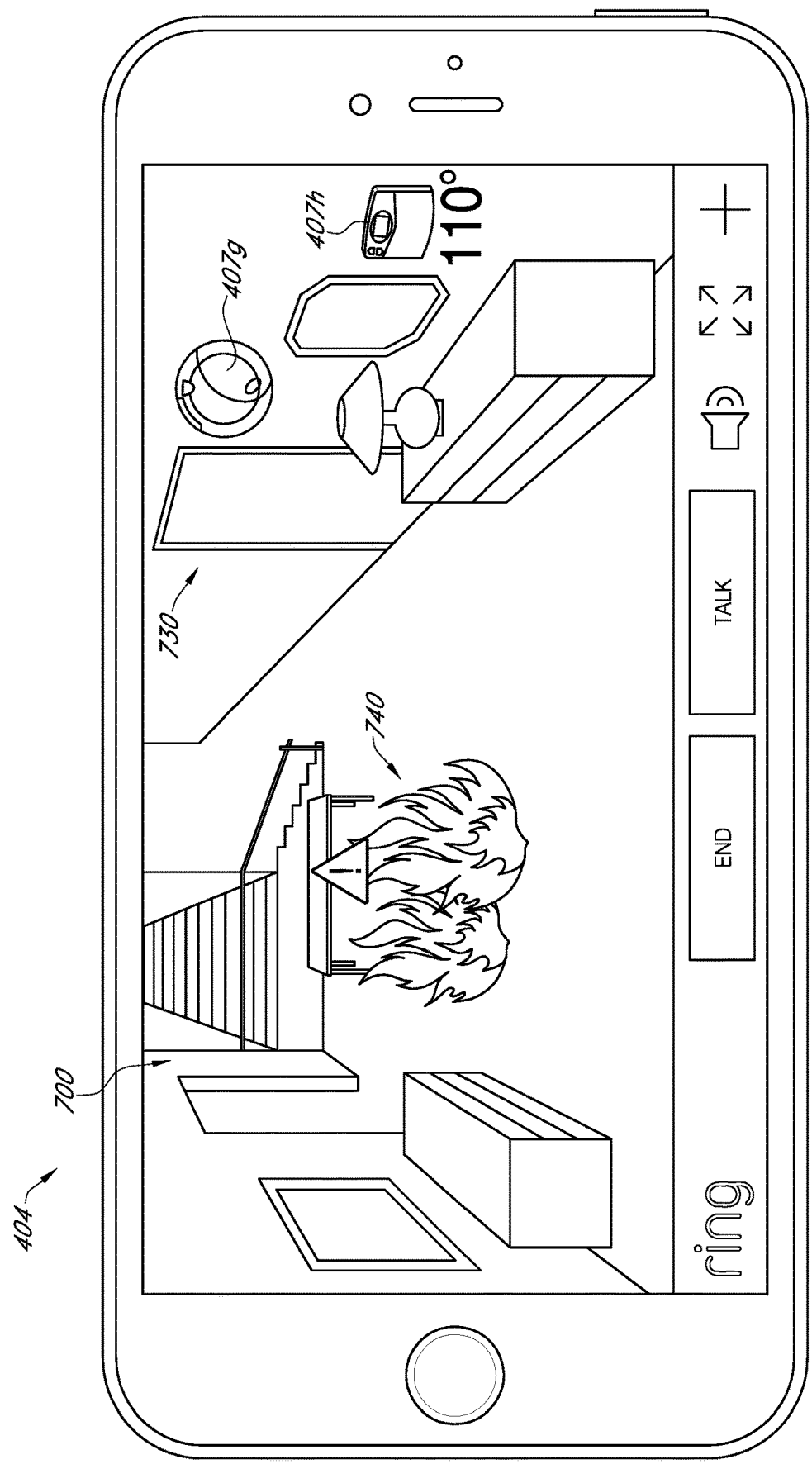
Figure 37:

The analyzing may further include determining which of the sensor data 470 may be most relevant to the image data 460. For example, in some of the present embodiments, the image data 460 may be analyzed to determine the type of motion event that has occurred. In the example of FIGS. 33 and 34, the motion event may have been caused by the burglar 710. In the example of FIGS. 35 and 36 (described below), the motion event may have been caused by a fire 740 inside the house 701, for example. In either example, the processor 452 may analyze the image data 460 to make this determination (e.g., the presence of a person, a fire, etc.). Once the determination is made, the processor 452 may analyze the image data 460 to determine the location of the motion event (e.g., on the front porch, in the foyer, etc.). Based on the determinations of the type of motion event and/or the location of the motion event, the processor 452 may determine which of the sensors 407*a*-407*h* are most relevant to the motion event. In the example of the burglar 710, the window open/close sensors (e.g., 407*e*, 407*b*, etc.) as well as the door unlock/lock sensors (e.g., front door open/close sensor 407*d*) and motion sensors (e.g., a motion sensor in the foyer inside the front door) may be determined most relevant to a motion event caused by a person at the front door 705. In the example of the fire 740, a motion sensor (e.g., a motion sensor in the foyer 703 where the fire 740 is occurring), a smoke detector (e.g., the smoke detector 407*g*), and a temperature sensor (e.g., the thermostat 407*h*) may be determined most relevant to the motion event caused by the fire 740 in the foyer 703.

In some of the present embodiments, the user of the client device 404, 406 associated with the A/V recording and communication device(s) 402 may select which sensor data 470 the user prefers to have displayed. In some embodiments, the selection may be made to apply to all motion events. In other embodiments, the user may select which sensor data 470 to receive based on the type of motion event detected. For example, the user may select to receive sensor data 470 from the front window sensor 407*e* and the front door sensor 407*d* in response to motion events caused by the presence of a person in the field of view of the A/V recording and communication doorbell 402*c*. For another example, the user may select to receive sensor data 470 from the door sensor 407*f* (may be a tilt sensor) of the garage door, the front window sensor 407*e*, and the front door sensor 407*d* in response to a motion event caused by the presence of a person and/or car captured by the external surveillance camera 402*d* located above the garage door 706. The user may also select to have sensor data 470 from the smoke detector 407*g* or thermostat 407*h* displayed in response to any motion event, or certain motion events, for example. In each of the embodiments, the processor 452 may analyze the image data 460 to determine the type of motion event and/or the location of the motion event (e.g., based on the location of the A/V recording and communication device(s) 402 that captured the motion event), to determine which sensor data 470 may be included in the updated image data 460/461 based on the user's selections.

The processor 452 (FIG. 23) may then query, based on the analyzing of the image data 460, at least one sensor 407*a*-407*h* for the sensor data 470 (at block B620). The processor 452 may query each of the sensors 407*a*-407*h* for sensor data 470, query the sensors 407*a*-407*h* most relevant to the motion event, and/or query the sensors 407*a*-407*h* that have sensor data 470 that has not already been received by the processor 452. For example, some of the sensors 407*a*-407*h* may send their sensor data 470 to the A/V recording and communication doorbell 403*c* perpetually or at predetermined intervals such that the A/V recording and communication doorbell 403*c* does not need to query the sensors 407*a*-407*h* from which it already has sensor data 470. In such an example, the processor 452 may only query the sensors 407*a*-407*h* from which it does not have the sensor data 470. In yet another embodiment, the processor 452 may query the sensors 407*a*-407*h* that it receives the sensor data 470 at periodic intervals to request the sensor data 470 continuously during the period of time that the motion event is detected.

In this example with the burglar 710, the processor 452 may query the front door sensor 407*d* and the front window sensor 407*e*, for example. In addition, the processor 452 may query motion sensors within the home 701, such as within the foyer 703 located just inside the front door 705. This information may be most relevant based on the burglar's 710 location in the environment 700. In addition to the most relevant information, the processor 452 may query other sensors and/or all sensors, such as the temperature sensor 407*b* (e.g., thermostat) in the foyer 703 or the smoke detector 407g in the foyer 703. The sensor data 470 from some or all of the sensors 407a-407h may later be displayed on the display 730 of the client device 404, 406 for viewing by the user.

The processor 452 may then receive the sensor data 470 from the sensors 407a-407h in response to the queries (at block B622). As discussed above, the sensor data 407a-407h may be received in response to the query from block B620, but other sensor data 407a-407h may be received without a query. As such, the processor 452 may query the sensors 407a-407h from which the A/V recording and communication doorbell 402c has not yet received sensor data 470 and/or the sensors 407a-407h that are most relevant to the motion event. For example, in the example of the burglar 710, status of the door open/closed sensor 407d may be consistently transmitted to the A/V recording and communication doorbell 403c, while the window open/closed sensor 407e may not. As such, the processor 452 may query the window open/closed sensor 407e and receive the sensor data 470 from the sensor 407e.

In some embodiments, any or all of the sensors 407a-407h may be configured to transmit its current state to the A/V recording and communication doorbell 402c (or the smart-home hub device 411, or any of the other A/V recording and communication devices 402) any time the state of the sensor 407a-407h changes. For example, if the front door 705 is closed, and then opens, then the front door sensor 407d may be configured to transmit its current state as open to the A/V recording and communication doorbell 402c as soon as the front door 705 opens.

Once the processor 452 has received the sensor data 470 from the sensors 407a-407h, the processor 452 may correlate the sensor data 470 with the image data 460 captured by the camera 444 of the A/V recording and communication doorbell 402c (at block B624). For example, the processor 452 may analyze clock data from both the sensor data 470 and the image data 460 in order to create a time-based association of the sensor data 470 and the image data 460. As a result, the sensor data 470 and the image data 460 may be more accurately matched based on the time-based association for generating the updated image data 460/461. By generating the time-based association in the updated image data 460/461, when the user of the client device 404, 406 is viewing a visual representation of the updated image data 460/461, the user may be able to see the changes in the sensor data 470 at the time certain actions take place in the video (e.g., see an indication based on the sensor data 470 that the front door went from closed to open while the burglar 710 is present at the front door 705 in the video). This correlation may enable the user to make more informed decisions about which actions to take (e.g., alert the police) based on more accurate time-based information.

The correlation may further include determining if any of the sensors 407a-407h are present in the image data 460. For example, the user of the A/V recording and communication device 402 may be able to tag the sensors in the field of view of the camera 444 during a setup process. In such an example, during a setup process, the visual representation of the field of view of the camera 444 may be displayed on the client device 404, 406 associated with the A/V recording and communication device 402. The user may then be able to, for example, draw a region on the visual representation that includes one of the sensors 407a-407h, select one of the sensors 407a-407h on the visual representation, or the like, and information from the included/selected sensors may subsequently be correlated with motion events detected by that camera 444. In response to the drawing, selection, etc., a list of the sensors 407a-407h that are in the user's network 408 may appear on the display 730 of the client device 404, 406 for the user to select as correlating to the sensor 407a-407h selected in the visual representation.

In other embodiments, location data may be used to determine the presence of one of sensors 407a-407h in the image data 460. The location data may be based on a signal between the sensors 407a-407, such as, for example, a Bluetooth signal and/or a Zigbee signal, or may be based on global positioning system (GPS) data or Wi-Fi positioning system (WPS) data, for example. In yet another embodiment, object recognition software may be used (alone or in conjunction with other methods such as location data) to determine the presence of at least one of the sensors 407a-407h in the image data 460. For example, the location data may indicate one of sensors 407a-407h is located in the field of view of the camera 444, however, after analysis of the image data 460 using object recognition, it may be determined that the sensor 407a-407h is actually in another room through a wall such that the sensor 407a-407h is not present in the field of view of the camera 444. In a similar example, after analysis of the image data 460 using object recognition, it may be determined that the sensor 407a-407h may be present in the field of view of the camera 444, such as the thermostat 407h in FIG. 36.

As a result of the above-discussed determination of whether any of the sensors 407a-407h are present in the image data 460, the sensor data 470, such as the temperature (e.g., 110°), may be displayed in the visual representation of the field of view of the camera 444 of the A/V recording and communication device 402 (e.g., the surveillance camera 402b of FIG. 32) in proximity to the sensor 407a-407h. This functionality may enable the user of the client device 404, 406 to view an informative visual representation of the field of view of the camera 444 on the display 730 of the client device 404, 406 in an easily digestible format.

Once the sensor data 470 and the image data 460 have been correlated, the processor 452 may overlay the sensor data 470 onto the image data 460 to create updated image data 460/461. For example, as illustrated in each of FIGS. 33-36, the sensor data 470 may be overlaid onto the image data 460 (e.g., the visual representation of the field of view of the camera 444). As discussed above, the sensor data 470 may be overlaid in a sensor data display panel 728, such as the sensor data display panel 728 of FIGS. 33 and 35. The sensor data display panel 728 may be overlaid on the bottom of the display 730, the side of the display 730, the top of the display 730, and/or at different locations on the display 730 dependent on the specific embodiment and/or the particular motion event. For example, the image data 460 may be analyzed to determine where the sensor data display panel 728 is to be displayed. In such an example, the determination may be made such that the sensor data display panel 728 does not interfere with or cover up the person and/or object of interest that caused the motion event, for example. If a person is present in a lower part of the image data 460, for example, the sensor data display panel 728 may be displayed on the top of the display 730. In some of the present embodiments, as discussed above, the sensor data 470 may be overlaid in proximity to the sensors 407, such as the temperature, 110°, being overlaid near the thermostat 407h in FIG. 36. The sensor data 470 may be overlaid near persons and/or objects in the field of view of the camera 444. For example, as illustrated in FIG. 34, the name 738 and/or suspicion icon 732 may be overlaid on the image data 460 near the burglar 710. As another example, as illustrated in FIG. 36, a warning icon 732 may be overlaid on the image data 460 near the fire 740. In some of the present embodiments, other icons symbolizing the status of any of the sensors 407a-407h may be overlaid onto the image data 460. For example, the lock icon 374 and/or the door open 736 icon may be overlaid onto the image data 460 to symbolize the door being locked and/or the door being open, for example. In some of the present embodiments, a combination of the above discussed methods of overlaying the sensor data 470 onto the image data 460 may be used. For example, the sensor data 470 may be displayed in the form of a sensor data display panel 728, icons on the display 730, and/or overlaid sensor data 470 on or in proximity to the sensors 407a-407h.

The processor 452 may then generate and transmit, using the communication module 450, the user alert 472 including the updated image data 460/461 to the client device 404, 406 associated with the A/V recording and communication device 402 (e.g. the A/V recording and communication doorbell 402c of the example of FIGS. 33-34). The user alert 472 may be sent in the form of a push-notification, such as the push-notification 450 illustrated in FIG. 37. The user alert 472 may include a frame from the image data 460. The frame may be selected based on its relevance to the motion event. In the example of the burglar 710, the frame may include an image of the burglar 710. In the example of the fire 740, the frame may include an image of the fire 740. The push-notification 450 may further include at least some of the sensor data 470, such as, for example, the sensor data 470 most relevant to the motion event, such as sensor data 452 including the status of the door open/closed sensor 407d at the front door 705 where the burglar 710 is located, and the subsequent motion in the foyer 703 generated by a motion sensor in the foyer 703, for example. Including the sensor data 470 (e.g., sensor data 452) may better enable the user of the client device 404, 406 to determine if the user alert 472 is a user alert that requires further attention. If the sensor data 470 was not included, the user may not recognize the motion event as unusual. For example, if an indication that a motion event occurred absent the sensor data 470, the user may not know that the front door 705 was opened and that somebody was likely inside the house 701. By including the sensor data 470, the user is more likely to not only pay attention to the user alert 472, but also more likely to take appropriate action (e.g., alert law enforcement, notify neighbors, etc.).

Figure 28:
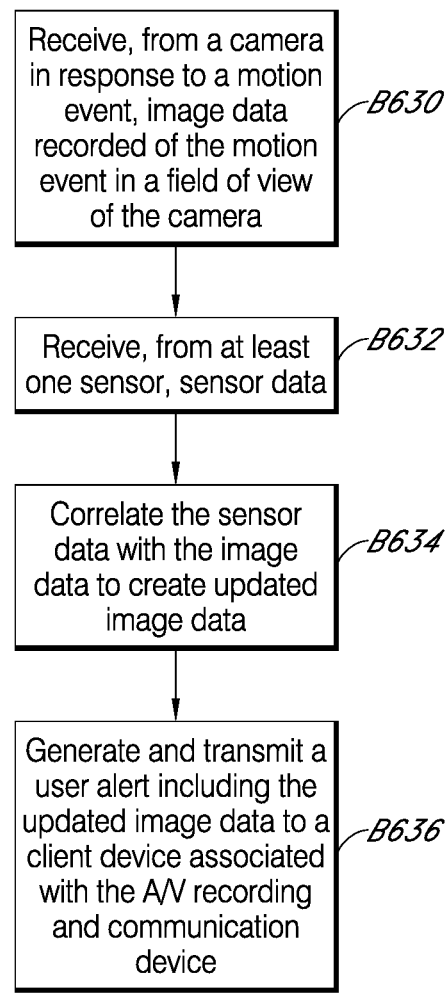

Now referring to FIG. 28, FIG. 28 is another flowchart illustrating a process for informative image data generation using A/V recording and communication devices according to various aspects of the present disclosure. The process of FIG. 28 is similar to that of the process of FIG. 26, except the process of FIG. 28 may be entirely executed on a backend device, such as the backend server 430. In some of the present embodiments, the process of FIG. 28 may be executed on a backend device, such as the backend server 430, in network connection/communication with the A/V recording and communication device 402 over the user's network 408 and/or the network (Internet/PSTN) 410. In other embodiments, the process of FIG. 28 may be executed by a hub device (e.g., the smart-home hub device 411) in network connection/communication with the A/V recording and communication device 402 and/or the sensors 407, 409, either directly or indirectly over the user's network 408 and/or the network (Internet/PSTN) 410. In yet another embodiment, for example where there are multiple A/V recording and communication devices 402 (e.g., the environment 700 of FIG. 32), the process of FIG. 28 may be carried out by one of the A/V recording and communication devices 402, such as a master A/V recording and communication device 402, for example.

At block B630, the process receives from a camera, in response to a motion event, image data recorded of the motion in a field of view of the camera. For example, the processor 502 of the backend server 430 may receive the image data 460 recorded by the camera 444 of the A/V recording and communication device 402. The backend server 430 may receive the image data 460 over the network (Internet/PSTN) 410 using the network interface 520, for example.

At block B632, the process receives, from at least one sensor, sensor data. For example, the processor 502 may receive, using the network interface 520, the sensor data 470 from at least one sensor 407, 409 (e.g., sensors 407a-407h of FIG. 32). The backend server 430 (or other backend device) may receive the sensor data 470 directly from the sensors 407, 409 and/or may receive the sensor data 470 from the A/V recording and communication device 402 after the A/V recording and communication device 402 has received the sensor data 470 from the sensors 407, 409. This process may be similar to block B604 of FIG. 26, described above.

At block B634, the process correlates the sensor data with the image data to create updated image data. For example, the processor 502 of the backend server 430 may correlate the sensor data 470 with the image data 460 to create updated image data 460/461. This process may be similar to that of block B606 of FIG. 26 and block B624 of FIG. 27, described above.

The process at block B636 generates and transmits a user alert including the updated image data to a client device associated with the A/V recording and communication device. For example, the processor 502 may generate and transmit the user alert 472 including the updated image data 460/461 to the client device 404, 406 associated with the A/V recording and communication device 402. This process may be similar to that of block B608 of FIG. 26 and block B628 of FIG. 27, described above.

Figure 29:
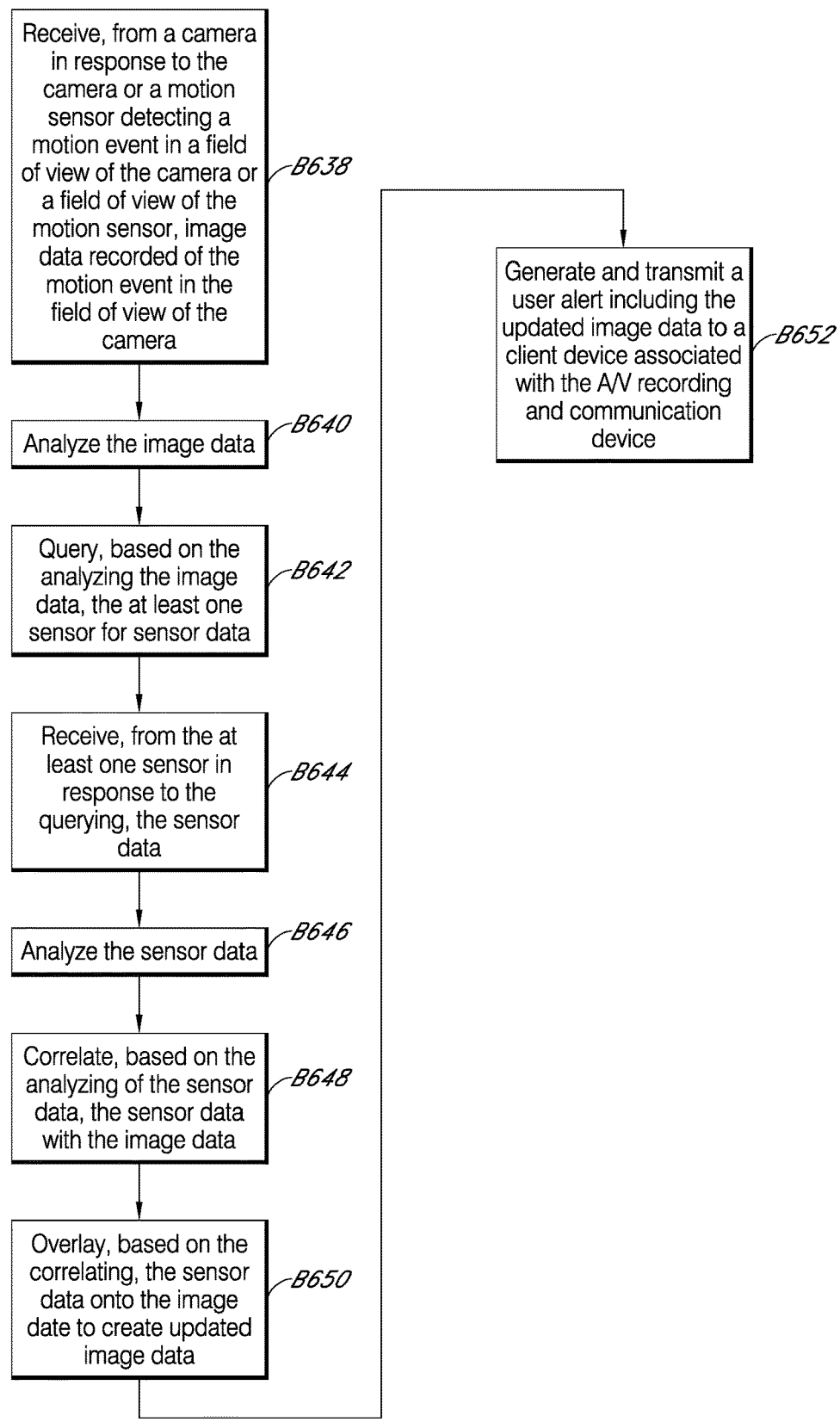

Now referring to FIG. 29, FIG. 29 is another flowchart illustrating a process for informative image data generation using A/V recording and communication devices according to various aspects of the present disclosure. The process of FIG. 29 is similar to that of the process of FIG. 27, except the process of FIG. 29 may be entirely executed on a backend device, such as the backend server 430. In some of the present embodiments, the process of FIG. 29 may be executed on a backend device, such as the backend server 430, in network connection/communication with the A/V recording and communication device 402 over the user's network 408 and/or the network (Internet/PSTN) 410. In other embodiments, the process of FIG. 29 may be executed by a hub device (e.g., the smart-home hub device 411) in network connection/communication with the A/V recording and communication device 402 and/or the sensors 407, 409, either directly or indirectly over the user's network 408 and/or the network (Internet/PSTN) 410. In yet another embodiment, for example where there are multiple A/V recording and communication devices 402 (e.g., the environment 700 of FIG. 32), the process of FIG. 29 may be carried out by one of the A/V recording and communication devices 402.

At block B638, the process receives, from a camera in response to the camera or a motion sensor detecting a motion event in a field of view of the camera or a field of view of the motion sensor, image data recorded of the motion event in the field of view of the camera. For example, the processor 502 may receive, from the camera 444 in response to the camera 444 or the motion sensor 474 detecting a motion event in the field of view of the camera 444 or a field of view of the motion sensor 474, the image data 460 of the motion event in the field of view of the camera 444. For example, the image data 460 may be received over the network (Internet/PSTN) 410 using the network interface 520.

At block B640, the process analyzes the image data. For example, the processor 502 may analyze the image data 460. This process may be similar to that of block B618 of FIG. 27, discussed above.

At block B642, the process queries, based on the analyzing of the image data, the at least one sensor for sensor data. For example, the processor 502 may query, based on analyzing the image data 460, at least one of the sensors 407, 409 for the sensor data 470. This process may be similar to that of block B620 of FIG. 27, discussed above.

The process, at block B644, receives, from the at least one sensor in response to the querying, the sensor data. For example, in response to querying the at least one sensor 407, 409, the processor 502 receives the sensor data 470. This process may be similar to that of block B622 of FIG. 27, discussed above.

At block B646, the process analyzes the sensor data. For example, the processor 502 may analyze the sensor data 470.

At block B648, the process correlates, based on the analyzing of the sensor data, the sensor data with the image data. For example, the processor 502, based on the analyzing of the sensor data 470, correlates the sensor data 470 with the image data 460. This process may be similar to that of block B624 of FIG. 27, discussed above.

At block, B650, the process overlays, based on the correlating, the sensor data onto the image data to create updated image data. For example, the processor 502 may overlay, based on the correlating, the sensor data 470 onto the image data 460 to create updated image data 460/461. This process may be similar to that of block B626 of FIG. 27, discussed above.

At block B652, the process generates and transmits a user alert including the updated image data to a client device associated with the A/V recording and communication device. For example, the processor 502 may generate and transmit the user alert 472 including the updated image data 460/461 to the client device 404, 406 associated with the A/V recording and communication device 402. This process may be similar to that of block B628 of FIG. 27, discussed above.

Figure 30:
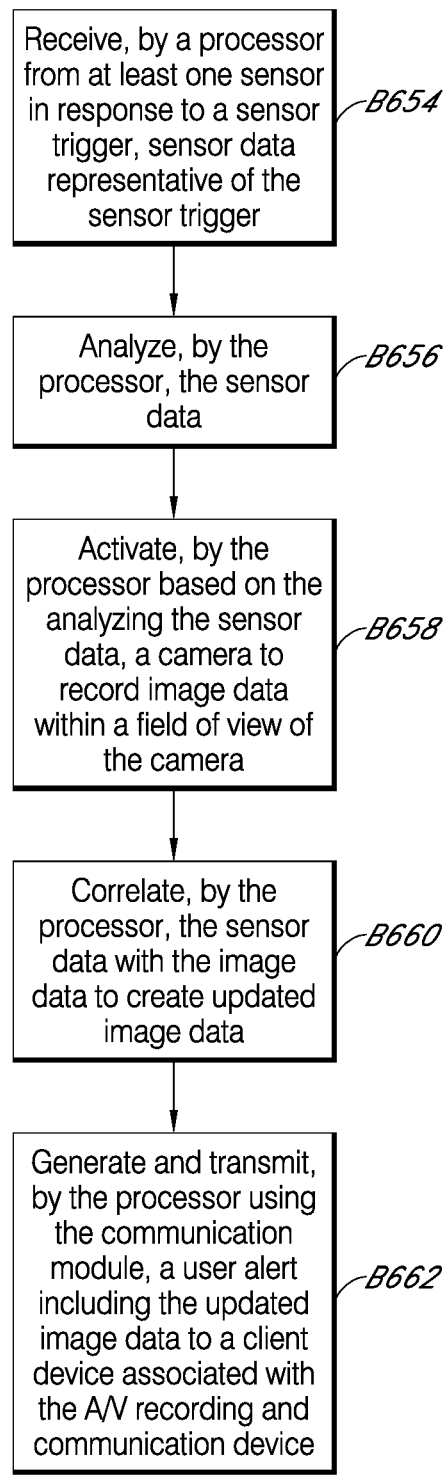

Now referring to FIG. 30, FIG. 30 is another flowchart illustrating a process for informative image data generation using A/V recording and communication devices according to various aspects of the present disclosure. At block B654, the process receives, by a processor from at least one sensor in response to a sensor trigger, sensor data representative of the sensor trigger. For example, the processor 452 (or 502) may receive, from at least one of the sensors 407, 409, in response to the sensor trigger 473, sensor data 470 representative of the sensor trigger 473. The sensor trigger 473 may be, for example, a door or window opening or closing, a threshold amount of smoke detected by a smoke detector, a threshold amount of movement detected by a motion sensor, etc. In response to the sensor trigger 473, such as a door opening or closing, the sensor 407, 409 may generate the sensor data 470 that includes an indication of the current status of the door (e.g., open or closed). The sensor 407, 409 may then transmit the sensor data 470, in response to the sensor trigger 473, to the A/V recording and communication device 402, a hub device (e.g., the smart-home hub device 411) in network communication with the sensor 407, 409, and/or a backend device, such as the backend server 430, over the user's network 408 and/or the network (Internet/PSTN) 410, for example. As a result, the sensor data 470 is received by the A/V recording and communication device 402, the hub device, and/or the backend device at block B654.

At block B656, the process analyzes, by the processor, the sensor data. For example, the processor 452 (or 502) may analyze the sensor data 470. The analysis of the sensor data 470 may include determining what the cause of the sensor trigger 473 was. This analysis may be done in view of the status of other sensors 407, 409 in the environment (e.g., environment 700 of FIG. 32). The analysis may further include determining whether to activate the camera 444 of the A/V recording and communication device 402 to record image data 460.

For example, it may be determined based on the analysis of the sensor data 470 that the sensor trigger 473 was the opening of the front door 705. However, the A/V recording and communication device 402 may not have the camera 444 activated and recording image data 460 from the front door 705, so the determination that the front door 705 was opened may trigger activation of the camera 444. For another example, it may be determined based on the analysis of the sensor data 470 that a threshold level of smoke was detected by the smoke detector. In such an example, it may further be determined that the temperature from a thermostat within the home is at 110°. Based on the analysis of the sensor data 470 from the smoke detector and/or the analysis of the thermostat sensor data 470, the A/V recording and communication device 402 may be activated to record image data 460 of the room containing the smoke detector, for example, or of other areas of the environment (e.g., the environment 700 of FIG. 32). In addition, the sensor data 470 from the smoke detector and/or the thermostat may be included in the updated image data 460/461 as part of a user alert 472 transmitted to the client device 404, 406.

At block B658, the process activates, by the processor, based on the analyzing of the sensor data, a camera to record image data within a field of view of the camera. For example, the processor 452 may activate the camera 444 to record the image data 460 in the field of view of the camera 444. In some of the present embodiments, the processor 502 of the backend server 430 may transmit an activation request to the camera 444 of the A/V recording and communication device 402 in response to and/or based on the analyzing of the sensor data 470. In such embodiments, the processor 452 may receive the activation request and activate the camera 444 to record the image data 460. The image data 460 may then be transmitted to the backend server 430 by the processor 452 of the A/V recording and communication device 402 using the communication module 450 such that the backend server 430 can continue the process of FIG. 30.

At block B660, the process correlates, by the processor, the sensor data with the image data to create updated image data. For example, the processor 452 (or 502) may correlate the sensor data 470 with the image data 460 to create updated image data 460/461. This process may be similar to that of block B634 of FIG. 28, described above. In some of the present embodiments, the correlating of the sensor data 470 with the image data 460 may be based on the sensor trigger 473, for example. In such embodiments, the determination of which sensor data 470 to include in the updated image data 460/461 may be based on the sensor data 470 that is relevant to the sensor trigger 473. For example, if the sensor trigger 473 was caused by a smoke threshold being exceeded and detected by a smoke detector, the sensor data 470 included in the updated image data 460/461 may include the indication of the smoke detected as well as the temperature recorded within the room and/or house where the smoke is detected. If the sensor trigger 473 was caused by the front door being opened, the sensor data 470 included in the updated image data 460/461 may include the indication of the door being opened as well as an indication of the presence of motion inside the house from one or more motion sensors, for example.

At block B662, the process generates and transmits, by the processor using the communication module, a user alert including the updated image data to a client device associated with the A/V recording and communication device. For example, the processor 452 may generate and transmit the user alert 472 including the updated image data 460/461 to the client device 404, 406 associated with the A/V recording and communication device 402 using the communication module 450. This process may be similar to that of block B636 of FIG. 28, as described above.

In some embodiments, the process of FIG. 30 may be executed by a backend device. In such embodiments, the network interface 520 of the backend server 430 may be used in place of the communication module 450, and the processor 502 may generate and transmit the user alert 472 including the updated image data 460/461 to the client device 404, 406 associated with the A/V recording and communication device 402.

In further embodiments, the process of FIG. 30 may be executed by a hub device. In such embodiments, the communication module 421 of the smart-home hub device 411 may be used in place of the communication module 450, and the processor 423 may generate and transmit the user alert 472 including the updated image data 460/461 to the client device 404, 406 associated with the smart-home hub device 411.

Figure 31:
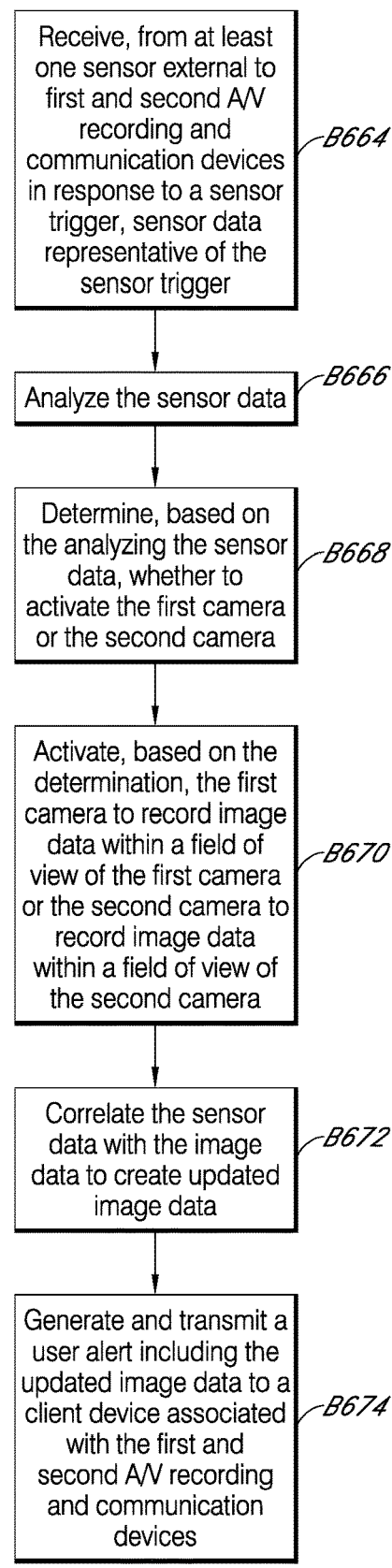

Now referring to FIG. 31, FIG. 31 is another flowchart illustrating a process for informative image data generation using A/V recording and communication devices according to various aspects of the present disclosure. The process of FIG. 31 may be executed on a backend device, such as the backend server 430, in network connection/communication with the A/V recording and communication devices 402 over the user's network 408 and/or the network (Internet/PSTN) 410. In other embodiments, the process of FIG. 31 may be executed by a hub device (e.g., the smart-home hub device 411) in network connection/communication with the A/V recording and communication devices 402 and/or the sensors 407, 409, either directly or indirectly over the user's network 408 and/or the network (Internet/PSTN) 410. In yet another embodiment, the process of FIG. 31 may be carried out by one of the A/V recording and communication devices 402.

At block B664, the process receives, from at least one sensor external to first and second A/V recording and communication devices, in response to a sensor trigger, sensor data representative of the sensor trigger. For example, the processor 502 (or 452) may receive sensor data 470 from at least one of the sensors 407, 409 in response to a sensor trigger 473. This process may be similar to that of block B654 of FIG. 30, described above.

At block B666, the process analyzes the sensor data. For example, the processor 502 (or 452) may analyze the sensor data 470. This process may be similar to that of block B656 of FIG. 30, described above. In some of the present embodiments, the analysis of the sensor data 470 may be to determine the location of the sensor 407, 409 that registered the sensor trigger 473. For example, the analysis of the sensor data 470 may be to determine the proximity of the first and second A/V recording and communication devices 402 to the sensor 407, 409. In another example, the analysis of the sensor data 470 may be to determine the room and/or area of the environment (e.g., the environment 700 of FIG. 32) in which the sensor 407, 409 is located. Based on this analysis, the processor 502 (or 452) may determine which of the camera 444 of the first A/V recording and communication device 402 and the camera 444 of the second A/V recording and communication device 402 has a field of view most relevant to the sensor trigger 473 and/or the event that caused the sensor trigger 473 (e.g., a door being opened, the presence of smoke, etc.).

The process, at block B668, determines, based on the analyzing of the sensor data, whether to activate the first camera or the second camera. For example, the processor 502 (or 452) may determine whether to activate the camera 444 of the first A/V recording and communication device 402 and/or the camera 444 of the second A/V recording and communication device 402. The determination may be made in response to determining the proximity of the first and second A/V recording and communication devices 402 to the sensor 407, 409 that registered the sensor trigger 473, as discussed above. In some of the present embodiments, the determination may be made in response to the determining which of the camera 444 of the first A/V recording and communication device 402 and the camera 444 of the second A/V recording and communication device 402 has a field of view most relevant to the sensor trigger 473 and/or the event that caused the sensor trigger 473, as discussed above.

For example, if smoke is detected by a smoke detector (e.g., smoke detector 407g of FIG. 32), it may be determined that the surveillance camera 402b is located in close proximity to the smoke detector, and/or is located in the same room as the smoke detector, while the A/V recording and communication doorbell 402c is located external to the house 701. As a result, it may be determined that the camera 444 of the surveillance camera 402b should be activated based on the sensor trigger 473 registered in the foyer 703 by the smoke detector 407g, for example (e.g., as illustrated in FIG. 35).

For another example, if the sensor trigger 473 is the opening of the front door 705 as detected by a door sensor (e.g., front door sensor 407d of FIG. 32), it may be determined that the A/V recording and communication doorbell 402c is located adjacent the front door 705 and/or the field of view of the camera 444 of the A/V recording and communication doorbell 402c includes the area in front of the front door 705, while the surveillance camera 402d is located a further distance from the front door 705 and/or does not include the area in front of the front door 705 in the field of view of its camera 444. As a result, it may be determined that the camera 444 of the A/V recording and communication device 402c should be activated based on the sensor trigger 473 of the front door 705 being opened, for example (e.g., as illustrated in FIG. 33).

At block B670, the process activates, based on the determination, the first camera to record image data within a field of view of the first camera, or the second camera to record image data within a field of view of the second camera. For example, the processor 502 (or 452), based on the determination, may activate the first camera 444 of the first A/V recording and communication device 402 to record image data within a field of view of the first camera 444, or the second camera 444 of the second A/V recording and communication device 402 to record image data within a field of view of the second camera 444.

At block B672, the process correlates the sensor data with the image data to create updated image data. For example, the processor 502 (or 452) may correlate the sensor data 470 with the image data 460 to create updated image data 460/461. This process may be similar to that of block B660 of FIG. 30, described above.

At block B674, the process generates and transmits a user alert including the updated image data to a client device associated with the first and second A/V recording and communication devices. For example, the processor 502 (or 452) may generate and transmit the user alert 472 including the updated image data 460/461 to a client device associated with the first and second A/V recording and communication devices 402. This process may be similar to that of block B662 of FIG. 30, described above.

The process of FIG. 31 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure. Although the below-detailed embodiments are discussed with reference to FIG. 31, this example is not intended to be limiting. As such, the below-detailed embodiments may also similarly be associated with other processes described herein, such as the process of FIG. 29, for example.

Referring again to the environment 700 of FIG. 32, in one example, the smoke detector 407g may detect an amount of smoke above a threshold level as a sensor trigger 473 in response to a fire (e.g., the fire 740 of FIGS. 35-36) in the foyer 703 of the house 701. As a result, the smoke detector 407g may generate sensor data 470 representative of the sensor trigger 473 and transmit the sensor data 470, which may be received by the backend server 430, by one of the A/V recording and communication devices 402, and/or by the smart-home hub device 411, for example (at block B664).

In response, the backend server 430, one of the A/V recording and communication devices 402, and/or the smart-home hub device 411 may analyze the sensor data 470 (at block B666) to determine the sensor trigger 473 was from the presence of smoke above a threshold level. The sensor data 470 may also be analyzed to determine the location of the smoke detector 407g in the house 701, and to determine which A/V recording and communication device 402 (e.g., the surveillance camera 402b, the A/V recording and communication doorbell 402c, the flood light surveillance camera 402a, or the surveillance camera 402d) is located most proximate the smoke detector 407g and/or has a camera 444 with a field of view most relevant to the sensor data 470. The sensor data 470 may further be analyzed to determine which other sensor data 470 from the other sensors 407a-407h may be relevant to the sensor trigger 473 (e.g., the temperature inside the foyer 703 from the thermostat 407h).

Based on the analysis of the sensor data 470, the backend server 430, one of the A/V recording and communication devices 402, and/or the smart-home hub device 411 may determine which A/V recording and communication device's 402 camera 444 to activate. For example, based on the analysis, it may be determined that the surveillance camera 402b is proximate and/or within the same room as the smoke detector 407g, while the other A/V recording and communication devices 402 are outside of the room (e.g., the foyer 703), at a greater distance from the smoke detector 407g, and/or do not have a camera 444 with a field of view that includes the foyer 703 where the smoke is detected. As a result, the determination may be that the camera 444 of the surveillance camera 402b should be activated (at block B668). Based on the determination, the camera 444 of the surveillance camera 402b may be activated to record the image data 460 in the field of view of the camera 444 (at block B670).

After the sensor data 470 has been received from the smoke detector 407g (and any other sensors 407a-407h), and the image data 460 has been received from the camera 444, the image data 460 and the sensor data 470 are correlated (at block B672). For example, the sensor data 470 may be overlaid onto the image data 460, similar to that illustrated in FIGS. 35-36. The sensor data 470 may include sensor data information 742, 744, 746, and 748, for example, each of which provide, respectively, an indication that smoke is present, the temperature is 110°, the front door is locked, and the alarm is set to away, indicating that nobody is home.

As discussed above, sensor data 470 may be received from a variety of sensors, including some or all of the sensors 407a-407h in the environment 700. Part of the correlating may include determining which sensor data 470 is most relevant based on the analysis of the sensor data 470 from the sensor trigger 473 and/or an analysis of the image data 460. In the example of the fire 740, the analysis of the sensor data 470 and/or the image data may indicate that the fire 740 may be present. As a result, this image data and/or sensor data 470 may be analyzed to determine which sensor data 470 to include in the correlation of the sensor data 470 with the image data 460. The determination may be made based on user input, based on current settings, or may be made based on an analysis of the image data 460 and the sensor data 470 to determine which sensor data 470 is most relevant to the sensor trigger 473 and/or the motion event (e.g., the fire 740). In either example, the sensor data 470 is correlated with the image data 460 by, for example, overlaying the sensor data 470 onto the image data 460 to create updated image data 460/461.

After the correlating of the image data 460 with the sensor data 470, the user alert 472, including the updated image data 460/461, is transmitted to the client device 404, 406 associated with the surveillance camera 402b. In the example of FIG. 34, based on the updated image data 460/461, the user of the client device 404, 406 can not only actively see the fire in the visual representation 740 of the updated image data 460/461, but can also determine the temperature in the foyer 703 (the area where the fire is burning), the presence of smoke, the lock/unlock status of the front door, and that the alarm is set to away from the sensor data information 742, 744, 746, and 748, respectively. As a result, the user can make a more informed decision about what to do in response to the fire, and can make a decision in a more timely and efficient manner. For example, because the front door 705 is locked, the user may know that the fire department cannot enter the house without breaking down the door, and as a result, if the door lock can be controlled remotely, may decide to unlock the front door 705. In addition, because the alarm is set to away, the user knows that nobody else is within the house 701, which may provide a sense of relief, but also allows the user to provide more accurate information to the fire department and/or law enforcement.

Referring again to the environment 700 of FIG. 32, in another example, the door sensor 407d at the front door 705 may detect that the front door 705 has been opened as a sensor trigger 473. In such an example, the A/V recording and communication doorbell 402c may not have detected a motion event. As a result, the door sensor 407d may generate sensor data 470 representative of the sensor trigger 473 and transmit the sensor data 470, which may be received by the backend server 430, one of the A/V recording and communication devices 402, and/or the smart-home hub device 411, for example (at block B664).

In response, the backend server 430, one of the A/V recording and communication devices 402, and/or the smart-home hub device 411 may analyze the sensor data 470 (at block B666) to determine the sensor trigger 473 was from the front door 705 being opened. The sensor data 470 may also be analyzed to determine the location of the door sensor 407d, and to determine which A/V recording and communication device 402 (e.g., the surveillance camera 402b, the A/V recording and communication doorbell 402c, the flood light surveillance camera 402a, or the surveillance camera 402d) is located most proximate the door sensor 407d and/or has a camera 444 with a field of view most relevant to the sensor data 470. The sensor data 470 may further be analyzed to determine which other sensor data 470 from the other sensors 407a-407h may be relevant to the sensor trigger 473 (e.g., the status of the window sensor 407e).

Based on the analysis of the sensor data 470, the backend server 430, one of the A/V recording and communication devices 402, and/or the smart-home hub device 411 may determine which A/V recording and communication device's 402 camera 444 to activate. For example, based on the analysis, it may be determined that the A/V recording and communication doorbell 402c is proximate the door sensor 407d, while the other A/V recording and communication devices 402 are farther away from the door sensor 407d and/or do not have a camera 444 with a field of view that includes the area in front of the front door. As a result, the determination may be that the camera 444 of the A/V recording and communication doorbell 402c should be activated (at block B668). Based on the determination, the camera 444 of the A/V recording and communication doorbell 402c may be activated to record the image data 460 in the field of view of the camera 444 (at block B670).

After the sensor data 470 has been received from the door sensor 407d (and any other sensors 407a-407h), and the image data 460 has been received from the camera 444, the image data 460 and the sensor data 470 are correlated (at block B672). For example, the sensor data 470 may be overlaid onto the image data 460, similar to that illustrated in FIGS. 33-34. The sensor data 470 may include sensor data information 720, 722, 724, and 726, for example, which provide an indication that the front door is locked, the front door was opened 4 seconds ago, there is motion in the foyer 703, and the temperature is 73°, respectively.

As discussed above, sensor data 470 may be received from a variety of sensors, including some or all of the sensors 407a-407h in the environment 700. Part of the correlating may include determining which sensor data 470 is most relevant based on the analysis of the sensor data 470 from the sensor trigger 473 and/or an analysis of the image data 460. In the example of the burglar 710, the analysis of the sensor data 470 from the door being opened may indicate that a person (e.g., the burglar 710) may be present, and/or the analysis of the image data 460 may confirm that the burglar 710 is present. As a result, this image data 460 and/or sensor data 470 may be analyzed to determine which sensor data 470 to include in the correlation of the sensor data 470 with the image data 460. The determination may be made based on user input, based on current settings, or may be made based on an analysis of the image data 460 and the sensor data 470 to determine which sensor data 470 is most relevant to the sensor trigger 473 and/or the motion event (e.g., the burglar 710). In either example, the sensor data 470 is correlated with the image data 460 by, for example, overlaying the sensor data 470 onto the image data 460 to create updated image data 460/461.

After the correlating of the image data 460 with the sensor data 470, the user alert 472, including the updated image data 460/461, is transmitted to the client device 404, 406 associated with the A/V recording and communication doorbell 402c. In the example of FIG. 32, based on the updated image data 460/461, the user of the client device 404, 406 may not only actively see the burglar 710 in the visual representation 740 of the updated image data 460/461, but may also determine that the front door is locked, so it cannot be opened freely, and that the front door was in fact opened 4 seconds ago. This information may provide the user with an indication that the burglar 710 has broken in through the front door. In addition, sensor data information 724 may provide the user with an indication that there is motion in the foyer, as detected by a motion sensor (not shown) in the foyer 703, which may be the first room inside the front door 705, as illustrated in FIG. 32, for example. The sensor data information 726 may further include the temperature, which may be included based on user input to receive the temperature with any user alert 472, or may be based on current settings for the generation of user alerts 472, for example. This sensor data 470 included in the updated image data 460/461 not only provides the user with an indication that the burglar 710 is present, but also additionally provides useful information as to the activity and purpose of the burglar 710. In this case, the user may quickly determine that the burglar 710 is breaking into the house and may alert law enforcement, notify the neighbors, etc.

The processes described herein enable users of client devices 404, 406 associated with A/V recording and communication devices 402 to be provided not only image data 460 from cameras 419/444 and sensor data 470 from sensors 407, 409 at their home, but updated image data 460/461 including the image data 460 and the sensor data 470 in a more digestible and informative format. As a result, the users are better able to identify dangerous, suspicious, and/or harmful situations occurring at their home, and more effectively and efficiently make informed decisions as to what action to take in response (e.g., alert law enforcement, notify the neighbors, alert family, sound an alarm, etc.). Ultimately, the processes described herein allow for safer homes and safer communities.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Many of the descriptions above of the embodiments of the present processes (e.g., FIGS. 26-31) refer to one of the A/V recording and communication device 402, or the smart-home hub device 411, or the backend server 430. It is to be understood, however, that aspects of any method described herein may be performed by any of these devices, either alone or in combination with any other of these devices.

Figure 38:
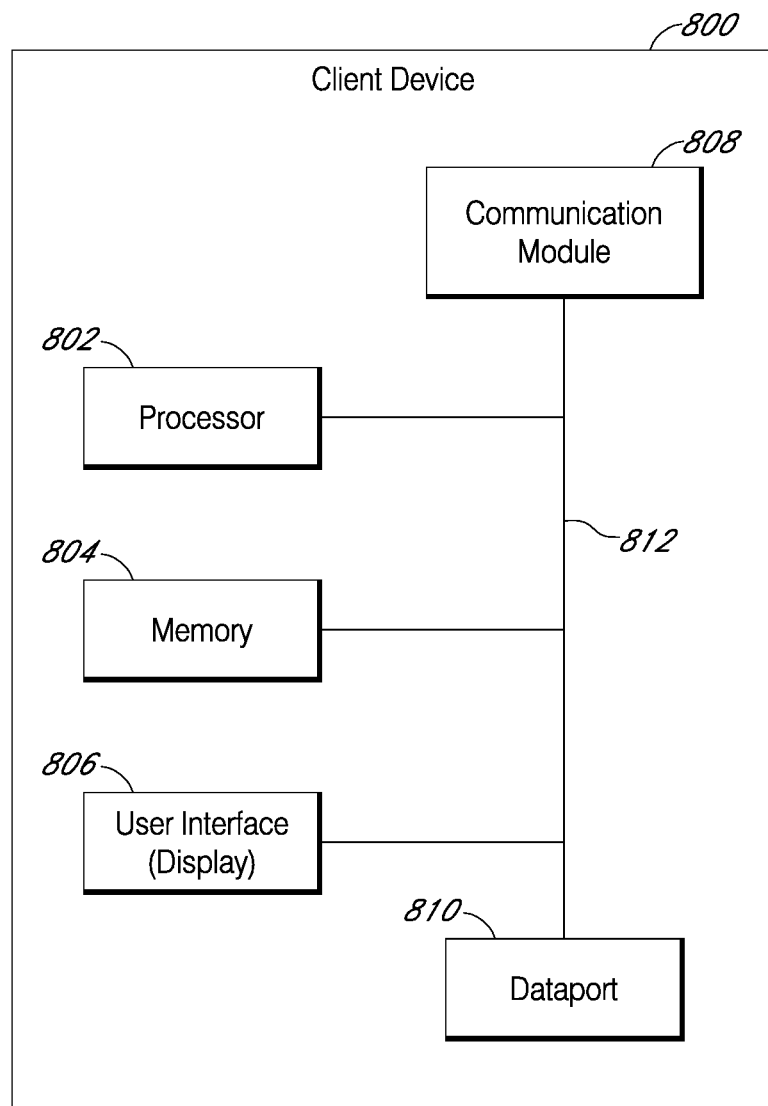
FIG. 38 is a functional block diagram of a client device on which the present embodiments may be implemented according to various aspects of the present disclosure.

FIG. 38 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 38, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 39:
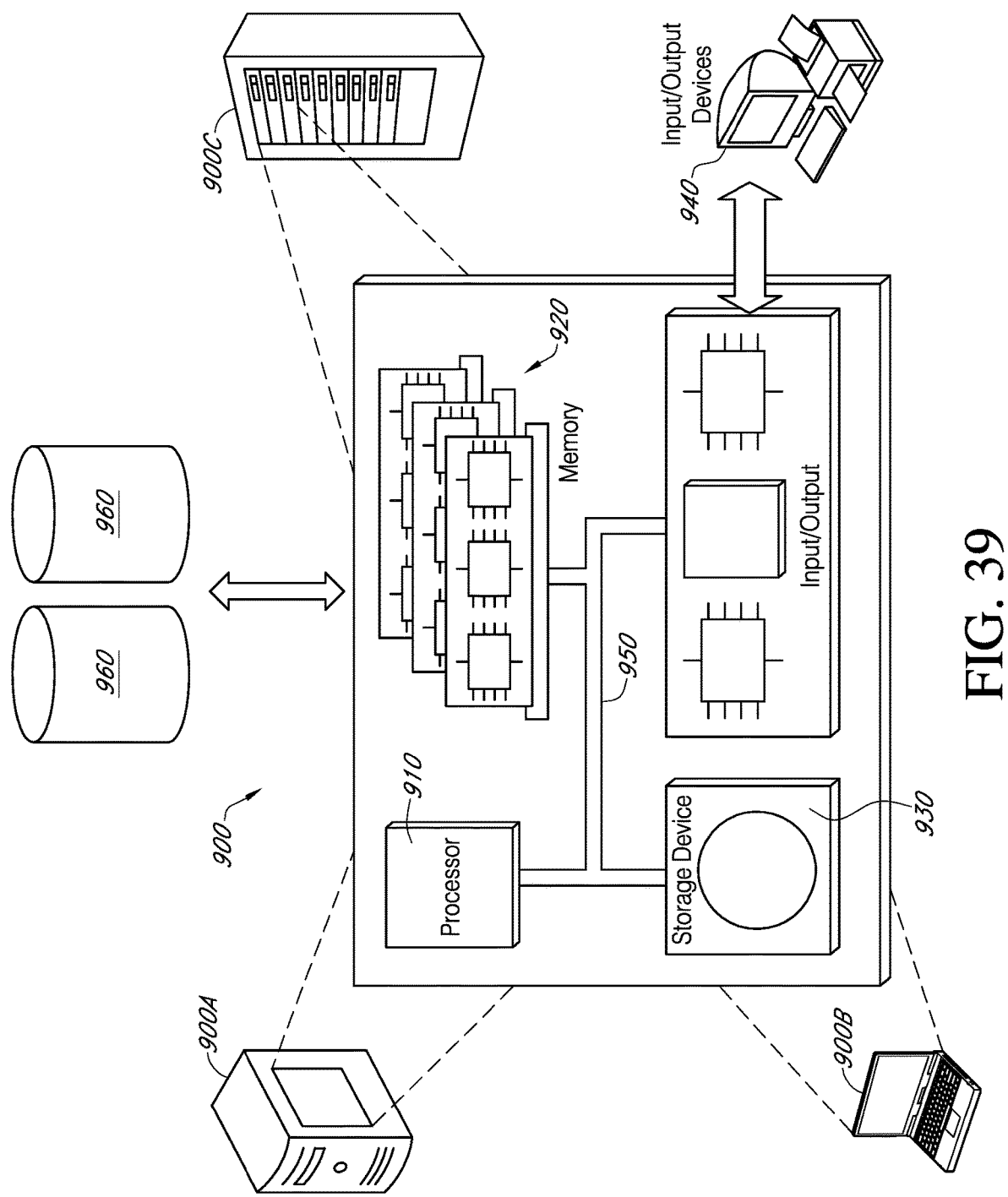
FIG. 39 is a functional block diagram of a general-purpose computing system on which the present embodiments may be implemented according to various aspects of present disclosure.

FIG. 39 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
receiving, from an A/V recording and communication device, image data generated during a period of time by a camera of the A/V recording and communication device, the image data representative of images of a field of view of the camera;
receiving, from at least one of a sensor or a hub device, sensor data generated by the sensor in response to a sensor trigger at a time;
determining a time-based association between the A/V recording and communication device and the sensor;
determining an object-based association between the sensor data and an object present within the field of view of the camera;
determining that the time is within the period of time;
correlating the sensor data with the image data to generate updated data, wherein the updated data associates the sensor data with the object present within the field of view of the camera during the period of time;
generating a message including the updated data; and
transmitting the message to a client device associated with the A/V recording a communication device, the updated data configured to cause the images of the field of view of the camera represented by the image data to be displayed in addition to a representation of the sensor data positioned proximate to the object present within the field of view of the camera.

2. The method of claim 1, wherein the sensor includes at least one of:
a door sensor, the sensor trigger is a door opening/closing, and the sensor data is representative of the door opening or closing;

a window sensor, the sensor trigger is a window opening/closing, and the sensor data is representative of the window opening or closing;

a temperature sensor, the sensor trigger is a temperature over a threshold, and the sensor data is representative of the temperature;

a carbon monoxide sensor, the sensor trigger is a carbon monoxide level over a threshold, and the sensor data is representative of the carbon monoxide level;

a smoke alarm, the sensor trigger is a threshold amount of smoke detected, and the sensor data is representative of the amount of smoke detected;

a light sensor, the sensor trigger is an amount of ambient light being above or below a threshold, and the sensor data is representative of the amount of ambient light; or a motion sensor, the sensor trigger is a value determined from a signal generated by the motion sensor being greater than a threshold, and the sensor data is representative of the value.

3. The method of claim 1, wherein the image data is received in response the camera or a motion sensor of the A/V recording and communication device detecting the object.

4. The method of claim 1, wherein:
the period of time is determined based at least in part on first clock data associated with the image data;
the time is determined based at least in part on second clock data associated with the sensor data; and
the determining that the time is within the period of time is based at least in part on the first clock data and the second clock data.

5. The method of claim 1, wherein the correlating the image data and the sensor data to create the updated data comprises:
matching the time associated with the sensor data with the time within the period of time associated with the image data;
correlating the sensor data with at least a portion of the image data corresponding to the time within the period of time; and
creating the updated data based at least in part on the correlating the sensor data with at least the portion of the image data corresponding to the time within the period of time.

6. The method of claim 1, wherein:
the representation is a first representation;
the images are first images associated with the period of time including and after the time; and
prior to the display of the first images represented by the image data and the representation of the sensor data, the updated data is configured to cause second images of the field of view of the camera represented by the image data associated with the period of time prior to the time to be displayed in addition to a second representation of other sensor data generated by at least one of the sensor or another sensor.

7. The method of claim 1, wherein the representation of the sensor data is configured to be overlaid onto the images represented by the image data.

8. The method of claim 1, wherein:
the message is configured to be displayed as a push-notification on the client device; and
the push-notification is configured to include another representation of the sensor data and at least one of the images represented by the image data.

9. A method comprising:
receiving, from an A/V recording and communication device and during a first portion of a period of time, first image data generated by a camera of the A/V recording and communication device, the first image data being representative of first images of a field of view of the camera;
receiving, from a first sensor, first sensor data generated at a first time within the first portion of the period of time;
generating a first message including the first image data and the first sensor data, the first message configured to cause display of first images represented by the first image data in addition to a first representation of the first sensor data;
transmitting the first message to a client device associated with the A/V recording and communication device;
receiving, from the A/V recording and communication device and during a second portion of the period of time after the first portion, second image data generated by the camera of the A/V recording and communication device, the second image data being representative of second images of the field of view of the camera;
receiving, from one of the first sensor or a second sensor, second sensor data generated based at least in part on a sensor trigger and at a second time within the second portion of the period of time;
determining an object-based association between the second sensor data and an object present within the field of view of the camera;
generating a second message including the second image data and the second sensor data, the second message configured to cause the second images of the field of view of the camera represented by the second image data to be displayed in addition to a second representation of the second sensor data positioned proximate to the object present within the field of view of the camera; and
transmitting the second message to the client device.

10. The method of claim 9, wherein at least one of the sensor or the second sensor includes:
a door sensor, the sensor trigger is a door opening/closing, and the second sensor data is representative of the door opening or closing;
a window sensor, the sensor trigger is a window opening/closing, and the second sensor data is representative of the window opening or closing;
a temperature sensor, the sensor trigger is a temperature over a threshold, and the second sensor data is representative of the temperature;
a carbon monoxide sensor, the sensor trigger is a carbon monoxide level over a threshold, and the second sensor data is representative of the carbon monoxide level;
a smoke alarm, the sensor trigger is a threshold amount of smoke detected, and the second sensor data is representative of the amount of smoke detected;
a light sensor, the sensor trigger is an amount of ambient light being above or below a threshold, and the second sensor data is representative of the amount of ambient light; or
a motion sensor, the sensor trigger is a value determined from a signal generated by the motion sensor being greater than a threshold, and the second sensor data is representative of the value.

11. The method of claim 9, wherein:
the first representation of the first sensor data is configured to be overlaid onto at least one of the first images represented by the first image data; and the second representation of the second sensor data is configured to be overlaid onto at least one of the second images represented by the second image data.

12. A method for use with a first audio/video (A/V) recording and communication device having a first camera with a first field of view and a second A/V recording and communication device having a second camera with a second field of view, the method comprising:

receiving, based at least in part on a sensor trigger associated with a sensor external to the first A/V recording and communication device and the second A/V recording and communication device, sensor data;

analyzing the sensor data;

determining, based at least in part on the first field of view, the second field of view, and the analyzing the sensor data, to obtain image data generated by the first A/V recording and communication device;

obtaining the image data generated by the first A/V recording and communication device and representative of images of the first field of view of the first camera;

determining an object-based association between the sensor data and an object present within the first field of view of the first camera;

correlating the sensor data with the image data to create updated data, wherein the updated data associates the sensor data with the object present within the first field of view of the first camera;

generating a message including the updated data configured to cause the images of the first field of view of the first camera represented by the image data to be displayed in addition to a representation of the sensor data positioned proximate to the object present within the first field of view of the first camera; and transmitting the message to a client device associated with at least the first A/V recording and communication device.

13. The method of claim 12, wherein the sensor includes at least one of:

a door sensor, the sensor trigger is a door opening/closing, and the sensor data is representative of the door opening or closing;

a window sensor, the sensor trigger is a window opening/closing, and the sensor data is representative of the window opening or closing;

a temperature sensor, the sensor trigger is a temperature over a threshold, and the sensor data is representative of the temperature;

a carbon monoxide sensor, the sensor trigger is a carbon monoxide level over a threshold, and the sensor data is representative of the carbon monoxide level;

a smoke alarm, the sensor trigger is a threshold amount of smoke detected, and the sensor data is representative of the amount of smoke detected;

a light sensor, the sensor trigger is an amount of ambient light being above or below a threshold, and the sensor data is representative of the amount of ambient light; or a motion sensor, the sensor trigger is a value determined from a signal generated by the motion sensor being greater than a threshold, and the sensor data is representative of the value.

14. The method of claim 12, wherein the obtaining the image data generated by the first A/V recording and communication device and representative of the images of the first field of view of the first camera comprises:

transmitting an activation signal to the first A/V recording and communication device, the activation signal configured to cause the first A/V recording and communication device to generate the image data; and receiving, from the first A/V recording and communication device, the image data.

15. The method of claim 12, wherein the obtaining the image data generated by the first A/V recording and communication device and representative of the images of the first field of view of the first camera comprises:

receiving the image data;

storing the image data in a database; and retrieving the image data from the database.

16. The method of claim 12, wherein the determining to obtain image data generated by the first A/V recording and communication device is based at least in part on a proximity of the sensor to the first A/V recording and communication device.

17. The method of claim 12, wherein the updated data is configured to cause the representation of the sensor data to be overlaid onto the images of the first field of view of the first camera represented by the image data.

18. The method of claim 12, wherein:

the message is configured to be displayed as a push-notification on the client device; and the push-notification is configured to include a representation of the sensor data and at least one of the images represented by the image data.

19. The method of claim 12, wherein the transmitting the message is at a first time, the sensor trigger is a first sensor trigger, the sensor is a first sensor, the sensor data is first sensor data, the image data is first image data, the updated data is first updated data, and the method further comprises:

receiving, based at least in part on a second sensor trigger associated with a second sensor external to the first A/V recording and communication device and the second A/V recording and communication device, second sensor data;

obtaining second image data generated by one of the first A/V recording and communication device or the second A/V recording and communication device;

correlating the second image data with the second sensor data to create second updated data;

generating a second message including the second updated data; and transmitting, at a second time after the first time, the second message to the client device.

20. The method of claim 19, further comprising:

analyzing the second sensor data; and determining, based at least in part on the first field of view, the second field of view, and the analyzing the second sensor data, to obtain the second image data generated by the one of the first A/V recording and communication device or the second A/V recording and communication device, wherein the obtaining the second image data generated by the one of the first A/V recording and communication device or the second A/V recording and communication device is based at least in part on the determining to obtain the second image data generated by the one of the first A/V recording and communication device or the second A/V recording and communication device.

* * * * *